US009268866B2

(12) United States Patent
Evans et al.

(10) Patent No.: US 9,268,866 B2
(45) Date of Patent: Feb. 23, 2016

(54) SYSTEM AND METHOD FOR PROVIDING REWARDS BASED ON ANNOTATIONS

(71) Applicant: GoPop.TV, Inc., Leesburg, VA (US)

(72) Inventors: Eugene Evans, Purcellville, VA (US); Jonathan Small, Charlottesville, VA (US); David Marsh, Charlottesville, VA (US)

(73) Assignee: GOPOP.TV, INC., Leesburg, VA (US)

( * ) Notice: Subject to any disclaimer, the term of this patent is extended or adjusted under 35 U.S.C. 154(b) by 0 days.

(21) Appl. No.: 14/195,336

(22) Filed: Mar. 3, 2014

(65) Prior Publication Data

US 2014/0325543 A1 Oct. 30, 2014

Related U.S. Application Data

(60) Provisional application No. 61/771,461, filed on Mar. 1, 2013, provisional application No. 61/794,202, filed on Mar. 15, 2013, provisional application No. 61/771,467, filed on Mar. 1, 2013, provisional application No. 61/794,271, filed on Mar. 15, 2013, provisional application No. 61/771,514, filed on Mar. 1, 2013, provisional application No. 61/794,322, filed on Mar. 15, 2013, provisional application No. 61/771,519, filed on Mar. 1, 2013, provisional application No. 61/794,419, filed on Mar. 15, 2013, provisional application No. 61/819,941, filed on May 6, 2013.

(51) Int. Cl.
*H04H 60/32* (2008.01)
*G06F 17/30* (2006.01)
(Continued)

(52) U.S. Cl.
CPC ........ *G06F 17/30882* (2013.01); *G06F 17/241* (2013.01); *G06F 17/30312* (2013.01); *H04N 21/231* (2013.01); *H04N 21/23109* (2013.01); *H04N 21/23424* (2013.01); *H04N 21/2668* (2013.01); *H04N 21/4307* (2013.01); *H04N 21/44222* (2013.01); *H04N 21/454* (2013.01); *H04N 21/458* (2013.01); *H04N 21/4667* (2013.01); *H04N 21/475* (2013.01); *H04N 21/4784* (2013.01); *H04N 21/4788* (2013.01); *H04N 21/8133* (2013.01)

(58) Field of Classification Search
None
See application file for complete search history.

(56) References Cited

U.S. PATENT DOCUMENTS 7,865,927 B2   1/2011   Brodersen et al. ............ 725/109
8,839,306 B2   9/2014   Roberts et al.
(Continued)

FOREIGN PATENT DOCUMENTS

WO   WO 2014/134603   9/2014

OTHER PUBLICATIONS

International Search Report and Written Opinion mailed Jul. 25, 2014 for corresponding International Patent Application No. PCT/US2014/019918, 11 pages.
(Continued)

*Primary Examiner* — Nasser Goodarzi
*Assistant Examiner* — Adil Ocak
(74) *Attorney, Agent, or Firm* — Pillsbury Winthrop Shaw Pittman LLP

(57) ABSTRACT

Methods, apparatuses, and/or systems are providing for enabling a time-shifted, on-demand social network for watching, creating, and/or sharing time-shifted annotation datasets (e.g., commentary tracks) synced to any on-demand programming, and more particularly to providing rewards to users when they create annotations (e.g., comments), when other users interact with their annotations, when transactions are enabled via their annotations, or for other reasons.

20 Claims, 30 Drawing Sheets

(51) Int. Cl.
*G06F 17/24* (2006.01)
*H04N 21/231* (2011.01)
*H04N 21/234* (2011.01)
*H04N 21/442* (2011.01)
*H04N 21/466* (2011.01)
*H04N 21/4788* (2011.01)
*H04N 21/81* (2011.01)
*H04N 21/4784* (2011.01)
*H04N 21/2668* (2011.01)
*H04N 21/454* (2011.01)
*H04N 21/458* (2011.01)
*H04N 21/43* (2011.01)
*H04N 21/475* (2011.01)

(56) References Cited

U.S. PATENT DOCUMENTS

| | | | |
|---|---|---|---|
| 2005/0060741 A1 | 3/2005 | Tsutsui et al. | 725/32 |
| 2005/0210145 A1 | 9/2005 | Kim et al. | |
| 2005/0262542 A1 | 11/2005 | Deweese et al. | |
| 2008/0195480 A1 | 8/2008 | Calabria | 705/14 |
| 2009/0063994 A1 | 3/2009 | Pickelsimer et al. | |
| 2009/0063995 A1 | 3/2009 | Baron et al. | |
| 2009/0235297 A1 | 9/2009 | Ferrone | |
| 2009/0249223 A1 | 10/2009 | Barsook et al. | |
| 2010/0169786 A1 | 7/2010 | O'Brien et al. | |
| 2011/0126252 A1 | 5/2011 | Roberts et al. | |
| 2012/0150698 A1 | 6/2012 | McLements, IV | 705/27.2 |
| 2012/0236201 A1 | 9/2012 | Larsen et al. | 348/468 |
| 2012/0321281 A1 | 12/2012 | Hilem | |
| 2013/0004138 A1 | 1/2013 | Kilar et al. | |
| 2013/0290084 A1* | 10/2013 | Ur | 705/14.16 |
| 2014/0075317 A1* | 3/2014 | Dugan et al. | 715/719 |
| 2014/0122601 A1 | 5/2014 | Poston et al. | |
| 2014/0324895 A1 | 10/2014 | Evans et al. | 707/756 |
| 2014/0325333 A1 | 10/2014 | Evans et al. | 715/230 |
| 2014/0325542 A1 | 10/2014 | Evans et al. | 725/14 |
| 2014/0325552 A1 | 10/2014 | Evans et al. | 725/28 |
| 2014/0325557 A1 | 10/2014 | Evans et al. | 725/34 |

OTHER PUBLICATIONS

U.S. Official Action dated Nov. 18, 2014 in corresponding U.S. Appl. No. 14/195,256, 12 pages.
U.S. Office Action dated Apr. 23, 2015 in corresponding U.S. Appl. No. 14/195,256, 16 pages.
U.S. Official Action dated May 4, 2015 in corresponding U.S. Appl. No. 14/195,167, 22 pages.
U.S. Official Action dated Oct. 1, 2015 in corresponding U.S. Appl. No. 14/195,403, 18 pages.

* cited by examiner

SYSTEM AND METHOD FOR PROVIDING REWARDS BASED ON ANNOTATIONS

CROSS-REFERENCE TO RELATED APPLICATIONS

This application claims priority to: (1) U.S. Provisional Patent Application Ser. No. 61/771,461, filed on Mar. 1, 2013, entitled "Marking (Annotating) Live or Captured Media;" (2) U.S. Provisional Patent Application Ser. No. 61/794,202, filed on Mar. 15, 2013, entitled "Method and Apparatus for Marking (Annotating) Live or Captured Media;" (3) U.S. Provisional Patent Application Ser. No. 61/771,467, filed on Mar. 1, 2013, entitled "Time Shift Local;" (4) U.S. Provisional Patent Application Ser. No. 61/794,271, filed on Mar. 15, 2013, entitled "Method and Apparatus for Conducting Time Shifted Interactions With Media;" (5) U.S. Provisional Patent Application Ser. No. 61/771,514, filed on Mar. 1, 2013, entitled "Group Media Control;" (6) U.S. Provisional Patent Application Ser. No. 61/794,322, filed on Mar. 15, 2013, entitled "Method and Apparatus for Controlling Media Being Experienced by a Group of Users;" (7) U.S. Provisional Patent Application Ser. No. 61/771,519, filed on Mar. 1, 2013, entitled "Relevant/Navigation Path User Interface;" (8) U.S. Provisional Patent Application Ser. No. 61/794,419, filed on Mar. 15, 2013, entitled "Method and Apparatus for Controlling Display of User Interface Elements Based on Relevancy;" and (9) U.S. Provisional Patent Application Ser. No. 61/819,941, filed on May 6, 2013, entitled "Method and Apparatus for Sharing Virtual Video Clips Resulting In Audio Playback Without Owning the Source Material," each of which is hereby incorporated by reference herein in its entirety.

This application is additionally related to the following, co-pending U.S. utility patent applications, filed on Mar. 3, 2014: (1) U.S. patent application Ser. No. 14/195,046, entitled "SYSTEM AND METHOD FOR CREATING AND MAINTAINING A DATABASE OF ANNOTATIONS CORRESPONDING TO PORTIONS OF A CONTENT ITEM;" (2) U.S. patent application Ser. No. 14/195,167, entitled "SYSTEM AND METHOD FOR PROVIDING A DATASET OF ANNOTATIONS CORRESPONDING TO PORTIONS OF A CONTENT ITEM;" (3) U.S. patent application Serial No. 14/195,259, entitled "SYSTEM AND METHOD FOR PROVIDING ANNOTATIONS RECEIVED DURING PRESENTATIONS OF A CONTENT ITEM;" (4) U.S. patent application Ser. No. 14/195,403, entitled "SYSTEM AND METHOD FOR SHARING PORTIONS OF A CONTENT ITEM;" and (5) U.S. patent application Ser. No. 14/195,486, entitled "SYSTEM AND METHOD FOR MANAGING REACTIONS TO ANNOTATIONS," each of which is additionally hereby incorporated by reference herein in its entirety.

FIELD OF THE INVENTION

The invention relates generally to methods, apparatuses, and/or systems for enabling a time-shifted, on-demand social network for watching, creating, and/or sharing time-shifted annotation datasets (e.g., commentary tracks) synced to any on-demand programming, and more particularly to providing rewards to users when they create annotations (e.g., comments), when other users interact with their annotations, when transactions are enabled via their annotations, or for other reasons.

BACKGROUND OF THE INVENTION

Through the advent of social media, users are able to disseminate information to others, as well as interact with one another, via various social networks. For example, users may utilize a social networking service to inform others about movie and/or television episodes that they have watched, share their reactions to events occurring during an episode in real-time, and respond to one another's reactions to events in an episode. However, users that miss an episode during an original airing and watch the episode at a later time (e.g., subsequent airing, online streaming, DVD presentation, etc.) are typically unable to experience the reactions of other users as they watch the episode, for example, due to the significantly lower number of viewers that are watching the episode at the same time (for subsequent airings) or because they are watching it "on-demand" at a time when others are not viewing the episode. Moreover, because the previously-shared reactions are available to users that have not watched the episode, the shared reactions may act as "spoilers" that ruin the experience of the users that have yet to watch the episode.

In addition, it is not uncommon for users to want to use social networks to share information about different scenes (e.g., funny or poignant scenes) in a movie or television episode with other users of the social network. Although users may share information with others regarding a specific scene within an episode, they are generally unable to easily provide others with easy access to actually view the scene within the movie or television episode. As an example, users may describe the scene that they wish to share, or they may specify a particular content delivery service and a reference time at which the scene can be accessed by a user via the specified content delivery service. However, both of these approaches require users to manually search for the scene within the episode, and the latter approach further requires that the users have access to the specified content delivery service. These and other drawbacks exist.

SUMMARY OF THE INVENTION

The invention addressing these and other drawbacks relates to methods, apparatuses, and/or systems for enabling a time-shifted, on-demand social network for watching, creating, and/or sharing time-shifted commentary tracks synced to any on-demand programming, according to an aspect of the invention. In particular, the invention may facilitate the presentation of content items, annotations associated with the content items, or related items.

As used herein, "content items" may include movies, television episodes, portions or segments of movies or television episodes, video clips, songs, audio books, e-books, or other content items. A presentation of a content item may be provided to a user via a content delivery service such as, for example, NETFLIX, HULU, AMAZON INSTANT VIDEO, a cable provider, a local service at a user device programmed to present content items stored locally at an electronic storage of the user device (e.g., a hard drive, a CD, a DVD, etc.), or other content delivery service. Presentations of a content item may include reproductions of the content item that are of varying versions (e.g., extended versions, versions with alternative endings or scenes, etc.), reproductions of the content item with auxiliary information (e.g., advertisements, warnings, etc.), or other presentations of the content item.

As used herein, "annotations" may include reviews, comments, ratings, markups, posts, links to other media, or other annotations. Annotations may be manually entered by a user for a content item (or a portion thereof), or automatically determined for the content item (or portion thereof) based on interactions of the user with the content item (or portion thereof), interactions of the user with other portions of the content item or other content items, or other parameters.

Annotations may be manually entered or automatically determined for the content item or the content item portion either before, during, or after a presentation of the content item. Annotations may be stored as data or metadata, for example, in association with information indicative of the content item or the content item.

In some implementations, users may be provided rewards when they create annotations, when other users interact with their annotations, when transactions are enabled via their annotations, or for other reasons. As such, users may be encouraged to create annotations that include quality feedback on content items (e.g., movies, television episodes, etc.) with which others will positively interact, annotations that enable transactions to facilitate revenue earnings, or annotations that offer other benefits.

As an example, an annotation created by a user may be associated with a user account of the user. A reward to be provided (or credited) to the user account may be determined based on the creation of the annotation. A user may, for instance, be compensated when the user creates annotations, when other users interact with the annotations created by the user, or when other conditions for rewards are satisfied.

As another example, interactions with an annotation associated with a user account may be monitored. The monitored interactions may, for example, include access of the annotation (e.g., viewing of the annotation, listening to the annotations, etc.), reactions by users to the annotation (e.g., rating the annotation, replying to the annotation, etc.), execution of transactions enabled via the annotation (e.g., through actionable links), or other interactions. A reward to be provided (or credited) to the user account may be determined based on the monitored interactions.

In one implementation, requests by one or more users for an annotation associated with a user account may be identified. A reward to be provided (or credited) to the user account may be determined based on the requests. The requests may, for example, include requests by other users to access the annotation, and the reward may be determined based on the number of access requests.

In another implementation, reactions by other users to an annotation associated with a user account may be identified. A reward to be provided (or credited) to the user account may be determined based on the reactions. The reactions may, for example, include a rating of the annotation, a reply to the annotation, or other reactions.

In another implementation, an exposure of a promotion related to a product or service to other users via an annotation associated with a user account may be identified. A reward to be provided (or credited) to the user account may be determined based on the exposure.

In another implementation, use of a mechanism (e.g., an actionable link) by other users (via an annotation associated with a user account) that enables execution of a transaction related to a product or service may be identified. A reward to be provided (or credited) to the user account may be determined based on the use of the mechanism.

In another implementation, an execution of a transaction related to a product or service that is enabled via an annotation associated with a user account may be identified. A reward to be provided (or credited) to the user account may be determined based on the execution of the transaction. The transaction may, for example, relate to a product or service that appears in a portion of a content item to which the annotation corresponds. For example, a hat that appears in a scene of a movie or television episode may be purchasable via an actionable link in a comment that is presented when the scene is presented. When a user executes the actionable link (e.g., accessing a shopping site or other interface via the link), the execution of the actionable link may be identified, and the authoring user of the comment may be compensated.

In some implementations, a reference associated with a product or service in an annotation associated with a user account may be identified. A mechanism that enables a transaction related to the product or service may be provided in the annotation. The reference may, for example, include a product/service identifier, a product/service type identifier, a link to a website through which the transaction related to the product or service may be executed, or other reference.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
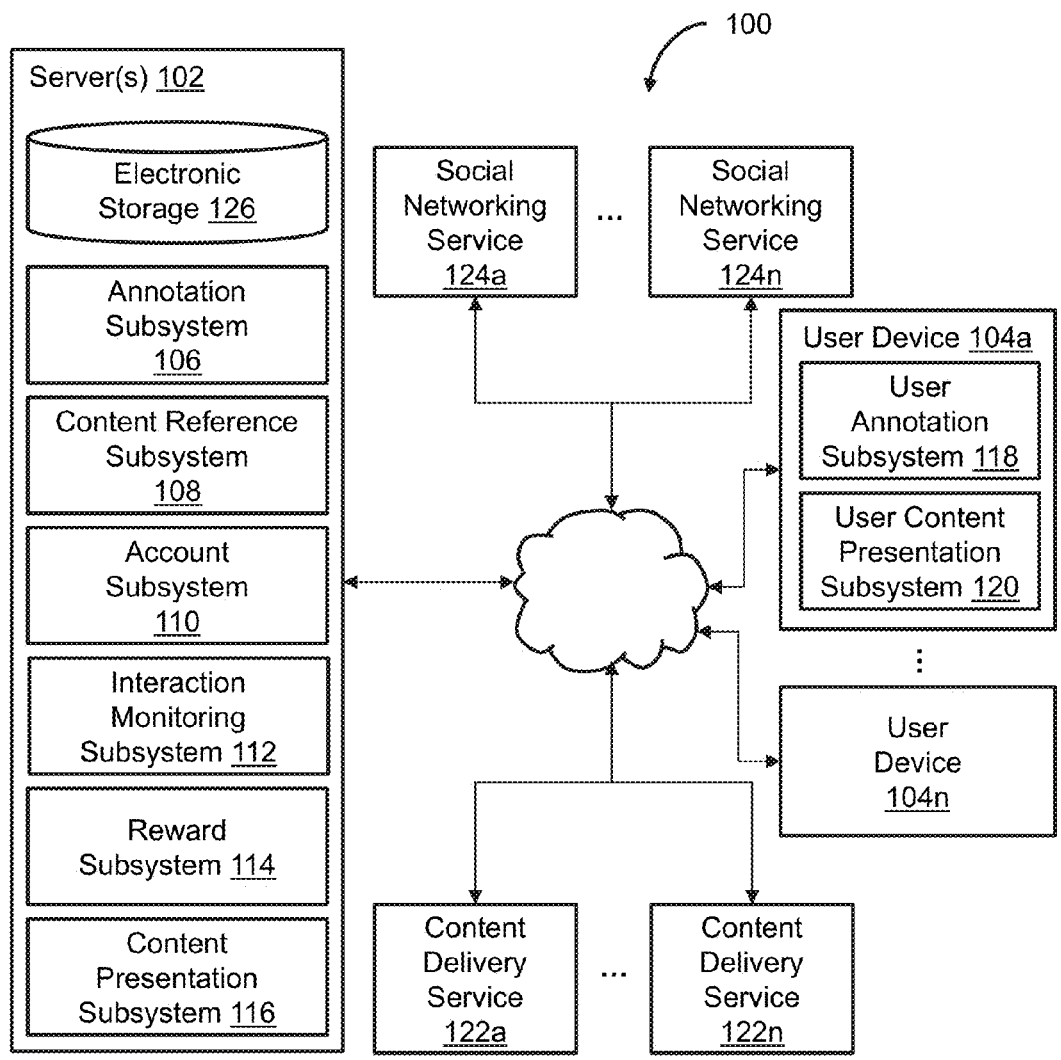
FIG. 1 is an exemplary illustration of a system for facilitating the presentation of content items, annotations associated with the content items, or other related items, according to an aspect of the invention.

FIG. 1 is an exemplary illustration of a system 100 that may enable a time-shifted, on-demand vertical social network for watching, creating, and/or sharing time-shifted commentary tracks synced to any on-demand programming, according to an aspect of the invention. Particularly, system 100 may facilitate the presentation of content items, annotations associated with the content items, or other related items.

As used herein, "content items" may include movies, television episodes, portions or segments of movies or television episodes, video clips, songs, audio books, e-books, or other content items. A presentation of a content item may be provided to a user via a content delivery service such as, for example, NETFLIX, HULU, AMAZON INSTANT VIDEO, a cable provider, a local service at a user device programmed to present content items stored locally at an electronic storage of the user device (e.g., a hard drive, a CD, a DVD, etc.), or other content delivery service. Presentations of a content item may include reproductions of the content item that are of varying versions (e.g., extended versions, versions with alternative endings or scenes, etc.), reproductions of the content item with auxiliary information (e.g., advertisements, warnings, etc.), or other presentations of the content item.

As used herein, "annotations" may include reviews, comments, ratings, markups, posts, links to other media, or other annotations. Annotations may be manually entered by a user for a content item (or a portion thereof), or automatically determined for the content item (or portion thereof) based on interactions of the user with the content item (or portion thereof), interactions of the user with other portions of the content item or other content items, or other parameters. Annotations may be manually entered or automatically determined for the content item or the content item portion either before, during, or after a presentation of the content item. Annotations may be stored as data or metadata, for example, in association with information indicative of the content item or the content item.

System 100 may include one or more computers and subsystems to create and maintain a database of annotations corresponding to portions of a content item, provide annotations corresponding to portions of a content item to social networking services, facilitate sharing of portions of a content item, facilitate aggregation of annotations, modify presentations of a content item based on annotations, selectively filter annotations, create datasets of annotations corresponding to portions of a content item, incentivize creation of annotations or datasets of annotations, manage replies or other reactions to annotations, intelligently present user interface elements, facilitate group control of presentations of a content item, or otherwise enhance the experience of users with respect to presentations of content items, annotations, or other related items.

As shown in FIG. 1, system 100 may comprise server 102 (or servers 102). Server 102 may comprise annotation subsystem 106, content reference subsystem 108, account subsystem 110, interaction monitoring subsystem 112, reward subsystem 114, content presentation subsystem 116, or other components.

System 100 may further comprise a user device 104 (or multiple user devices 104*a*-104*n*). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102 or other components of system 100. In some implementations, user device 104 may comprise user annotation subsystem 118, user content presentation subsystem 120, or other components.

It should be noted that while one or more operations are described herein as being performed by components of server 102, those operations may, in some implementations, be performed by components of user device 104. In addition, while one or more operations are described herein as being performed by components of user device 104, those operations may, in some implementations, be performed by components of service 102. For example, while server 102 may initiate storage of an annotation in association with a reference time corresponding to a portion of a content item by providing the annotation, the reference time, and other information (e.g., instructions for storage, other parameters, etc.) to an annotation database, user device 104 may initiate storage of an annotation in association with a reference time corresponding to a portion of a content item by providing the annotation, the reference time, and other information to the server for storage at the annotation database.

Server 102 and/or user device 104 may be communicatively coupled to one or more content delivery services 122a-122n, social networking services 124a-124n, or other services. In one implementation, one or more of content delivery services 122a-122n or social networking services 124a-124n may be hosted at server 102 and/or user device 104. For example, server 102 may host a content delivery service 122 to provide users with access to content items or portions of content items. As another example, server 102 may host a social networking service 124 to offer a social network through which users may interact with one another, other entities of the social network, content on the social network, etc. In another implementation, one or more of content delivery services 122a-122n or social networking services 124a-124n may be hosted remotely from server 102 and/or user device 104.

In some implementations, the various computers and subsystems illustrated in FIG. 1 may comprise one or more computing devices that are programmed to perform the functions described herein. The computing devices may include one or more electronic storages (e.g., electronic storage 126 or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 106, 108, 110, 112, 114, 116, 118, 120, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 106, 108, 110, 112, 114, 116, 118, or 120 described herein is for illustrative purposes, and is not intended to be limiting, as any of subsystems 106, 108, 110, 112, 114, 116, 118, or 120 may provide more or less functionality than is described. For example, one or more of subsystems 106, 108, 110, 112, 114, 116, 118, or 120 may be eliminated, and some or all of its functionality may be provided by other ones of subsystems 106, 108, 110, 112, 114, 116, 118, or 120. As another example, additional subsystems may be programmed to perform some or all of the functionality attributed herein to one of subsystems 106, 108, 110, 112, 114, 116, 118, or 120.

Attention will now be turned to a more detailed description of various implementations comprising one or more features relating to facilitating the presentation of content items, annotations associated with the content items, or other related items. It should be noted that features described herein may be implemented separately or in combination with one another.

Creating and Maintaining a Database of Annotations

In various implementations, a database of annotations that correspond to portions of a content item may be created and/or maintained. By way of example, the database of annotations may comprise annotations received during presentations of a content item that are provided via at least first and/or second content delivery services. An annotation in the database may, for instance, correspond to a time at which a first portion of a content item is presented via the first content delivery service (e.g., NETFLIX), and another annotation in the database may correspond to a time at which a second portion of the content item is presented via the second content delivery service (e.g., HULU). The annotations may be stored in the database respectively in association with reference times that correspond to portions of the content item. In this way, reference times associated with annotations may be utilized to provide the annotations such that the annotations are presented in a time-synchronized fashion with corresponding portions of a content item (e.g., for which the annotations are received) during subsequent presentations of the content item. As such, annotations that are submitted by prior users (e.g., prior viewers, listeners, etc.) during prior presentations of the content item may be presented to subsequent users as the subsequent users are experiencing corresponding portions of the content item (e.g., portions that correspond to reference times associated with the annotations). Among other benefits, reactions of users to portions of the content item (e.g., captured in the form of annotations) may be shared with other users regardless of the time at which the content item is experienced by users that submit the annotations, or regardless of the time at which the content item is experienced by users that are presented with the submitted annotations. In this manner, users that experience a content item after annotations have been submitted by other users can do so without having to worry about prior annotations "spoiling" the user experience.

Figure 2A:
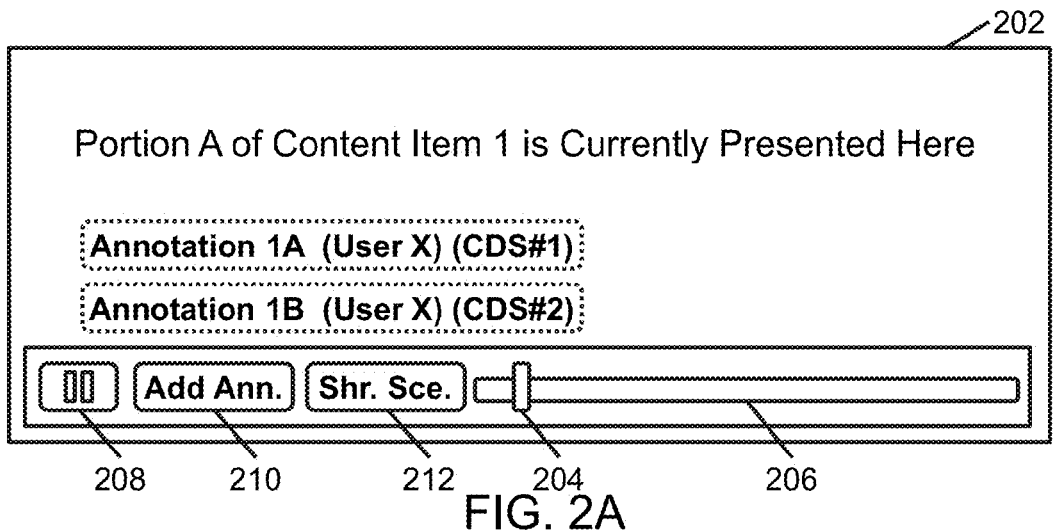
FIGS. 2A-2C are exemplary illustrations of a user interface at different times during presentation of a content item, according to aspects of the invention.
Figure 2B:
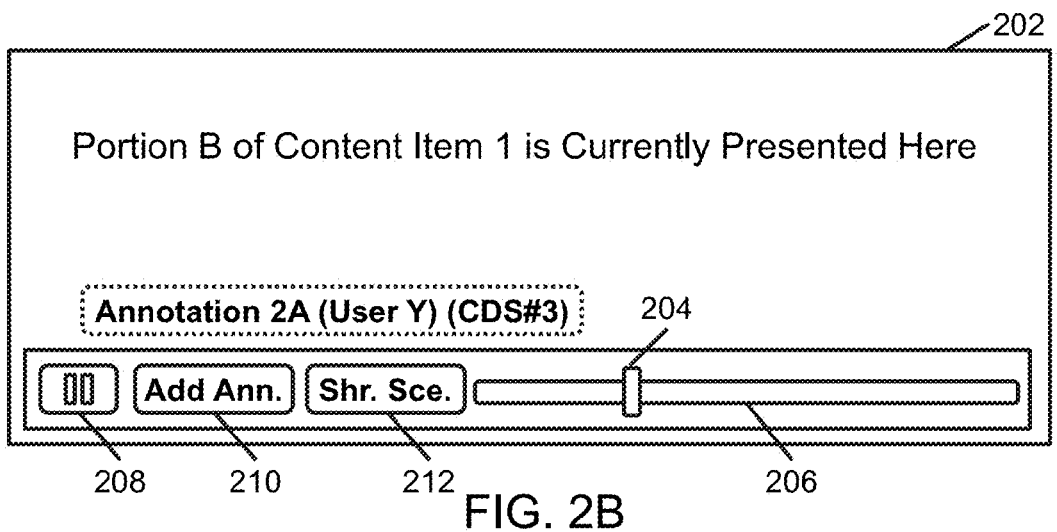
Figure 2C:
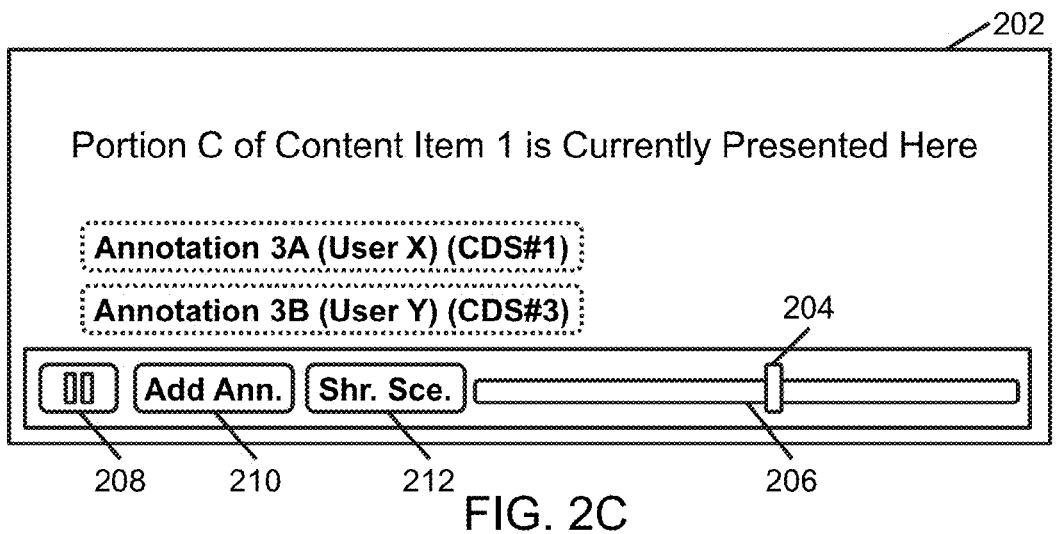

In addition, as illustrated in FIGS. 2A-2C, reactions of users to portions of a content item may be shared with other users during subsequent presentations of the content item even though the reactions were submitted (e.g., in the form of annotations) during prior presentations of the content item. It should be appreciated that any number of annotations can be received from any number of users in any order. As such, any examples as set forth herein are for illustrative purposes only, and not intended to be limiting.

In one use case, with respect to FIGS. 2 A-2C, user interface 202 (e.g., of an application hosted at server 102, of an application hosted at user device 104, etc.) may present a content item to a user. During the presentation of the content item, user interface 202 may present annotations (e.g., Annotations 1A, 1B, 2A, 3A, 3B, or other annotations) when portions of the content item that correspond to reference times associated with the annotations are presented. A first reference time associated with Annotations 1A and 1B may, for example, be represented by a first position of control element 204 on presentation time bar 206. A second reference time associated with Annotation 2A may be represented by a second position of control element 204 on presentation time bar 206. A third reference time associated with Annotations 3A and 3B may be represented by a third position of control element 204 on presentation time bar 206.

As indicated in FIG. 2A, for example, Annotation 1A may have been submitted by User X as User X was watching a first portion (Portion A) of a content item that corresponds to a first reference time during a presentation of the content item provided via Content Delivery Service #1 (e.g., NETFLIX). Annotation 1B may have been submitted by User X as User X was watching the first portion of the content item (that corresponds to the first reference time) during a presentation of the content item provided via Content Delivery Service #2 (e.g., HULU).

As indicated in FIG. 2B, Annotation 2A may have been submitted by User Y as User Y was watching a second portion (Portion B) of the content item that corresponds to a second reference time during a presentation of the content item provided via Content Delivery Service #3 (e.g., a local service at User Y's user device that presents a DVD version of the content item).

As indicated in FIG. 2C, Annotation 3A may have been submitted by User X as User X was watching a third portion (Portion C) of the content item that corresponds to a third reference time during a presentation of the content item provided via Content Delivery Service #1. Annotation 3B may been submitted by User Y as User Y was watching the third portion of the content item (that corresponds to the third reference time) during a presentation of the content item provided via Content Delivery Service #3. Nevertheless, despite the annotations being provided by users during presentations via different content delivery services, each of Annotations 1A, 1B, 2A, 3A, and 3B are presented when the corresponding portion of the content item (e.g., the corresponding portion for which the respective annotation was submitted) are presented.

Figure 3:
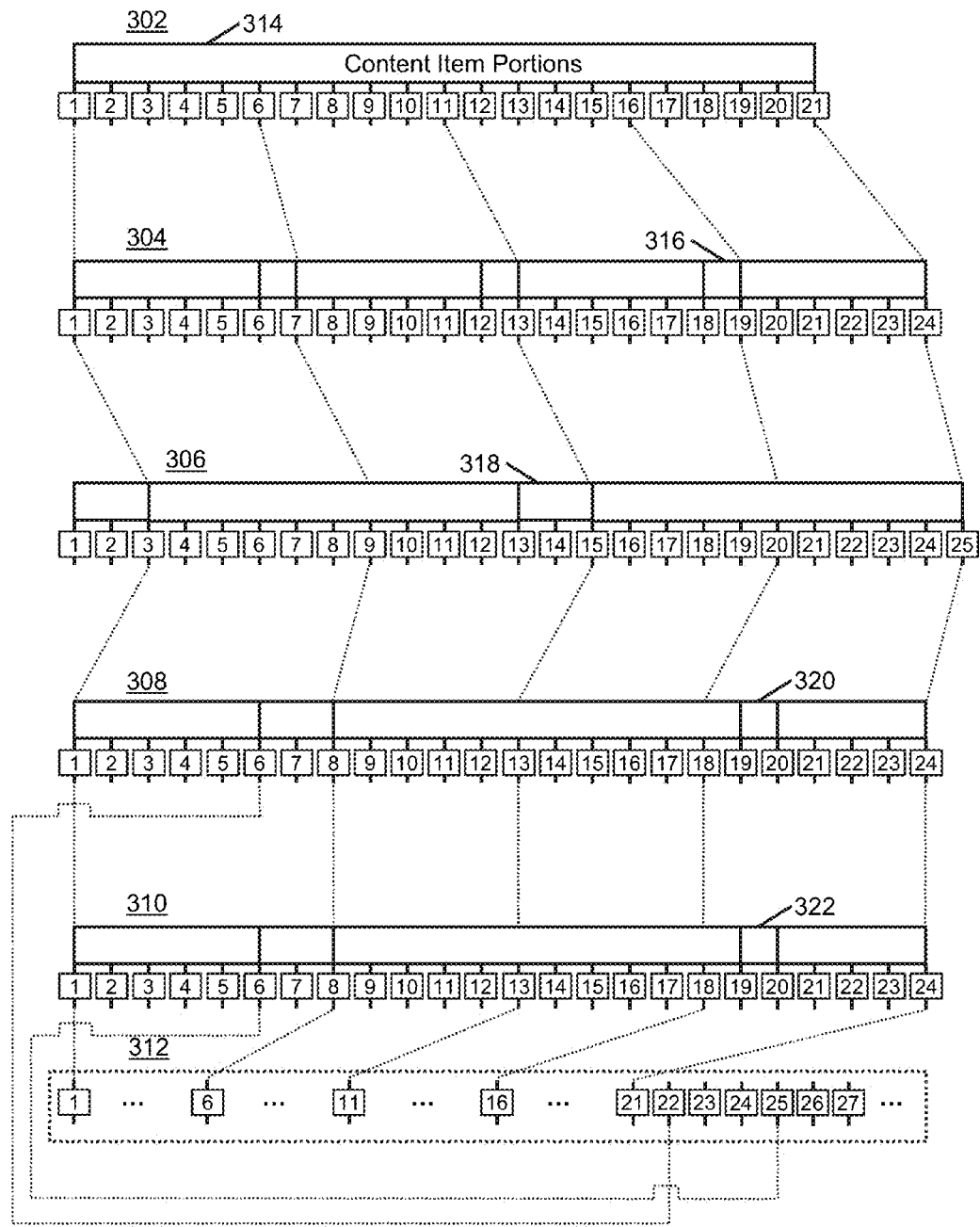
FIG. 3 is an exemplary illustration of different presentations of a content item, according to an aspect of the invention.

As illustrated in FIG. 3, different content delivery services may provide different presentations of the same content item (e.g., presentations 302, 304, 306, 308, 310, or other presentations). As an example, differences among the presentations may comprise different durations of the presentations, different orders of portions of the content item or auxiliary information within the presentations of the content item, different durations of auxiliary information within the presentations of the content item, different versions of the content item included in the presentations (e.g., extended versions, versions with different endings, etc.), or other differences.

In one scenario, for instance, presentations 302, 304, and 306 may differ in duration from one another even though presentations 302, 304, and 306 include the same portions of a content item (e.g., the set of content item portions 314) due to, for example, formatting or for various other reasons (e.g., inclusion of advertisements, warnings, etc.). For example, presentations 304 and 306 may include different sets of auxiliary information 316 and 318 (e.g., advertisements or other auxiliary information) where the auxiliary information of the different sets 316 and 318 are of different orders within their respective presentations and are of different duration. Presentations 308 and 310 may include versions of the content item that are different than the version of the content item in presentation 302, and are further different from one another's version of the content item. For example, the version of the content item in presentation 308 include additional portions 320 of the content item that are not in presentations 302 or 310, and the version of the content item in presentation 310 include additional portions 322 that are not in presentation 302 or 308.

Nevertheless, in some implementations, reference times that correspond to portions of a content item may be utilized to present annotations regardless of the differences between the presentations of the content item that were provided to annotating users when the users submitted the annotations. The reference times on which presentations of the annotations are based may, for example, comprise a master set of reference times (e.g., reference set 312) with which other reference times (associated with different presentations) may be compared to identify a reference time from the master set with which an annotation is to be associated. As an example, the master set may include master reference times that correspond to portions of a content item where the master reference times are independent of the content delivery service through which a presentation of the content item is provided.

In one use case, with respect to FIG. 3, reference set 312 may represent a master set of reference times associated with a content item. By way of example, master reference time 1 in reference set 312 may correspond to reference time 1 of presentation 302, reference time 1 of presentation 304, reference time 3 of presentation 306, reference time 1 of presentation 308, and reference time 1 of presentation 310. As such, annotations that are submitted by users at time 1 during presentation 302, time 1 during presentation 304, time 3 during presentation 306, time 1 during presentation 308, and time 1 during presentation 310 may all be stored in association with master reference time 1 corresponding to a first portion of the content item so that the annotations may be presented during a subsequent presentation of the content item when the first portion is presented.

As another example, master reference time 6 may correspond to reference time 6 of presentation 302, reference time 7 of presentation 304, reference time 9 of presentation 306, reference time 8 of presentation 308, and reference time 8 of presentation 310. Annotations that are submitted by users at time 6 during presentation 302, time 7 during presentation 304, time 9 during presentation 306, time 8 during presentation 308, and time 8 during presentation 310 may all be stored in association with master reference time 6 corresponding to a second portion of the content item so that the annotations may be presented during a subsequent presentation of the content item when the second portion is presented.

As another example, master reference time 11 may correspond to reference time 11 of presentation 302, reference time 13 of presentation 304, reference time 15 of presentation 306, reference time 13 of presentation 308, and reference time 13 of presentation 310. As a result, annotations that are submitted by users at time 11 during presentation 302, time 13 during presentation 304, time 15 during presentation 306, time 13 during presentation 308, and time 13 during presentation 310 may all be stored in association with master reference time 11 corresponding to a third portion of the content item so that the annotations may be presented during a subsequent presentation of the content item when the third portion is presented.

As yet another example, master reference time 16 may correspond to reference time 16 of presentation 302, reference time 19 of presentation 304, reference time 20 of presentation 306, reference time 18 of presentation 308, and reference time 18 of presentation 310. As such, annotations that are submitted by users at time 16 during presentation 302, time 19 during presentation 304, time 20 during presentation 306, time 18 during presentation 308, and time 18 during presentation 310 may all be stored in association with master reference time 16 corresponding to a fourth portion of the content item so that the annotations may be presented during a subsequent presentation of the content item when the fourth portion is presented.

As a further example, master reference time 21 may correspond to reference time 21 of presentation 302, reference time 24 of presentation 304, reference time 25 of presentation 306, reference time 24 of presentation 308, and reference time 24 of presentation 310. Thus, annotations that are submitted by users at time 21 during presentation 302, time 24 during presentation 304, time 25 during presentation 306, time 24 during presentation 308, and time 24 during presentation 310 may all be stored in association with master reference time 21 corresponding to a fifth portion of the content item so that the annotations may be presented during a subsequent presentation of the content item when the fifth portion is presented.

In another use case, with respect to FIG. 3, master reference set 312 may comprise master reference times that correspond to the additional portions of presentations 308 and 310. As an example, annotations that are submitted by users at time 6 during presentation 308 may be stored in association with master reference time 22 (corresponding to the additional portion presented at time 6 during presentation 308) so that the annotations may be presented during a subsequent presentation of the content item (if and) when the additional portion is presented.

As another example, annotations that are submitted by users at time 6 during presentation 310 may be stored in association with master reference time 25 (corresponding to the additional portion presented at time 6 during presentation 310) so that the annotations may be presented during a subsequent presentation of the content item (if and) when the additional portion is presented. In this way, regardless of differences of presentations that may be provided via different content delivery services, a set of annotations submitted for a portion of a content item during prior presentations of the content item may be presented during a subsequent presentation of the content item to a user when the subsequent presentation to the user reaches the reference time corresponding to the portion of the content item for which the set of annotations are submitted.

In some implementations, a first presentation of a content item may be utilized as a reference (e.g., as the master reference) for other presentations of the content item. For example, portions of the content item in the first presentation may be mapped to corresponding portions of the content item in a second presentation. The mapping of the first and second presentations may then be utilized to store annotations inputted during the second presentation in association with reference times corresponding to portions of the content item in the first presentation. When a subsequent presentation of the content item is initiated, the reference times may be utilized to present the annotations when corresponding portions of the content item are presented during the subsequent presentation by mapping the reference times to portions of the content item in the subsequent presentation.

In one scenario, for example, audio content recognition of a portion of a movie may be performed in response to a comment submitted by a user when the portion of the movie was presented to the user. The result of the audio content recognition (e.g., an audio pattern, a visual pattern, or other result) may then be compared to stored reference patterns associated with reference times corresponding to portions of the movie to identify the portion of the movie and the reference time corresponding to that movie portion. Upon identification of the corresponding reference time, the annotation may be stored in association with the reference time so that the reference time may be utilized in the future to present the annotation when the portion of the movie is presented during subsequent presentations of the movie.

According to an aspect of the invention, annotation subsystem 106 may be programmed to receive a first annotation that corresponds to a time at which a first portion of a content item is presented via a first content delivery service, and/or receive a second annotation that corresponds to a time at which the first portion of the content item is presented via a second content delivery service. The first and second annotations may, for example, be received at annotation subsystem 106 from one or more user devices at which the first and second annotations are inputted by one or more users.

In some implementations, the presentation via the first content delivery service may correspond to a first presentation that includes the first portion of the content item. The presentation via the second content delivery service may correspond to a second presentation that includes the first portion of the content item. The first presentation (provided via the first content delivery service) and the second presentation (provided via the second content delivery service) may be the same or different than one another. In one use case, the first presentation may include a first portion of a content item but not a second portion of the content item, while the second presentation may include both the first and the second portions of the content item. As shown in FIG. 3, for example, presentation 302 may not include additional portion 320, while presentation 308 does include additional portion 320.

In another use case, the first presentation may include the first portion of the content item and first auxiliary information (e.g., first advertisement), and the second presentation may include the first portion of the content item and second auxiliary information (e.g., second advertisement). As shown in FIG. 3, for example, presentation 304 may include a first set of auxiliary information 316, while presentation 306 may include a second set of auxiliary information 318.

In various implementations, annotation subsystem 106 may be programmed to initiate storage of the first annotation in association with a first reference time that corresponds to the first portion of the content item, and/or initiate storage of the second annotation in association with the first reference time. In some implementations, annotation subsystem 106 may be programmed to receive a third annotation corresponding to a time at which a second portion of the content item is presented (e.g., via the first content delivery service, the second content delivery service, or a third content delivery service), and initiate storage of the third annotation in association with a second reference time corresponding to the second portion of the content item. In addition, in one implementation, the annotations may be stored in association with other information, such as an identifier of the content item for which the annotation is submitted, identifiers of the sources from which the annotations are received, an identifier of the content delivery service that provided the presentation of the content item during which the annotation is submitted by a user, or other information.

In some implementations, content reference subsystem 108 may be programmed to identify a set of reference times corresponding to portions of the content item. Content reference subsystem 108 may be programmed to identify, based on the set of reference times, the first reference time as a reference time for the first annotation, the first reference time as a reference time for the second annotation, and/or the second reference time as a reference time for the third annotation. Upon identification of the respective reference times, the annotations may be stored in association with the respective reference times and/or other information (e.g., an identifier of the content item, identifiers of the sources from which the annotations are received, an identifier of the content delivery service that provided the presentation of the content item, etc.). As an example, at least one of the first or second presentations of the content item may be associated with another set of reference times that correspond to portions of the first and/or second presentations. As such, content reference subsystem 108 may correlate the identified set of reference times with the other set of reference times to determine a mapping between the reference times of the two different set of reference times. The mapping may then be utilized to identify the first reference time as a reference time for the first annotation, the first reference time as a reference time for the second annotation, and/or the second reference time as a reference time for the third annotation.

In one use case, with respect to FIG. 3, content reference subsystem 108 may utilize the reference times of presentation 302 as at least part of a master set of reference times corresponding to portions of the content item with which other sets of reference times are mapped. For example, annotation subsystem 106 may receive, from user device 104, an annotation inputted via user device 104 during presentation 304 and information indicating that the annotation is associated with reference time 7 of presentation 304 (e.g., the annotation was inputted at time 7 during presentation 304, the annotation was inputted for a portion of presentation 304 that corresponds to time 7, etc.). Content reference subsystem 108 may then identify reference time 6 of presentation 302 as a reference time for the annotation based on a determination that the annotation is associated with reference time 7 of presentation 304. Annotation subsystem 106 may thereafter store the annotation in association with reference time 6.

In certain implementations, first and second annotations may be stored in association with a first reference time corresponding to a first portion of a content item. A third annotation may be stored in association with a second reference time corresponding to a second portion of the content item. As such, in some implementations, annotation subsystem 106 may be programmed to provide, based on the first reference time, the first annotation such that the first annotation is presented when the first portion of the content item is presented during a subsequent presentation of the content item. Annotation subsystem 106 may be programmed to provide, based on the first reference time, the second annotation such that the second annotation is presented when the first portion of the content item is presented during the subsequent presentation. Annotation subsystem 106 may be programmed to provide, based on the second reference time, the third annotation such that the third annotation is presented when the second portion of the content item is presented during the subsequent presentation of the content item.

In various implementations, annotation subsystem 106 may be programmed to identify one or more annotations of a first user regarding a content item, for example, in response to an initiation of a presentation of the content item by a second user associated with the first user (e.g., the second user may be a friend of the first user in a social network, a contact of the first user, or associated with the first user in some manner). In one scenario, interaction monitoring subsystem 112 may detect the initiation of a presentation of the content item by the second user. Upon detection, annotation subsystem 106 may be caused to identify stored annotations of the second user's friends (e.g., including annotations of the first user) in a social network, and transmit the annotations to a user device of the second user for display during the presentation of the content item to the second user.

In certain implementations, interaction monitoring subsystem 112 may be programmed to monitor interactions of users with presentations of a content item, and/or determine a characteristic of the content item based on the interactions. Annotation subsystem 106 may be programmed to generate an annotation for the content item based on the characteristic. In some implementations, content reference subsystem 108 may be programmed to identify, based on the interactions, a reference time for the annotation. Annotation subsystem 106 may be programmed to initiate storage of the annotation in association with the reference time.

As an example, with respect to FIGS. 2 A-2C, interaction monitoring subsystem 112 may determine that a majority of users that watch Content Item 1 activate the "Share Scene" button 212 to share a particular portion (e.g., Portions A, B, C, or other portions) with other users. As a result, annotation subsystem 106 may generate the comment (or annotation) "This portion is frequently shared!" and store the comment in association with a reference time corresponding to the frequently shared portion. Thus, when the frequently shared portion is subsequently presented to other users, the comment that the portion is frequency shared may encourage the other users to share the portion to their contacts.

In another use case, interaction monitoring subsystem 112 may determine that a majority of users skip over a particular scene in a movie when watching the movie. As a result, annotation subsystem 106 may generate the comment (or annotation) "This scene is often skipped over" and store the comment in association with a reference time corresponding to the frequently shared portion. Thus, when the often-skipped-over portion is subsequently presented to other users, the comment that the portion is often skipped over may inform the other users that the portion may not be worth watching.

In another user case, interaction monitoring subsystem 112 may determine that a significant number of a user's "friends" (or other associated set of users) watched a particular episode within a certain time period (e.g., 10% of the user's friends in a social network watched the episode within the last 24 hours). As such, annotation subsystem 106 may generate the comment (or annotation) "This episode has recently been really popular with your friends!" and store the comment in association with the episode. As a result, the comment that the episode has recently been really popular may be presented to the user before, during, or after the user watches the episode. For example, the comment may be presented to the user when the user is deciding what episode to watch, when the user is shown a promotion for the episode, when the user initiates a presentation of the episode, at the end of or after the presentation of the episode, or at other times. Other thresholds of viewership may be used (e.g., 20%, 30%, etc.) to trigger such a comment. Further, a similar comment may be generated based on total viewership (e.g., for all viewers—not necessarily limited to a subset of users (such as friends)).

In another user case, interaction monitoring subsystem 112 may determine that a user has binge-watched every episode of a particular show for season during a weekend. As a result, annotation subsystem 106 may generate a comment (or annotation) indicating that the user has binge-watched every episode of the season during a single weekend, and store the comment in association with one or more of the episodes. Subsequently, when the user's friends watch an episode of the season, they may be presented with the comment to encourage them to continue watching the rest of the episodes of the season, or other comment noting the captivating nature of the show.

Providing Annotations to Social Networking Services

According to an aspect of the invention, users may be enabled to provide annotations received during presentations of a content item (and/or other information related to the content item) to a plurality of social networking services (e.g., FACEBOOK, TWITTER, etc.).

Figure 4A:
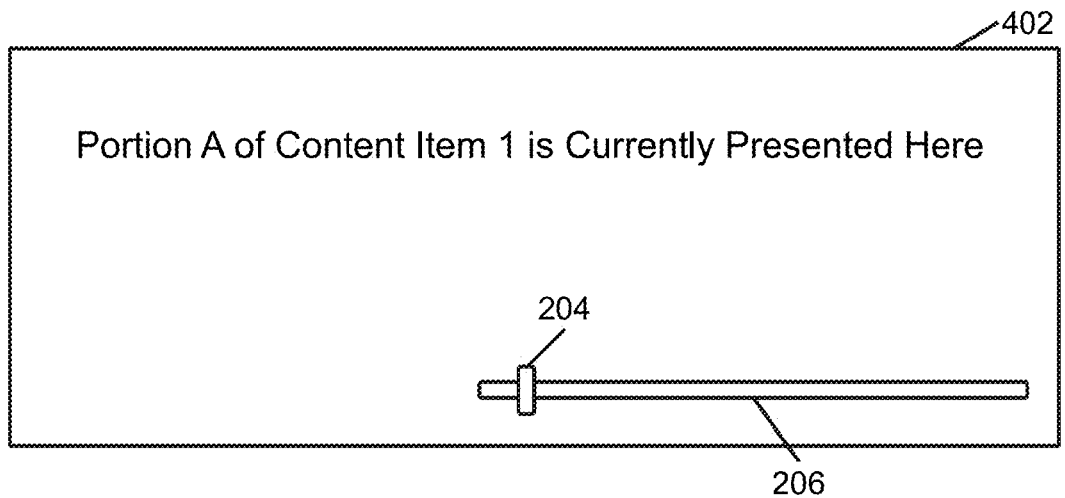
FIGS. 4A-4C are exemplary illustrations of user interfaces for presenting a content item, interacting with the presentation of the content item, and/or interacting with a social networking service, according to aspects of the invention.

In certain implementations, user device 104 may be programmed to initiate a presentation of a content item. For example, with respect to FIGS. 4A-4B, a user may execute an application installed on user device 104 to launch user interface 202. User interface 202 may enable the user to initiate a presentation of a content item on user interface 202 and/or user interface 402 (e.g., using the play feature of the play/pause button 208). In one scenario, for instance, user interface 202 may be used to display and control a presentation of a content item, view annotations corresponding to portions of the content item during the presentation of the content item, input annotations for portions of the content item, or perform other operations.

In another scenario, user interface 402 may be used to display a presentation of a content item, and user interface 202 may enable a second screen experience for the user. For example, user interface 202 may enable the user to control the presentation of the content item (displayed on user interface 402), view annotations corresponding to portions of the content item during the presentation of the content item, input annotations for portions of the content item, or perform other operations. User interface 202 may, for instance, be a user interface that is displayed on user device 104, while user interface 402 may be a user interface that is displayed on another user device.

In various implementations, user device 104 may be programmed to receive a first annotation at a time during which a first portion of the content item is presented, initiate storage of the first annotation in association with a first reference time corresponding to the first portion of the content item, and/or provide the first annotation to a first social networking service. In some implementations, user device 104 may be programmed to receive a second annotation at a time during which a second portion of the content item is presented, initiate storage of the second annotation in association with a second reference time corresponding to the second portion of the content item, and/or provide the second annotation to a second social networking service.

Figure 4B:
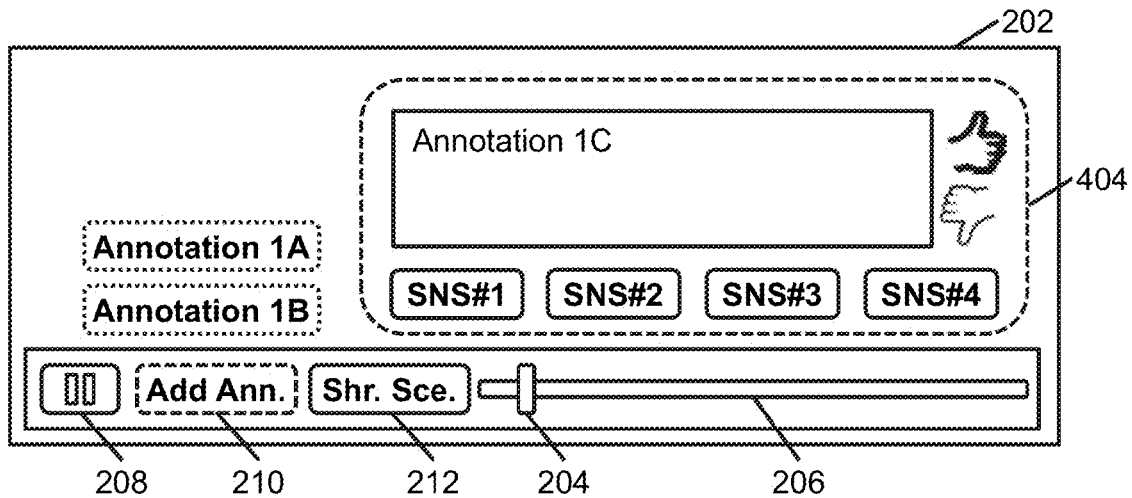
Figure 4C:
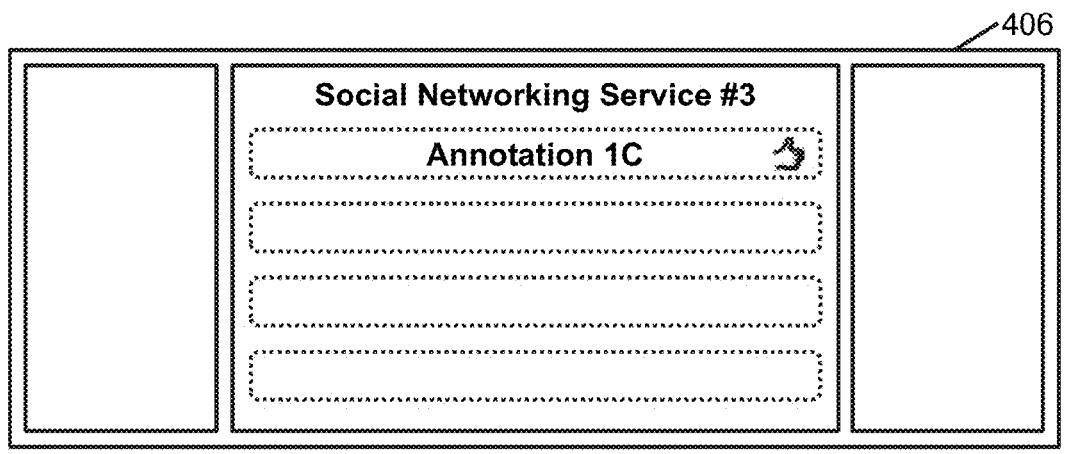

As an example, with respect to FIG. 4B, user interface 202 may provide an "Add Annotation" button 210 that enables a user to submit an annotation corresponding to a portion of Content Item 1 that is currently being presented to the user (e.g., Portions A, B, C, or other portion). Upon activation of button 210, user interface 202 may provide the user with an annotation window 404 where the user may enter the user's reaction to (or comment concerning) a portion of the content item and/or select a thumbs-up or thumbs-down (or other "like" or "dislike" indication) rating for the portion of the content item. Annotation window 404 may further enable the user to submit the annotation comprising at least one of the textual reaction or the thumbs-up/thumbs-down rating to one or more of Social Networking Services #1, 2, 3, 4, etc. In one use case, as illustrated in user interface 406 of FIG. 4C, the user has submitted via user interface 202 both the textual reaction and a thumbs-up rating to Social Networking Service #3. The submission may, for example, cause the textual reaction and the thumbs-up rating to appear on user interface 406 (e.g., the user's page on Social Networking Service #3), along with storage of the textual reaction and the thumbs-up rating in association with a reference time that corresponds to the portion of the content item that was presented to the user when button 210 was activated.

In a further use case, the user in the above example (depicted in FIGS. 4A-4C) may submit another annotation at a later time during the presentation of Content Item 1 by activating the "Add Annotation" button 210 at the later time, and submitting an annotation via annotation window 404. The user may, however, choose to submit the later annotation to another social networking service (e.g., Social Network Services #1, 2, or 4) different than the social networking service to which the earlier annotation was submitted (e.g., Social Networking Service #3). Upon submission by the user, the later annotation may appear on a page (or interface) of the chosen social networking service, as well as stored in association with a reference time that corresponds to the portion of the content item presented at the later time.

In another use case, user interface 202 may enable a user to provide an annotation for a content item (and other information related to the content item) to a social networking service. For example, when a user submits an annotation to a social networking service (e.g., Social Networking Services #1, 2, 3, 4, etc.) during a presentation of the content item, an application associated with user interface 202 may provide the annotation along with an identifier of the user, an identifier of the content item for which the annotation is submitted, an identifier of the content delivery service through which the presentation is provided, a reference time corresponding to a portion of the content item for which the annotation is submitted, a link to the portion of the content item, or other information. As a further example, if a link to the portion of the content item is provided along with the annotation to Social Networking Service #3, the link may be posted along with the annotation on the user's page at Social Networking Service #3. As such, other users having access to the user's page may utilize the link to jump to the portion of the content item using a content delivery service that is available to the other users to see the portion of the content item to which the user's annotation is related.

Sharing Portions of a Content Item

According to an aspect of the invention, a user may share access to portions of a content item across a plurality of content delivery services. For example, a sharing user may share access to a portion of a content item to a recipient user even when the sharing user and the recipient user do not have access to the same content delivery service (e.g., the sharing user uses NETFLIX while the recipient user uses HULU).

In various implementations, content presentation subsystem 116 may be programmed to receive, during a first presentation of a content item via a first content delivery service, a request to provide information to enable access to a first portion of the content item. Content presentation subsystem 116 may be programmed to associate a first reference time with the first portion of the content item. The first reference time may, for example, correspond to a time at which the first portion of the content item is presented via the first content delivery service. Content presentation subsystem 116 may be programmed to generate, based on the first reference time, reference information that enables access to the first portion of the content item in a second presentation of the content item via a second content delivery service.

In some implementations, content presentation subsystem 116 may be programmed to receive the request from a first user device associated with a first user (e.g., user device 104a), and/or provide the reference information to a second user device associated with a second user (e.g., user device 104b) such that the reference information enables the second user to access the first portion of the content item via the second content delivery service. In one use case, the reference information may be independent of the content delivery service that may be used by the second user to access the first portion of the content item. The reference information may, for example, indicate the content item (e.g., content item identifier), the first reference time, the first portion (e.g., scene identifier determined based on the first reference time), or other information. The indication of the content item and at least one of the indications of the first reference time or the first portion may be utilized to access the first portion of the content item via the secondary content delivery service.

In another use case, the reference information may be specific to the second content delivery service (e.g., a direct link to the first portion of the content item stored at the second content delivery service or other reference information). For example, a content item identifier of the content item and the first reference time may be processed to determine a presentation-specific start reference time when the first portion of the content item is presented via the second content delivery service. The reference information may then be generated to indicate the content item, the presentation-specific reference time, the second content delivery service, or other information.

Figure 5A:
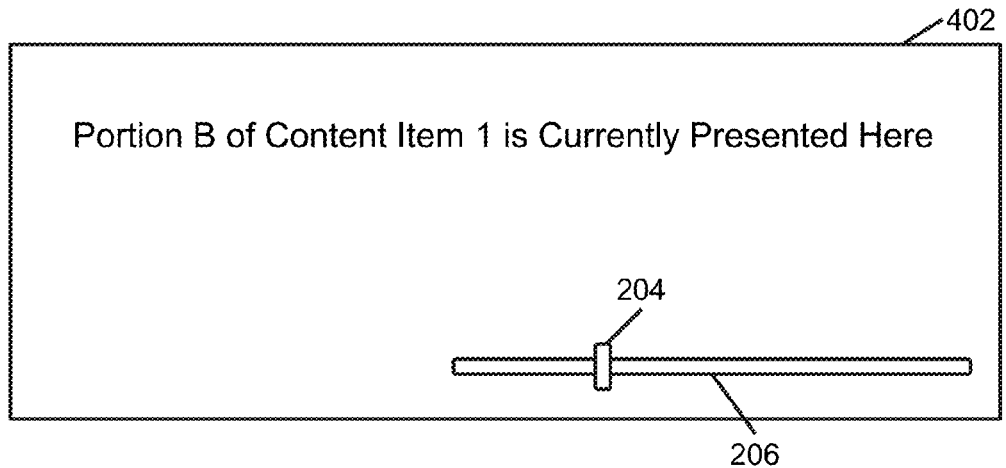
FIGS. 5A-5C are exemplary illustrations of user interfaces for presenting a content item, interacting with the content item, and/or sharing a portion of the content item, according to aspects of the invention.
Figure 5B:
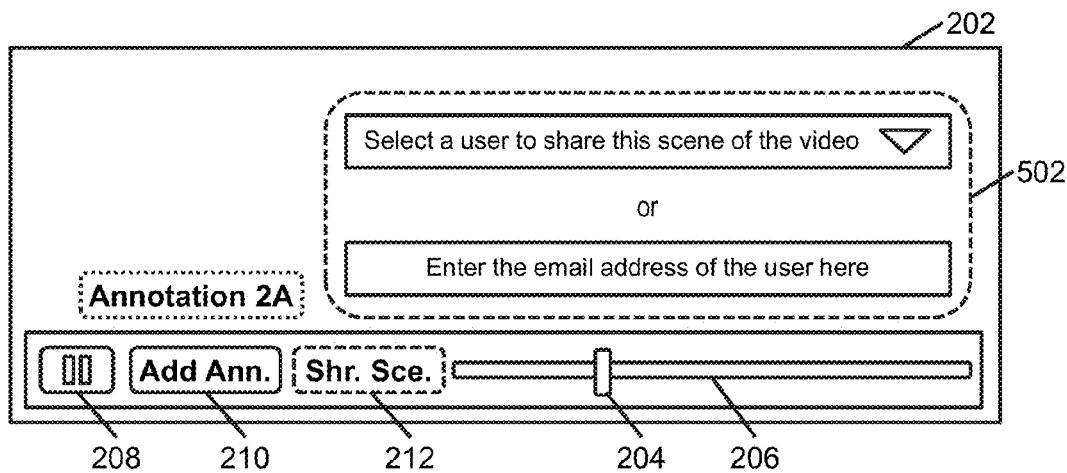
Figure 5C:
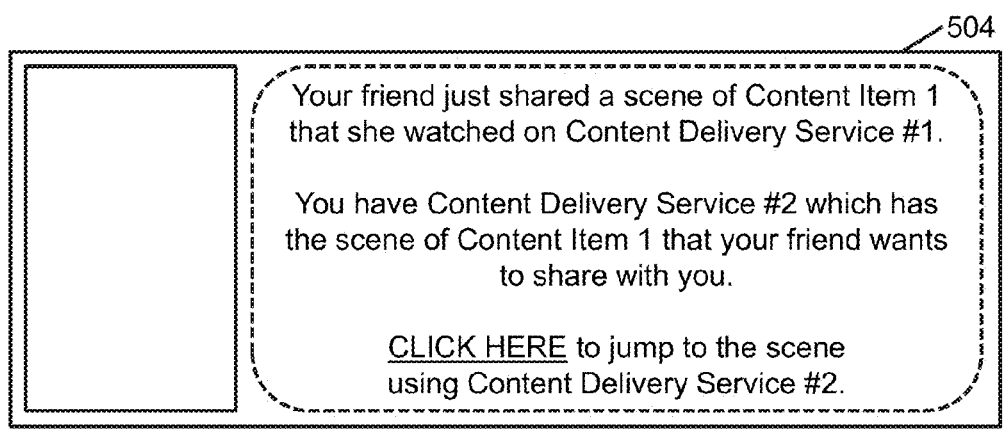

By way of example, with respect to FIGS. 5 A-5B, a presentation of Content Item 1 via Content Delivery Service #1 may be displayed on user interface 202 and/or user interface 402. As shown, in FIG. 5B, user interface 202 may provide a "Share Scene" button 212 that enables a user to share a portion of Content Item 1 with other users. Upon activation of button 212, user interface 202 may provide the user with a recipient selection window 502 where the user may select a recipient user from a drop-down menu, or enter a recipient user's email address.

In one use case, in response to a selection of a recipient user (e.g., using the drop-down menu, the recipient's email address, etc.), user device 104 may generate a request to provide the recipient user with information to enable the recipient user to access Portion B of Content Item 1 (e.g., Portion B was playing or presented when button 212 was activated, Portion B corresponds to a start and/or end time manually entered by the user, etc.). Thereafter, user device 104 may transmit the request to server 202. The request may include an item identifier associated with Content Item 1, a start reference time corresponding to Portion B, an end reference time corresponding to Portion B, a portion identifier associated with Portion B, or other information.

Upon receipt of the request from user device 104, content presentation subsystem 116 may process the request to generate a link (or other reference information) associated with Portion B. The portion link may, for instance, be independent of the content delivery service that the recipient user may utilize to access Portion B. As shown in user interface 504, an automated message comprising a portion link (e.g., the hyperlink embedded in "CLICK HERE") is provided to the recipient user to enable the recipient user to access Portion B of Content Item 1 via Content Delivery Service #2. The portion link may, for instance, include the link "http://CDSIndepentSite.com/[CI1_ID]/[Master_Ref_Time_Corr_To_Portion_B]" or other link. As an example, clicking on the portion link may cause the recipient user's device to execute an application associated with Content Delivery Service #2 and begin rendering a presentation of Content Item 1 at a time corresponding to a start time of Portion B.

In another use case, a selection of a recipient user using user device 104 may be received by user device 104 as a request to provide the recipient user with information to enable the recipient user to access to Portion B of Content Item 1. User device 104 may then generate a link (or other reference information) to Portion B (e.g., a portion link that is independent of the content delivery service that the recipient user may utilize to access Portion B). User device 104 may thereafter transmit the portion link as part of a message (e.g., via email, short message service (SMS), multimedia messaging service (MMS), social networking service, etc.) to the recipient user. The message may comprise the portion link along with other information. As an example, when the recipient user clicks on the portion link, the recipient user's device may execute an application associated with Content Delivery Service #2 and begin rendering a presentation of Content Item 1 at a time corresponding to a start time of Portion B.

As discussed, in some implementations, content presentation subsystem 116 may be programmed to receive, during a first presentation of a content item via a first content delivery service, a request to provide information to enable access to a first portion of the content item. In some implementations, content reference subsystem 108 may be programmed to identify a set of reference times corresponding to portions of the content item (e.g., a master set of reference times). Content reference subsystem 108 may be programmed to identify which reference time of the set of reference times corresponds to the first portion of the content item. Upon identification of the corresponding reference time (for the first portion), reference information that enables access to a second presentation of the content item via a second content delivery service may be generated based on the corresponding reference time.

As an example, at least one of the first or second presentations of the content item may be associated with another set of reference times that correspond to portions of the first and/or second presentations. The identified set of reference times may, for instance, include master reference times that correspond to portions of the content item independently of a content delivery service, while the other set of reference times include reference times that are specific to a presentation of the content item provided via a content delivery service. As such, content reference subsystem 108 may correlate the identified set of reference times with the other set of reference times to determine a mapping between the reference times of the two different set of reference times. The mapping may then be utilized to identify a corresponding master reference for the first portion of the content item.

In one use case, with respect to FIG. 3, content reference subsystem 108 may utilize the reference times of presentation 302 as at least part of a master set of reference times corresponding to portions of the content item with which other sets of reference times are mapped. For example, content presentation subsystem 116 may receive, from user device 104, a request to share a link to a scene of the content item that corresponds to a start time 7 and an end time 8 of presentation 304. Content reference subsystem 108 may identify reference time 6 of presentation 302 as a start reference time for the scene and reference time 7 of presentation 302 as an end reference time for the scene based on a determination that the scene corresponds to start time 7 and end time 8 of presentation 304. An identifier of the content item, reference time 6 of presentation 302, and reference time 7 of presentation 302 may be utilized to generate the scene link.

As discussed, in some implementations, content presentation subsystem 116 may be programmed to generate reference information that is specific to a content delivery service. For example, upon receipt of a request from a first user to provide reference information to enable a second user to access a first portion of a content item, content presentation subsystem 116 may identify a content delivery service through which access to the first portion of the content item is available to a second user. The content delivery service may, for instance, be identified based on a determination that the second user has an account associated with the content delivery service. Content presentation subsystem 116 may be programmed to generate the reference information based on a first reference time corresponding to the first portion of the content item and the identification of the content delivery service.

In one scenario, for example, content presentation subsystem 116 may obtain account information associated with the second user that identifies content delivery service(s) with which the second user has account(s). After determining that the second user has an account with a given content delivery service, content presentation subsystem 116 may generate the reference information specifically for the given content delivery service based on a first reference time corresponding to the first portion of the content item.

Accessing Portions of a Content Item

According to an aspect of the invention, a user may access a portion of a content item via a content delivery service based on reference information. For example, in some implementations, a portion of a content item may be accessed via a content delivery service based on reference information that is independent of the content delivery service to access the portion of the content item. The same reference information may, for example, be utilized to access a portion of a content item via different content delivery services.

In some implementations, user content presentation subsystem 120 may be programmed to receive reference information related to a first portion of a content item. In one implementation, the reference information may be generated based on a user input that occurred during a first presentation of the content item via a first content delivery service (e.g., NETFLIX). The user input and/or a time of the user input may, for example, correspond to a presentation-specific reference time at which the first portion of the content item is presented during the first presentation. The reference information may then be generated based on the presentation-specific reference time to include information indicating the content item (e.g., content item identifier), the first portion (e.g., scene identifier), the presentation-specific reference time, a master reference time corresponding to the presentation-specific reference time, or other information.

In some implementations, user content presentation subsystem 120 may be programmed to identify a second content delivery service (e.g., HULU) through which access to the first portion of the content item (in a second presentation of the content item) is available. User content presentation subsystem 120 may be programmed to provide, based on the reference information, the first portion of the content item (in the second presentation) via the second content delivery service.

In one implementation, for example, the reference information may be generated based on input from a first user during the first presentation of the content item. User content presentation subsystem 120 may be programmed to identify a second user to which the first portion of the content item (in the second presentation) is to be provided. Based on the identification of the second user, user content presentation subsystem 120 may identify the second content delivery service as a content delivery service through which access to the first portion of the first content item (in the second presentation of the first content item) is available to the second user.

As an example, user content presentation subsystem 120 may identify content delivery service(s) with which that the second user has an account. Based on the identified content delivery service(s), user content presentation subsystem 120 may determine which (if any) of the content delivery service(s) provide access to the first portion of the content item. If, for instance, one of the identified content delivery service(s) provide access to the first portion of the content item, then the content delivery service (e.g., the second content delivery service) may be identified as a content delivery service that the second user can use to access the first portion of the content item (e.g., and, thus, available to the second user).

In another implementation, when reference information that is generated based on user input during a first presentation of a content item via a first content delivery service (e.g., NETFLIX) is received, user content presentation subsystem 120 may identify a second content delivery service (e.g., HULU) through which access to the first portion of the content item (in a second presentation of the content item) is available. The first portion of the content item may then be provided via the second content delivery service based on a reference time of the first presentation, a reference time of the second presentation that corresponds to the reference time of the first presentation, or an identifier associated with the first portion of the first content item. As further described in the use cases below, for example, the reference time of the first presentation, the reference time of the second presentation, or the first-portion identifier may be determined from the reference information and utilized to access the first portion of the content item via the second content delivery service.

In one use case, the reference information may include a content item identifier associated with the content item, and a first presentation-specific reference time at which the first portion of the content item is presented during the first presentation. Upon identification of the second content delivery service, user content presentation subsystem 120 may use information indicating the content item to identify a mapping of portions of the first presentation to portions of the second presentation (e.g., the mapping of portions of presentation 302 to portion of presentations 304 in FIG. 3, the mapping of other portions shown in FIG. 3, etc.). The first presentation-specific reference time and the mapping may then be utilized to identify a second presentation-specific reference time at which the first portion of the content item is presented during the second presentation. User content presentation subsystem 120 may execute an application associated with the second content delivery service (e.g., HULU application), and utilize the content item identifier and the second presentation-specific reference time with the application to jump to the first portion of the content item in the second presentation provided via the second content delivery service.

In another use case, the reference information may include an identifier associated with the content item and a scene identifier (or other portion identifier) associated with the first portion of the content item. Upon identifying the second content delivery service for the second user, user content presentation subsystem 120 may execute an application associated with the second content delivery service (e.g., HULU application). User content presentation subsystem 120 may then utilize the content item identifier and the scene identifier with the application to jump to the first portion of the content item in the second presentation provided via the second content delivery service.

Aggregation of Annotations

According to an aspect of the invention, annotations may be aggregated to determine an overall experience of a user or a group of users with various presentation aspects (e.g., portions of a content item, the overall content item, individual annotations, a set of annotations, etc.). The overall experience may then, for example, be displayed to users during a presentation of the portions of the content item, the overall content item, the individual annotations, the set of annotations, etc. In this way, among other benefits, a user may be able to see how other users (e.g., the user's friends, the user's family members, the user's co-workers, users within the user's social network, or all system users, etc.) reacted to various presentation aspects as the user is experiencing the presentation aspects.

In certain implementations, annotation subsystem 106 may be programmed to identify annotations associated with one or more parameters, and/or process the identified annotations to determine one or more statistics with respect to various presentation aspects (e.g., the portions of the content item, the overall content item, the individual annotations, the set of annotations, etc.). The parameters may, for example, include annotation types, sources (e.g., authors or other sources), annotation set identifiers, social distances, user relationship status, spatial proximity, temporal proximity, or other parameters. The parameters may be manually selected by a user, or automatically selected for the user based on configurable system settings.

Figure 6A:
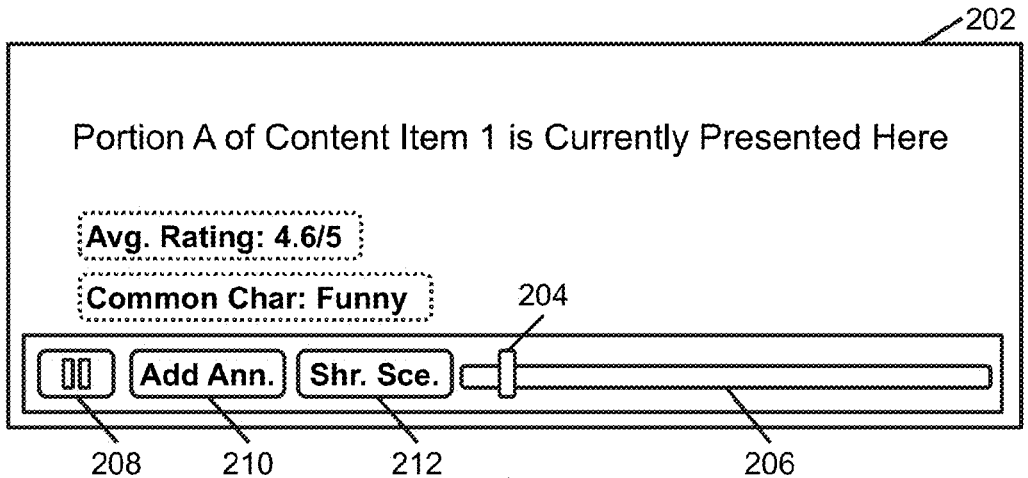
FIGS. 6A-6C are exemplary illustrations of a user interface for textually and/or graphically depicting information related to annotations at different times during a presentation of a content item, according to aspects of the invention.
Figure 6B:
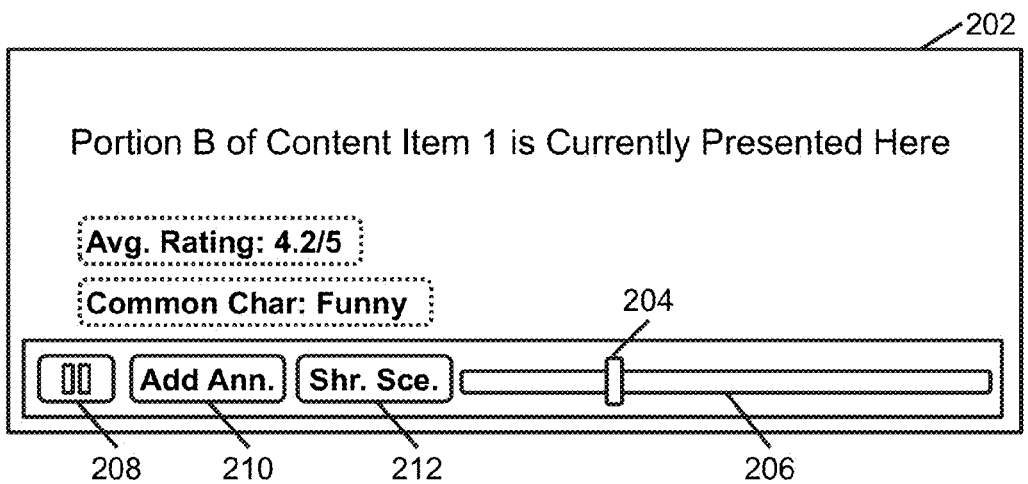
Figure 6C:
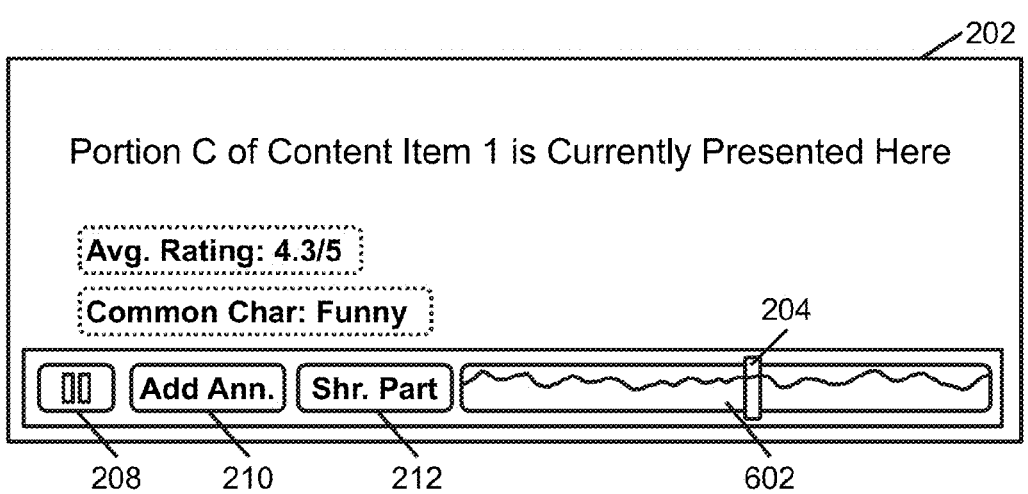

In one use case, as illustrated in FIGS. 6A-6C, annotations may be aggregated based on annotation type. As an example, numerical ratings associated with portions of a content item may be aggregated for each of the portions of the content item, normalized (e.g., a rating based on a 1-10 rating scale may be converted to a rating based on a 1-5 rating scale), and averaged to produce an average rating for each portion. As shown in the interfaces depicted in FIGS. 6A-6C, a first portion of the content item may be associated with an average rating of 4.6/5, a second portion of the content item may be associated with an average rating of 4.2/5, a third portion of the content item may be associated with an average rating of 4.3/5, and so on. It should be appreciated that the foregoing values, ranges, etc., are exemplary in nature, and should not be viewed as limiting.

As another example, comments associated with portions of a content item may be aggregated and analyzed to determine a common characteristic associated with each of the portions of the content item. A characteristic may, for example, be determined to be a common characteristic based on a determination that terms associated with the characteristic are included in the most number of the aggregated comments, that the terms associated with the characteristic appear the most frequently in the aggregated comments, etc. For example, as depicted in FIGS. 6A-6C, the characteristic "funny" is determined to be the most common characteristic for first, second, and third portions (Portions A, B, and C) of the content item. Terms associated with the characteristic "funny" may, for example, include synonyms of "funny" or other related terms.

In another use case, annotations may be aggregated based on authorship. As an example, if a user selects to only be presented with annotations from cast or crew members of a television episode or movie (or other content item) for which the annotations are submitted, then each of the aggregated annotations may be annotations authored by actors, actresses, directors, producers, or other cast or crew members of the television episode or movie.

In another use case, annotations may be aggregated based on social distances between authors of the annotations and a user satisfying a specified social distance threshold. Each of the aggregated annotations may, as an example, be annotations authored by other users that are at most 2 connections away from the user in a social network (e.g., friends of friends, two degrees away, etc.). The social distance threshold may be specified by a user.

In another use case, annotations may be aggregated based on authors of the annotations having a particular relationship with a user. Each of the aggregated annotations may, for example, be annotations authored by other users that are "friends" of the user in a social network (e.g., rather than an "acquaintance," a "colleague," etc.). As used herein, a user relationship (of one user with another user) may refer to one or more definitions of how a user knows, knows of, or is connected to the other user. For example, a first user may have a user relationship with a second user based on the first user being a "friend," "co-worker," "family relative," etc., of the second user. As another example, a first user may have a user relationship with a second user based on the first user "following" the social media posts of the second user, the first user being a "fan" of the second user, etc. The user relationships may be user-defined, or automatically defined.

In another use case, annotations may be aggregated based on authors of the annotations being associated with a location that is a threshold distance away from a user location. Each of the aggregated annotations may, for example, be annotations authored by other users that are currently within a particular distance from the current location of the user, that live within a particular distance from the user's residence, etc.

In another use case, annotations may be aggregated based on the annotations being submitted within a particular time period. As an example, each of the aggregated annotations may be annotations submitted during a time period when the content item was the most popular. Comments (or annotations) that are aggregated may be limited to comments provided when a television episode originally aired (e.g., to exclude comments submitted during re-runs), comments during a time period associated with a season (e.g., during a given season of a television series when the episode first aired), commented provided during a specified date range, etc.

In some implementations, annotation subsystem 106 may be programmed to provide statistics associated with aggregated annotations. For example, the statistics may be presented to a user during a presentation of a content item to the user. In one scenario, as shown in FIG. 6C, statistics, such as an average rating, a common characteristic, etc., may be presented to a user during a presentation of a content item to the user in the form of text.

In another scenario, as depicted on time bar 602 of FIG. 6C, statistics may be graphically presented to a user during a presentation of a content item. As an example, the statistics may be presented in the form of a line graph, a heat map, or other graphical representation. The line graph on time bar 602, a heat map, or other graphical representation may, for instance, depict a degree of a characteristic corresponding to portions of the content item (e.g., a high point on the line graph may indicate a very funny portion, a low point on the graph may indicate a non-funny portion, a hot color on the heat map may indicate a very popular portion, a cold color on the map may indicate an unpopular portion, etc.).

In some implementations, statistics (or other information) associated with aggregated annotations may be provided to various third party entities in exchange for compensation or other reasons. As an example, statistics regarding viewership of a television show (or other content item) or portions thereof may be provided to NIELSEN or other entity.

Filtered Presentation of Content Items

According to an aspect of the invention, portions of a content item may be presented based on annotations for the content item. For example, a presentation of a content item may be based on annotations corresponding to portions of the content item and preferences of a user (e.g., selected by the user, inferred for the user, etc.) related to the content item portions and/or the annotations. In one scenario, for instance, portions of a content item may be removed from a presentation of the content item based on annotations for the portions indicating that the portions do not satisfy conditions related to the user's preferences (e.g., a user preference may indicate an aversion to violence, nudity, profanity, adult themes, etc.). In another scenario, playback of a first set of portions of a content item may be skipped, fast-forwarded, censored, blurred, decreased in volume, or otherwise adjusted during a presentation of the content item based on annotations for the portions of the first set indicating that the portions of the first set do not satisfy conditions related to the user's preferences. Playback of a second set of portions of the content item may be enhanced or occur normally during the presentation of the content item based on annotations for the portions of the second set indicating that the portions of the second set satisfy conditions related to the user's preferences. In this way, among other benefits, annotations for a content item may be utilized to enable a user (or other entity) to control or modify a presentation of the content item. Parents may, for example, censor their children from portions of a content item that are indicated by corresponding annotations as indecent or otherwise not for children, users may set their preferences to skip portions of a content item that are indicated by corresponding annotations as having an undesirable characteristic (e.g., boring, romantic, gruesome, or other characteristics that a user may deem undesirable), etc.

In one example, with respect to FIGS. 6A-6C, annotations corresponding to portions of Content Item 1 may be automatically obtained when a user initiates a presentation of Content Item 1 (e.g., detection of the user's request to play Content Item 1 may trigger a request for the annotations). Playback of scenes of Content Item 1 may be skipped, fast-forwarded, or sped up if the scenes are associated with an average rating of less than 4/5. In another use case, playback of scenes of Content Item 1 may be skipped, fast-forwarded, or sped up if the scenes are not deemed as funny by at least a threshold number (e.g., fixed number or percentage) of users that submit comments for the scenes. Users may, for example, indicate desired ratings (e.g., only 4/5 or higher), threshold numbers, or other parameter via user-configurable settings. Other modification related to the presentation may of course be implemented.

In another example, when a user initiates a presentation of a content item, the user may be presented with a set of tracks (associated with the content item) from which to select. Upon selection of a track, the content item may be presented in accordance with annotations of the selected track. In yet another example, a selection of a track by a user may trigger a presentation of a content item (to which annotations of the track corresponds) to be initiated. Upon initiation, the content item may be presented in accordance with annotations of the selected track.

Filtered Presentation of Annotations

According to an aspect of the invention, annotations may be selectively presented to a user based on one or more parameters. The parameters may, for instance, include annotation types, sources (e.g., authors or other sources), annotation set identifiers, social distances, user relationship status, spatial proximity, temporal proximity, or other parameters. The parameters may be manually selected by a user, or automatically selected.

In various implementations, annotation subsystem 106 may be programmed to provide annotations to user device 104 based on one or more parameters associated with a user. In some implementations, user device 104 may selectively present annotations (e.g., from annotation subsystem 106 or other component) to a user during a presentation of a content item to the user based on one or more parameters associated with the user.

As an example, a user may specify that he/she only desires to be presented with numerical ratings (e.g., out of 5 stars, on a 1-10 scale, etc., as opposed to comments, likes/dislikes, etc.). As such, the user may only be provided with numerical ratings. It should be appreciated that the foregoing values, ranges, etc., are exemplary in nature, and should not be viewed as limiting.

As another example, particular authors of annotations may be selected for a user based on historical information associated with the user. Selected authors may, for instance, be chosen based on a determination that the authors are similar to authors that the user likes (e.g., the selected authors and the authors liked by the user have similar preferences for content items, annotations from the selected authors are similar in character to annotations from the authors liked by the user, etc.). As a result, the user may only be provided with annotations from the selected authors during presentation of a content item.

As another example, a user may specify a social distance threshold (e.g., a number of connections away from the user) that authors of annotations must fall within in order for their annotations to be presented to the user. Thus, the user may only be provided with annotations from authors within the social distance threshold.

Creating Annotation Tracks or Other Annotation Datasets

According to an aspect of the invention, annotation "tracks" or other annotation datasets may be created. By way of example, annotation datasets may each enable access to annotations from one or more sources, annotations that correspond to presentations from one or more content delivery services, annotations that are provided to one or more social networking services, or other annotations. Annotation datasets may, for example, enable annotations corresponding to portions of a content item to be presented when the portions of the content item are presented during a presentation of the content item. In one scenario, for instance, an annotation dataset may include information indicating reference times for annotations to enable the annotations to be presented when the corresponding portions of the content item are presented during the presentation of the content item. Among other benefits, the creation of annotation tracks or other annotation datasets may enable annotations to be packaged and shared as a collection of annotations among users. In addition, the creation of annotation tracks may facilitate the creation of an "author ecosystem" where, for example, users may gain a following or become "trendsetters" based on their tracks. Furthermore, annotation tracks may be provided to one or more third party entities in exchange for compensation or other reasons. As an example, a network may want to re-broadcast a movie (or other content item) with a track of annotations provided by any one or more of the movie's director, actors, or other "insiders" or individuals associated with production of the movie. Other examples may be implemented.

Annotation tracks (or other annotation datasets) may include tracks that are only accessible by a single user (e.g., the user that created the track, a user designated to access the track, etc.), tracks that are only accessible to a group of users (e.g., a user's friend as specified by the user that created the track), tracks that are publically available to all users, etc. In one use case, for example, privacy settings of a user's account may dictate by default how tracks created by the user are shared.

Annotation tracks (or other annotation datasets) may, for example, be created when a user selects or approves annotations to be included in a track, or may be automatically created when the user enters annotations for a content item. Tracks associated with a user may, for instance, be created when the user inputs annotations for a movie or television episode for the first time, and/or updated when the user subsequently inputs annotations while re-watching the movie or television episode. As another example, tracks may be created automatically when a service selects annotations to be included in a track based on one or more parameters. In one scenario, tracks may be created and stored in a database that is searchable by users. In another scenario, tracks may be created on the fly for presentation to a user in response to a track request from the user (e.g., play the movie with a track having the highest rated comments, play the episode with a track having comments that my friends posted since yesterday, etc.).

Tracks may, for example, comprise static tracks or dynamic tracks. A set of annotations that are available via a static track may, for instance, remain the same over time, unless the static track is modified by a user or a service (e.g., a user may be able to add/remove annotations to/from a static track). On the other hand, a set of annotations that are available via a dynamic track may change over time without modification by a user or service. In one use case, the playing of a dynamic track during a presentation of an associated content item may cause annotations to be streamed and presented to a user such that the annotations during a first presentation of the track differ from those during a second presentation of the track. For example, a track that is generated to present the most recent comments (e.g., within the last 7 days, within the last 24 hours, within the last hour, etc.) submitted by a user's friends for a particular episode may include different comments each time the episode is played. The track may, for instance, include a query that searches a database for the most recent comments authored by the user's friends for the episode each time playback of the episode is initiated.

In various implementations, annotation subsystem 106 may be programmed to generate a dataset that enables access to a first annotation corresponding to a first portion of a content item, information indicating a first source of the first annotation (e.g., a user or other source from which the first annotation is received), information indicating a content item with which the first annotation is associated, information indicating a first reference time that corresponds to the first portion of the content item, or other information.

In one implementation, the generated dataset may further enables access to a second annotation corresponding to a second portion of the content item, information indicating the first source as a source of the second annotation, information indicating the content item, information indicating a second reference time that corresponds to the second portion of the content item, or other information. In another implementation, the generated dataset may further enables access to a third annotation corresponding to a third portion of the content item, information indicating a second source of the third annotation, information indicating the content item, information indicating a third reference time that corresponds to the third portion of the content item, or other information.

Figure 7A:
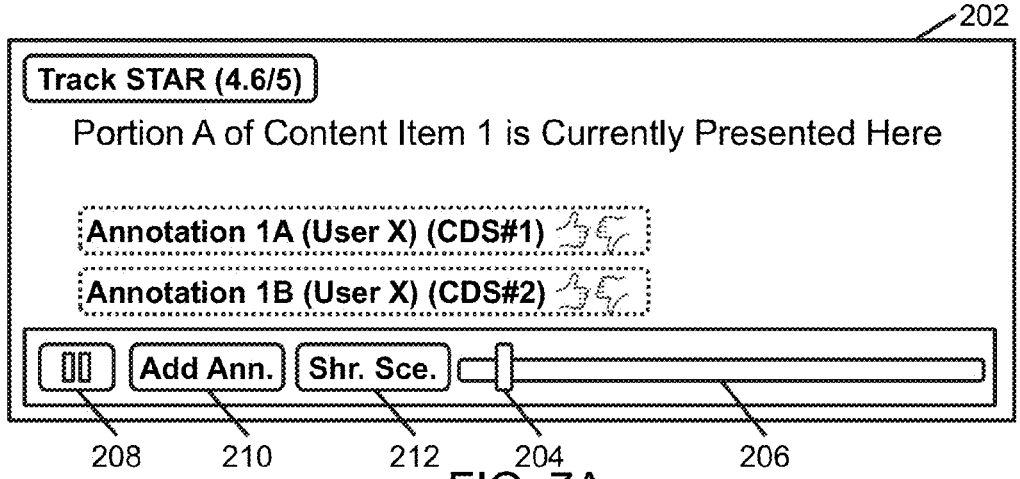
FIGS. 7A-7C are exemplary illustrations of a user interface for presenting a content item and annotations of a dataset related to the content item, according to aspects of the invention.
Figure 7B:
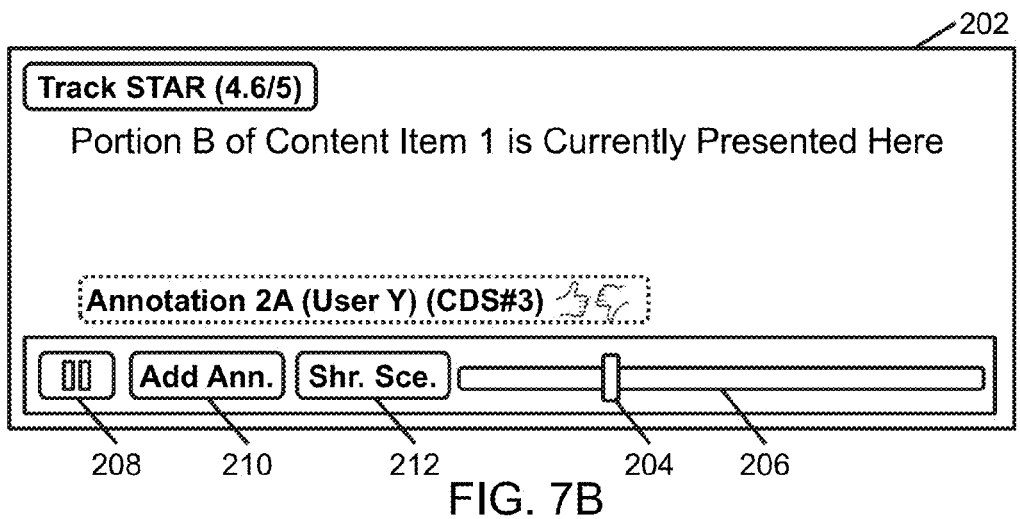
Figure 7C:
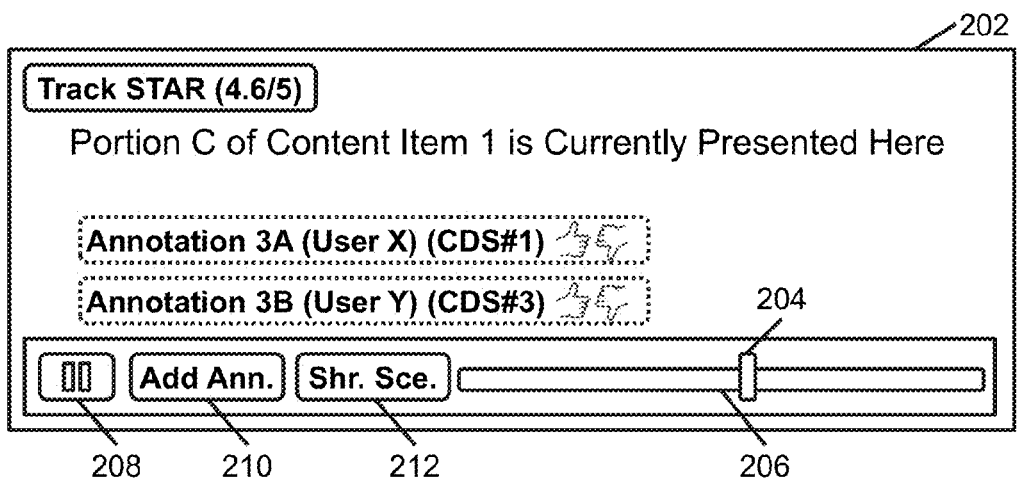

By way of example, as shown in FIGS. 7A-7C, the STAR track may enables access to Annotations 1A, 1B, 2A, 3A, and 3B. The STAR track may also enable access to information which indicates that the annotations are associated with Content Item 1, User X is a source of Annotations 1A, 1B, and 3A, and User Y is a source of Annotations 2A and 3B. The STAR track may further enable access to information which indicates that Annotation 1A and 1B are associated with a first reference time (represented by a first position of control element 204), Annotation 2A is associated with a second reference (represented by a second position of control element 204), and Annotations 3A and 3B are associated with a third reference time (represented by a third position of control element 204).

In one example, as depicted in FIGS. 7A-7C, the STAR track enables Annotations 1A and 1B to be presented when Portion A is presented during the presentation of Content Item 1 (e.g., based on the first reference time corresponding to Portion A), Annotation 2A to be presented when Portion B is presented during the presentation of Content Item 1 (e.g., based on the second reference time corresponding to Portion B), and Annotations 3A and 3B to be presented when Portion C is presented during the presentation of Content Item 1 (e.g., based on the third reference time corresponding to Portion C).

In another example, with respect to FIGS. 7A-7C, Table 1 below is an exemplary depiction of information included in the STAR track. As an example, the STAR track may include annotation identifiers that can be used to obtain the associated annotations from a database when the STAR track is played.

TABLE 1

| Annotation | Reference Time | Content Item | Source | Delivery Service |
|---|---|---|---|---|
| [1A Identifier] | [First Time] | [CI 1 Identifier] | [User X] | [CDS#1 Identifier] |
| [1B Identifier] | [First Time] | [CI 1 Identifier] | [User X] | [CDS#2 Identifier] |
| [2A Identifier] | [Second Time] | [CI 1 Identifier] | [User Y] | [CDS#3 Identifier] |
| [3A Identifier] | [Third Time] | [CI 1 Identifier] | [User X] | [CDS#1 Identifier] |
| [3B Identifier] | [Third Time] | [CI 1 Identifier] | [User Y] | [CDS#3 Identifier] |
| ... | ... | ... | ... | ... |

In yet another example, with respect to FIGS. 7A-7C, Table 2 below is another exemplary depiction of information included in the STAR track. As shown in Table 2, the STAR track may include the content of the annotations.

TABLE 2

| Annotation | Reference Time | Content Item | Source | Delivery Service |
|---|---|---|---|---|
| [Content for 1A] | [First Time] | [CI 1 Identifier] | [User X] | [CDS#1 Identifier] |
| [Content for 1B] | [First Time] | [CI 1 Identifier] | [User X] | [CDS#2 Identifier] |
| [Content for 2A] | [Second Time] | [CI 1 Identifier] | [User Y] | [CDS#3 Identifier] |
| [Content for 3A] | [Third Time] | [CI 1 Identifier] | [User X] | [CDS#1 Identifier] |
| [Content for 3B] | [Third Time] | [CI 1 Identifier] | [User Y] | [CDS#3 Identifier] |
| ... | ... | ... | ... | ... |

In certain implementations, annotation subsystem 106 may be programmed to receive a request to generate a track. The request to generate the track may include information that indicates annotations for inclusion in the track. As an example, the request may indicate annotations that are selected by a user for inclusion in the track. As such, the track may be generated to enable access to the selected annotations along with other information that enable the selected annotations to be presented when corresponding portions of a content item are presented during a presentation of the content item.

As another example, the request may indicate a content item for which the track is targeted, a source indicating the origin of the annotations (e.g., an author of the annotations or other source), or other parameters. In response to the request, annotations associated with the content item and the source may be obtained to generate the track.

In one use case, a user may submit a request to generate a track that includes annotations associated with a content item that are authored by a particular person, whether it be an individual associated with the production of the content item (e.g., an actor, a director, a producer, etc.), or a viewer or consumer of the content item, such as a member of the user's social group (e.g., the user's friends, the user's colleagues, etc.). With respect to FIGS. 7A-7C, for example, User X may be an actor that stars in the content item, and User Y may be a member of the user's social group. In response to the request, Annotations 1A, 1B, 2A, 3A, 3B, and other annotations may be obtained to generate the STAR track.

In various implementations, annotation subsystem 106 may be programmed to receive, from a user, a request to search for a track. The request may, for example, include a query that comprises keywords or other parameters (e.g., annotation types, sources, social distances, user relationship status, spatial proximity, temporal proximity, etc.). Annotation subsystem 106 may be programmed to process the request to identify a first track in a database based on the keywords or other parameters, after which the first track may be provided to the user.

As an example, a user may submit a query for tracks by entering the question "What tracks are available for season #1, episode #6, of Family Guy?" As a result, annotation subsystem 106 may process the query, identify tracks for season #1, episode #6, of Family Guy in a database, and provide the identified tracks to the user. Other examples of queries may include queries related to inputs, such as "Show me directors' or actors' tracks for Movie X," "Show me the highest rated track for Television Show Y," "Show me tracks by Famous Person Z," "Show me tracks for Movie X that are rated PG-13," "Show me tracks by members of my social group," or other inputs. Any number and type of queries may be used.

In some implementations, ratings, feedback, or classification of tracks may be facilitated. For example, annotation subsystem 106 may be programmed to enable users to rate tracks or provide other feedback about the tracks. As an example, ratings or other feedback provided by users regarding a track may, for instance, be aggregated to determine an overall rating for the track (e.g., average rating, total number of "likes," etc.) or other statistical information regarding the track (e.g., commonly characterized as "funny" and "interesting," highly enjoyed by women between 18-30, a favorite among a user's friends, etc.). In one use case, as shown in FIGS. 7A-7C, the STAR track may be associated with an average rating of 4.6/5. The average rating may, for instance, be an average of all the ratings given to the STAR track by users in general or by a particular set of users (e.g., a user's friends, users with a certain level of status, etc.). It should be appreciated that the foregoing values, ranges, etc., are exemplary in nature, and should not be viewed as limiting.

In another implementation, annotation subsystem 106 may be programmed to infer ratings or other feedback for tracks. As an example, in one scenario, a track may be characterized as "popular" based on a determination that the track has been downloaded/streamed by users a threshold number of times, or that the track has been downloaded/streamed more times than a majority of other tracks. In another scenario, a track may be characterized as "cheerful" based on an analysis of the content of the annotations in the track indicating that many of the annotations include cheerful messages. Other characterization (e.g., positive, negative, angry, etc.) may of course be utilized without limitation.

As another example, characteristics may be inferred for a track based on reactions associated with ratings or feedback of the track. In some implementations, interaction monitoring subsystem 112 may be programmed to identify a reaction associated with a rating or feedback of a track. Annotation subsystem 106 may be programmed to determine a characteristic for the track based on the reaction, and/or associate the characteristic with the track.

In one example, with respect to FIGS. 7A-7C, users may submit a rating for each of the annotations of a track (e.g., thumbs-up/thumbs-down, like/dislike, etc.). If, for example, at least a threshold number (e.g., fixed number or percentage) of the annotations of the STAR track are collectively rated by a threshold number of users, and the number of positive ratings is 1% to 100% greater than the number of negative ratings, the STAR track may be associated with the characteristic of "more positive than not." If the threshold numbers are satisfied, and the number of positive ratings is 101% to 300% greater than the number of negative ratings, the STAR track may be associated with the characteristic of "well-liked." If the threshold numbers are satisfied, and the number of positive ratings is over 300% greater than the number of negative ratings, the STAR track may be associated with the characteristic of "superb." It should be appreciated that the foregoing track descriptors, values, ranges, etc., are exemplary in nature, and should not be viewed as limiting.

In another use case, users may reply to annotations of a track during presentation of a content item and the track. Each of the replies to an annotation may be analyzed to determine one or more characteristics associated with the annotation. Based on the annotation characteristics, one or more characteristics may be determined for (and associated with) the overall track. As an example, an annotation in a track may be may be characterized as "funny" when a reply to the annotation includes terms associated with the characteristic "funny." The track may be characterized as "funny" when a threshold number of the annotations in the track are characterized as "funny."

In another implementation, account subsystem 110 may be programmed to enable users to rate or provide other feedback about one another, and/or infer ratings or other feedback for a user. In one use case, for example, account subsystem 110 may enable users to submit ratings regarding other users. The ratings regarding a user may, for instance, be aggregated to determine statistics for the user (e.g., an average rating of the user, a number of likes vs. dislikes, etc.). In another use case, account subsystem 110 may infer ratings or other feedback about a user based on ratings or other feedback that other users submitted for annotations created by the user created, tracks created by the user, etc.

Incentivizing Creation of Annotations

According to an aspect of the invention, a database of annotations may be generated by incentivizing users to create annotations. By way of example, users may be provided with rewards for the creation of annotations, interactions with the annotations, creating annotations that enable transaction via the annotations, or other reasons. In this way, among other benefits, users may be encouraged to create annotations that include quality feedback for content items with which others will positively interact, annotations that enable transactions to facilitate revenue earnings, or annotations that offer other benefits.

In certain implementations, annotation subsystem 106 may be programmed to receive an annotation by a user. The annotation may, for instance, correspond to a time at which a portion of a content item is presented. Account subsystem 110 may be programmed to associate the annotation with a user account (associated with the user). Reward subsystem 114 may be programmed to determine a reward to be provided (or credited) to the user account based on the receipt of the first annotation. As an example, a user may be compensated when the user creates annotations (e.g., 1 cent for every 20 annotations created, 1 point for each annotation created, etc.), when other users interact with the annotations created by the user, or when other conditions for rewards are satisfied. It should be appreciated that the foregoing values, reward types, etc., are exemplary in nature, and should not be viewed as limiting.

In some implementations, interaction monitoring subsystem 112 may be programmed to monitor interactions with an annotation associated with a user account (e.g., interactions by a user of the user account, interaction by other users, etc.). The monitored interactions may, for example, include access of the annotation (e.g., viewing the annotation, listening to the annotation, etc.) during a presentation of an associated content item, reactions by users to the annotation (e.g., rating the annotation, replying to the annotation, etc.), execution of transactions enabled via the annotation, or other interactions. Reward subsystem 114 may be programmed to determine a reward to be provided (or credited) to the user account based on the interactions.

In one implementation, interaction monitoring subsystem 112 may be programmed to identify requests by one or more users for an annotation associated with a user account (e.g., requests by other users for the annotation). Reward subsystem 114 may be programmed to determine a reward to be provided (or credited) to the user account based on the requests. The requests may, for example, include requests to be exposed to the annotation, to include the annotation in an annotation track, or other requests. In one scenario, an authoring user of comments may be rewarded based on the exposure of the comments to other users (e.g., 1 cent for every 100 comment views, 1 point for each comment view, etc.). In another scenario, a threshold number of comment views may need to be satisfied before the authoring user may begin to be compensated. In a further scenario, the authoring user may be provided with a first type of reward (e.g., points that cannot be exchanged for real world money) until the authoring user obtains a particular status (e.g., Silver status, Gold status, etc.) that is achieved when a threshold number of comment views is satisfied. After the threshold number of comment views is satisfied, the authoring user may be provided with a second type of reward (e.g., real world money, points that can be exchanged for real world money, etc.). It should be appreciated that the foregoing values, reward types, etc., are exemplary in nature, and should not be viewed as limiting.

In another implementation, interaction monitoring subsystem 112 may be programmed to identify reactions of one or more users to a comment associated with a user account (e.g., reactions of other users to the comment). Reward subsystem 114 may be programmed to determine a reward to be provided (or credited) to the user account based on the reactions. The reactions may, for example, include a rating of the comment, a reply to the comment, or other reactions to the comment. In one use case, an authoring user of comments may be rewarded based on ratings given to the comments by other users (e.g., $1 for every 10 four-star (or higher) ratings given to the comments, 1 point for each "like" given to the comments, etc.). In another use case, an authoring user of comments may be rewarded based on replies to the comments by other users (e.g., $1 for every 10 replies, 1 point for each reply, etc.). It should be appreciated that the foregoing values, reward types, etc., are exemplary in nature, and should not be viewed as limiting.

Figure 8A:
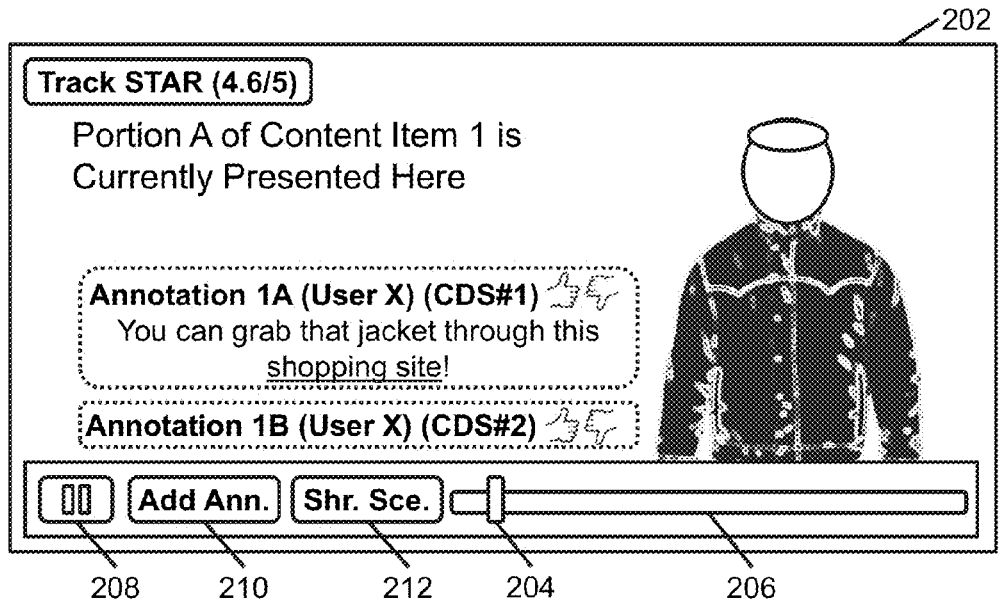
FIGS. 8A-8B are exemplary illustrations of a user interface that depicts mechanisms in annotations that enable transactions related to products or services, according to aspects of the invention.
Figure 8B:
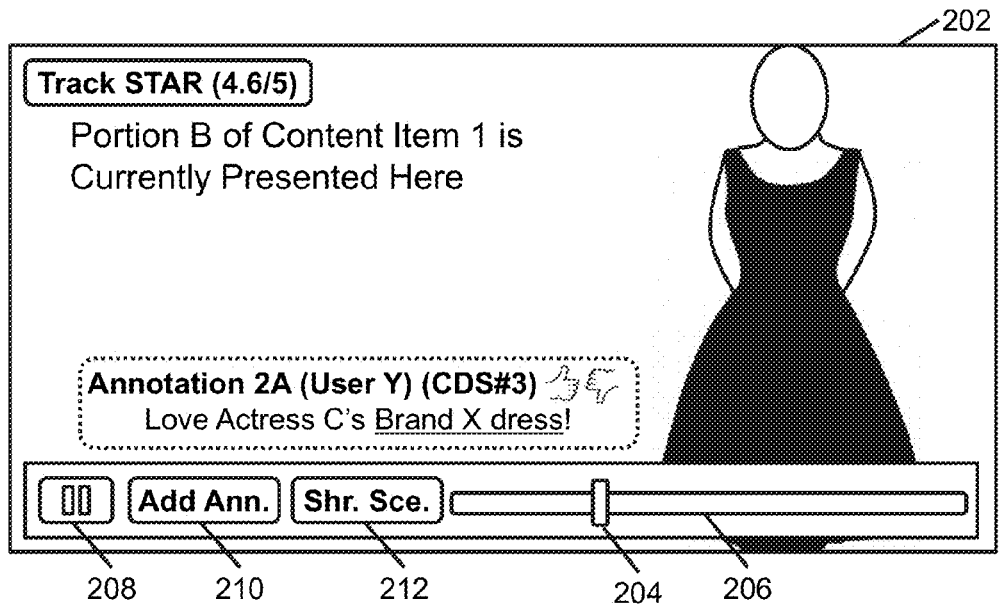

In another implementation, interaction monitoring subsystem 112 may be programmed to identify an exposure of a promotion related to a product or service to one or more users via a comment associated with a user account (e.g., viewing a product/service promotion via the comment, listening to a product/service promotion via the comment, etc.). Reward subsystem 114 may be programmed to determine a reward to be provided (or credited) to the user account based on the exposure. The promotion may, for example, relate to a product or service that appears in a portion of a content item to which the comment corresponds. In one scenario, an authoring user of comments may be rewarded for including, in a comment, a reference to a product or service that is depicted in a portion of a television episode (corresponding to the comment) by compensating the authoring user when the reference to the product or service is exposed to other users. For example, with respect to FIG. 8A, User X may be compensated for including in Annotation 1A a reference to a jacket that is depicted in Portion A of Content Item 1 when the reference is exposed to other users. As indicated in FIG. 8B, User Y may be compensated for including in Annotation 2A a reference to a Brand X dress that is depicted in Portion B of Content Item 1 when the reference is exposed to other users.

In another implementation, interaction monitoring subsystem 112 may be programmed to identify use of a mechanism (via a comment associated with a user account) that enables execution of a transaction related to a product or service (e.g., accessing a shopping site via a link in the comment). Reward subsystem 114 may be programmed to determine a reward to be provided (or credited) to the user account based on the use of the mechanism. The transaction may, for example, relate to a product or service that appears in a portion of a content item to which the comment corresponds. In one use case, an authoring user of a comment may be rewarded based on execution of a mechanism in the comment that enables execution of a transaction. For example, with respect to FIG. 8A, User X may be compensated for including in Annotation 1A a link to a shopping site through which a jacket depicted in Portion A of Content Item 1 may be purchased when the link is clicked (or otherwise executed). As indicated in FIG. 8B, User Y may be compensated for including in Annotation 2A a link to a product page of a shopping site through which a Brand X dress depicted in Portion B of Content Item 1 may be purchased when the link is clicked (or otherwise executed).

In another implementation, interaction monitoring subsystem 112 may be programmed to identify an execution of a transaction related to a product or service that is enabled via a comment associated with a user account (e.g., purchasing of a product, a user sign-up with a service, etc.). Reward subsystem 114 may be programmed to determine a reward to be provided (or credited) to the user account based on the execution of the transaction. The transaction may, for example, relate to a product or service that appears in a portion of a content item to which the comment corresponds. In one use case, an authoring user of a comment may be rewarded based on execution of transactions that are enabled via the comment. For example, with respect to FIG. 8A, User X may be compensated for including in Annotation 1A a reference (e.g., a link) to a shopping site through which a jacket depicted in Portion A of Content Item 1 may be purchased when the jacket is purchased by other users using the reference to the shopping site. With respect to FIG. 8B, User Y may be compensated for including in Annotation 2A a reference to a product page of a shopping site through which a Brand X dress depicted in Portion B of Content Item 1 may be purchased when the dress is purchased by other users using the reference to the product page.

In some implementations, annotation subsystem 106 may be programmed to identify a reference associated with a product or service in a comment associated with a user account. Annotation subsystem 106 may be programmed to provide a mechanism in the comment to enable a transaction related to the product or service. The reference may, for example, include a product/service identifier, a product/service type identifier, a link to a website through which the transaction related to the product or service may be executed, or other reference. In one scenario, with respect to FIG. 8A, User X may include in Annotation 1A a hyperlink to a shopping site through which a jacket that is depicted in Portion A of Content Item 1 may be purchased. Upon identification of the shopping site hyperlink, annotation subsystem 106 may modify the hyperlink to include an affiliate code associated with reward subsystem 114 (or an entity associated with reward subsystem 114). As such, when the jacket is purchased through the modified hyperlink, an account associated with reward subsystem 114 (or the entity associated with reward subsystem 114) may be provided with a portion of the revenue from the purchase of the jacket. Reward subsystem 114 may detect that the jacket purchase was made through the modified hyperlink, and compensate User X for including the original hyperlink to the shopping site in Annotation 1A.

In another scenario, with respect to FIG. 8B, User Y may include the term "Brand X dress" in Annotation 2A without a link to a shopping site through which the Brand X dress depicted in Portion B of Content Item 1 may be purchased. Nevertheless, upon identification of the term "Brand X dress" and that a dress is depicted in Portion B of Content Item 1, annotation subsystem 106 may add a hyperlink, including an affiliate code associated with reward subsystem 114 (or an entity associated with reward subsystem 114), for the dress's product page on the shopping site to Annotation 2A. As such, when the dress is purchased through the hyperlink, an account associated with reward subsystem 114 (or the entity associated with reward subsystem 114) may be provided with a portion of the revenue from the purchase of the dress. Reward subsystem 114 may detect that the dress purchase was made through the hyperlink, and compensate User Y for including the term "Brand X dress" in Annotation 2A.

Incentivizing Creation of Annotation Datasets

According to an aspect of the invention, a database of annotation datasets (or tracks) may be facilitated by incentivizing users to create tracks. By way of example, users may be provided rewards for creation of tracks, interactions with the tracks, enabling of transactions via the tracks, or for other reasons. In this way, among other benefits, users may be encouraged to create tracks that include quality annotations, tracks that enable transactions to facilitate revenue earnings, or tracks that offer other benefits.

In certain implementations, account subsystem 110 may be programmed to associate a track created by a user with a user account associated with the user. Reward subsystem 114 may be programmed to determine a reward to be provided (or credited) to the user account based on the creation of the track. The track may, for example, enable access to comments corresponding to portions of a content item, information that allows the comments to be presented when the corresponding portions are presented during a presentation of the content item, or other information.

In some implementations, interaction monitoring subsystem 112 may be programmed to monitor interactions with a track associated with a user account (e.g., interactions by a user of the user account, interaction by other users, etc.). The monitored interactions may, for example, include access of the track (e.g., downloading the track, viewing the comments in the track, listening to the comments in the track, etc.), reactions by users to the track (e.g., rating the track, rating comments of the track, replying to comments in the track, etc.), execution of transactions enabled via the track, or other interactions. Reward subsystem 114 may be programmed to determine a reward to be provided (or credited) to the user account based on the interactions.

In one implementation, interaction monitoring subsystem 112 may be programmed to identify requests by one or more users for a track associated with a user account (e.g., requests by other users for the track). Reward subsystem 114 may be programmed to determine a reward to be provided (or credited) to the user account based on the requests. The requests may, for example, include requests to access the track. In one scenario, a creating user of tracks may be rewarded based on requests by other users to access the tracks (e.g., 1 cent for each track access, 1 point for each track access, etc.). In another scenario, a threshold number of track accesses may need to be satisfied before the creating user may begin to be compensated. In a further scenario, the creating user may be provided with a first type of reward (e.g., points that cannot be exchanged for real world money) until the creating user obtains a particular status (e.g., Silver status, Gold status, etc.) that is achieved when a threshold number of track accesses is satisfied. After the threshold number of track accesses is satisfied, the creating user may be provided with a second type of reward (e.g., real world money, points that can be exchanged for real world money, etc.). It should be appreciated that the foregoing values, reward types, etc., are exemplary in nature, and should not be viewed as limiting.

In another implementation, interaction monitoring subsystem 112 may be programmed to identify reactions of one or more users to a track associated with a user account (e.g., reactions of other users to the track). Reward subsystem 114 may be programmed to determine a reward to be provided (or credited) to the user account based on the reactions. The reactions may, for example, include a rating of the track, ratings of comments of the track, a reply to a comment of the track, or other reactions to the track. In one use case, a creating user of a track may be rewarded based on ratings given to the track (e.g., $1 for every 10 four-star (or higher) ratings given to the track, 1 point for each "like" given to the track, etc.). In another use case, a creating user of a track may be rewarded based on ratings given to comments of the track by other users (e.g., 10 cents for every 10 four-star (or higher) ratings given to the comments, 1 point for every 10 "likes" given to the comments, etc.). In another use case, a creating user of a track may be rewarded based on replies to comments of the track by other users (e.g., 1 cent for each reply, 1 point for each reply, etc.). It should be appreciated that the foregoing values, reward types, etc., are exemplary in nature, and should not be viewed as limiting.

In another implementation, interaction monitoring subsystem 112 may be programmed to identify an exposure of a promotion related to a product or service to one or more users via an track associated with a user account (e.g., viewing a product/service promotion via the track, listening to a product/service promotion via the track, etc.). Reward subsystem 114 may be programmed to determine a reward to be provided (or credited) to the user account based on the exposure. The promotion may, for example, relate to a product or service that appears in a portion of a content item to which a comment of the track corresponds. In one scenario, a creating user of a track may be rewarded for including, in the track, a comment having a reference to a product or service that is depicted in a portion of a television episode (corresponding to the comment) by compensating the creating user when the reference to the product or service is exposed to other users. For example, with respect to FIG. 8A, a creating user of the STAR track (e.g., a user that generated the STAR track) may be compensated for including Annotation 1A in the STAR track when a reference to a jacket that is depicted in Portion A of Content Item 1 is exposed to other users. As another example, with respect to FIG. 8B, the creating user may be compensated for including Annotation 2A in the STAR track when a reference to a Brand X dress that is depicted in Portion B of Content Item 1 is exposed to other users.

In another implementation, interaction monitoring subsystem 112 may be programmed to identify use of a mechanism (via a comment in a track associated with a user account) that enables execution of a transaction related to a product or service (e.g., accessing a shopping site via a link in the comment). Reward subsystem 114 may be programmed to determine a reward to be provided (or credited) to the user account based on the use of the mechanism. The transaction may, for example, relate to a product or service that appears in a portion of a content item to which the comment corresponds. In one use case, a creating user of a track may be rewarded based on execution of a mechanism in a comment of the track that enables execution of a transaction. For example, with respect to FIG. 8A, a creating user of the STAR track may be compensated for including Annotation 1A in the STAR track when a link to a shopping site through which a jacket depicted in Portion 1A of Content Item may be purchased is clicked (or otherwise executed). As another example, with respect to FIG. 8B, the creating user may be compensated for including Annotation 2A in the STAR track when a link to a product page of a shopping site through which a Brand X dress depicted in Portion B of Content Item 1 may be purchased when the link is clicked (or otherwise executed).

In another implementation, interaction monitoring subsystem 112 may be programmed to identify an execution of a transaction related to a product or service that is enabled via a track associated with a user account (e.g., purchasing of a product, a user sign-up with a service, etc.). Reward subsystem 114 may be programmed to determine a reward to be provided (or credited) to the user account based on the execution of the transaction. The transaction may, for example, relate to a product or service that appears in a portion of a content item to which a comment of the track corresponds. In one use case, a creating user of a track may be rewarded based on execution of transactions that are enabled via comments in the track. For example, with respect to FIG. 8A, a creating user of the STAR track may be compensated for including Annotation 1A in the STAR track when the jacket depicted in Portion A of Content Item 1 is purchased by other users using a reference (e.g., a link) to a shopping site that sells the jacket. As another example, with respect to FIG. 8B, a creating user of the STAR track may be compensated for including Annotation 2A in the STAR track when the dress depicted in Portion B of Content Item 1 is purchased by other users using a reference to a product page of a shopping site that sells the dress.

In some implementations, annotation subsystem 106 may be programmed to identify a reference associated with a product or service in a comment of a track associated with a user account. Annotation subsystem 106 may be programmed to provide a mechanism in the track (e.g., in the comment having the reference, in a reply to the comment, in another comment in the track, etc.) to enable a transaction related to the product or service. The reference may, for example, include a product/service identifier, a product/service type identifier, a link to a website through which the transaction related to the product or service may be executed, or other reference. In one scenario, with respect to FIG. 8A, Annotation 1A (which is accessible via the STAR track) may include a hyperlink to a shopping site through which a jacket that is depicted in Portion A of Content Item 1 may be purchased.

Upon identification of the shopping site hyperlink, annotation subsystem 106 may modify the hyperlink to include an affiliate code associated with reward subsystem 114 (or an entity associated with reward subsystem 114). As such, when the jacket is purchased through the modified hyperlink, an account associated with reward subsystem 114 (or the entity associated with reward subsystem 114) may be provided with a portion of the revenue from the purchase of the jacket. Reward subsystem 114 may detect that the jacket purchase was made through the modified hyperlink, and compensate a creating user of the STAR track for Annotation 1A in the STAR track.

In another scenario, with respect to FIG. 8B, Annotation 2A (which is accessible via the STAR track) may include the term "Brand X dress" without a link to a shopping site through which the Brand X dress depicted in Portion B of Content Item 1 may be purchased. Nevertheless, upon identification of the term "Brand X dress" and that a dress is depicted in Portion B of Content Item 1, annotation subsystem 106 may add a hyperlink, including an affiliate code associated with reward subsystem 114 (or an entity associated with reward subsystem 114), for the dress's product page on the shopping site to Annotation 2A. As such, when the dress is purchased through the hyperlink, an account associated with reward subsystem 114 (or the entity associated with reward subsystem 114) may be provided with a portion of the revenue from the purchase of the dress. Reward subsystem 114 may detect that the dress purchase was made through the hyperlink, and compensate a creating user of the STAR track for including Annotation 2A in the STAR track.

Managing Replies or Other Reactions to Annotations

According to an aspect of the invention, replies or other reactions to annotations may be handled in a number of ways.

In various implementations, replies or other reactions to annotations may be stored in association with the annotations. For example, in some implementations, annotation subsystem 106 may be programmed to obtain a first annotation corresponding to a portion of a content item. The first annotation may, for instance, be received at a time which the portion of the content item is presented during a first presentation of the content item, and stored in a database so that the first annotation may be subsequently obtained from the database. Annotation subsystem 106 may be programmed to provide the first annotation to enable the first annotation to be presented with the portion of the content item during a second presentation of the content item. Annotation subsystem 106 may be programmed to receive, during the second presentation, a second annotation as a reaction (or reply) to the first annotation. Upon receipt of the second annotation, annotation subsystem 106 may initiate storage of the second annotation in association with the first annotation.

Figure 9A:
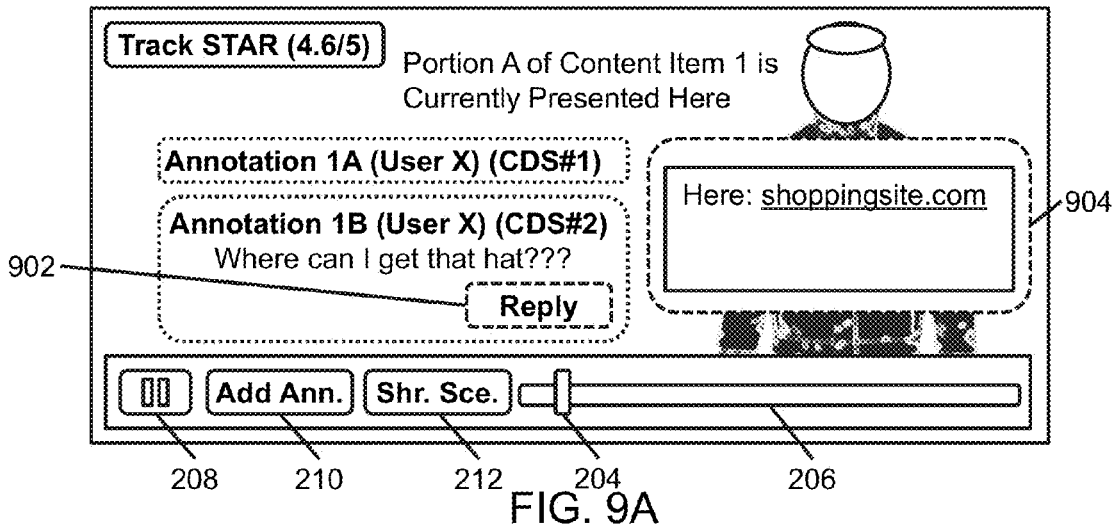
FIGS. 9A-9C are exemplary illustrations of a user interface for enabling reactions to annotations and/or initiating a message thread via a social networking service, and a user interface for interacting with the message thread via the social networking service, according to aspects of the invention.
Figure 9B:
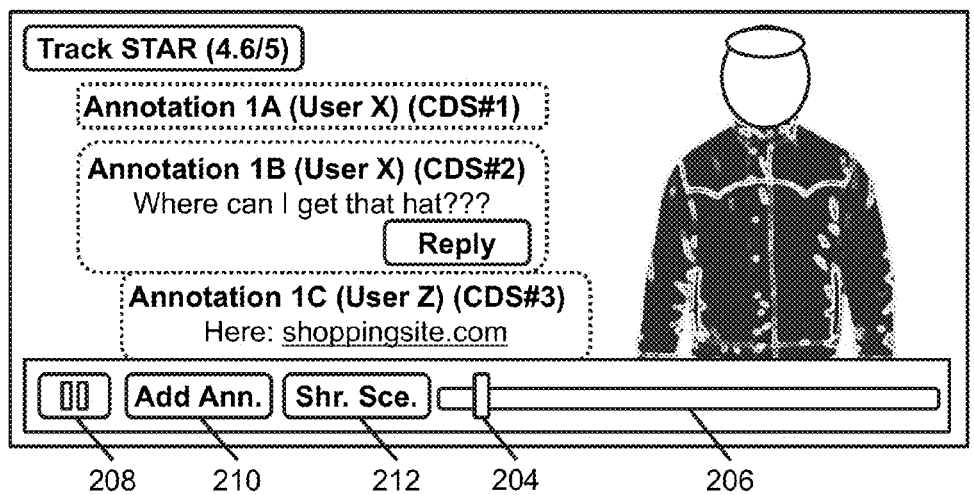

In one use case, with respect to FIG. 9A, User X may have previously watched a presentation of Content Item 1, and submitted Annotation 1B when Portion A of Content Item 1 was presented. As shown in FIG. 9A, User X submitted Annotation 1B to ask other users where he/she can purchase the hat depicted in Portion A. When User Z is watching a presentation of Content Item 1, Annotation 1B is presented to User Z when Portion A is presented during the presentation of Content Item 1 (FIG. 9B). In response, User Z may reply to Annotation 1B with a link to a shopping site through which the hat depicted in Portion A can be purchased to provide an answer to User X's question (e.g., using "Reply" button 902 and reply window 904).

As an example, as illustrated in FIG. 9B, the reply may be stored as Annotation 1C in association with Annotation 1B such that Annotation 1C may appear as a reply to Annotation 1B when User X or other users (e.g., future viewers of Portion A) watch Portion A of Content Item 1. As such, among other benefits, questions and their corresponding answers may be presented together during respective portions of a content item that are relevant to the question and answer combinations.

Figure 9C:
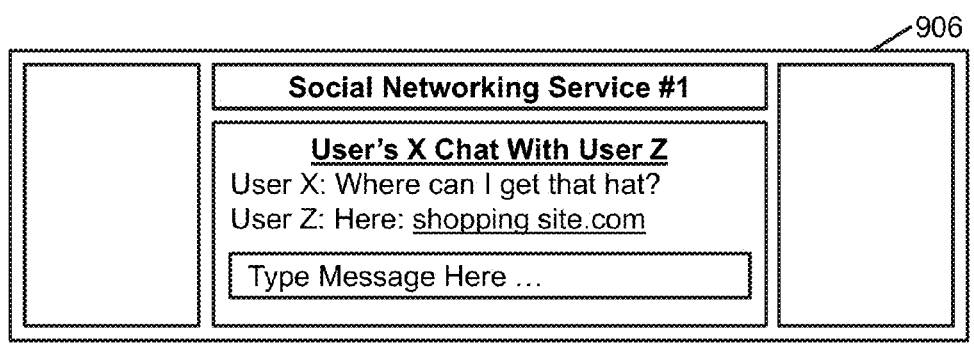

As another example, as indicated by user interface 906 in FIG. 9C, the reply to Annotation 1B may cause Annotation 1B and the reply (e.g., Annotation 1C) to be provided to a social networking service (e.g., Social Networking Service #1) to store Annotation 1B and the reply as a message thread, and initiate a conversation between User X and User Z via the social networking service (e.g., Social Networking Service #1) based on the message thread.

In certain implementations, annotation subsystem 106 may be programmed to obtain a first track that enables access to a first annotation that corresponds to a portion of a content item. The first track may, for example, include an annotation identifier associated with the first annotation, a first reference time for the first annotation, or other information. The first reference time may correspond to the same portion of the content item as the first annotation, and may be utilized along with the annotation identifier to present the first annotation when the corresponding portion is presented during a presentation of the content item.

In some implementations, annotation subsystem 106 may be programmed to provide the first track (e.g., to user device 104) to enable the first annotation to be presented with the corresponding portion of the content item. Upon receipt of a second annotation as a reaction to the first annotation during a presentation of the content item, annotation subsystem 106 may initiate storage of the second annotation in association with the first annotation. The storage of the second annotation (in association with the first annotation) may, for instance, result in the first track further enabling access to the second annotation (e.g., the STAR track in FIGS. 9A-9B may further enable access to Annotation 1C).

In one implementation, the second annotation may be stored in a database with information indicating that the second annotation is a reaction to the first annotation. As an example, when the first track is played during a presentation of the content item, the first track may indicate that the first annotation is to be presented with its corresponding portion of the content item. Based on a query of the database for the first annotation (e.g., using the annotation identifier of the first annotation), the second annotation may be obtained in addition to the first annotation as a result of the second annotation being identified in the database as a reaction to the first annotation. Subsequently, both the first annotation and the second annotation may be presented when the corresponding portion of the content item is presented.

In another implementation, the first track may be updated to further enable access to the second annotation based on the receipt of the second annotation. For example, the first track may be updated to further include an annotation identifier associated with the second annotation and information indicating that the second annotation is a reaction to the first annotation.

In another implementation, a second track that enables access to the first annotation may be updated such that the second track further enables access to the second annotation. As an example, two different tracks (e.g., annotation tracks or other tracks) that enable access to two different sets of annotations may both be updated when a user submits a reaction to an annotation common to both tracks during playback of only one of the two tracks.

As discussed, in various implementations, a reply or other reaction to an annotation may initiate a conversation between users. For example, in some implementations, annotation subsystem 106 may be programmed to obtain an annotation inputted by a first user during a first presentation of a content item. Annotation subsystem 106 may be programmed to present the annotation during a second presentation of the content item to a second user. Annotation subsystem 106 may be programmed to receive a reaction associated with the annotation from the second user. Based on the receipt of the reaction, annotation subsystem 106 may be programmed to provide the annotation and the reaction to the first user.

In one implementation, annotation subsystem 106 may be programmed to initiate a message thread associated with the first user and the second user based on the receipt of the reaction. As an example, annotation subsystem 106 may cause the message thread to be generated at a messaging service (e.g., a social networking service, a chat service, a SMS service, a MMS service, etc.) that is accessible to the first user and the second user. If, for instance, the first user's user device is logged into the messaging service, the annotation and the reaction may be provided to the user device (e.g., pulled by the user device, pushed to the user device, etc.). As such, the reaction to the annotation may initiate a conversation between the first and second users even if the annotation by the first user had not been intended specifically for the second user, as well as without either user having to re-experience the portion of the content item to which the annotation corresponds. Among other benefits, conversations may be initiated between users regarding subject matter of mutual interest, continued through a messaging service independent of an annotation service or a content delivery service, etc.

In another implementation, annotation subsystem 106 may be programmed to provide the annotation and the reaction to the first user via a social networking service. For example, annotation subsystem 106 may identify a social network service with which the first user and the second user both have accounts, and provide the annotation and the reaction to the first user via the social network service. In one use case, as shown in FIG. 9C, Annotation 1B and its reaction (Annotation 1C) may be provided to User X via Social Network Service #1.

In another implementation, annotation subsystem 106 may be programmed to identify a social distance between the first user and the second user within a social network. Annotation subsystem 106 may be programmed to determine whether the social distance satisfies a social distance threshold, and provide the annotation and the reaction to the first user based on a determination that the social distance satisfies the social distance threshold. In one use case, for example, User X may be associated with a preference to only receive communications from users that are 1 degree away from the user. As such, while a conversation between the user and one of the user's friends may be initiated when the friend replies to one of User X's annotations corresponding to portions of a content item, annotation subsystem 106 may know not to initiate a conversation between the user and another user that is only a friend of one of the user's friends (e.g., more than 1 degree away from the user).

As discussed, in some implementations, a reaction to an annotation in a track may result in the track be updated to include (or otherwise further enabling access to) the reaction. On the other hand, in other implementations, the annotation and the reaction may be provided to an authoring user of the annotation without the track being updated to include (or otherwise enabling access to) the reaction.

Intelligently Presenting User Interface Elements

According to an aspect of the invention, display of user interface elements may be presented based on relevancy. By way of example, user interface elements may be presented with varying characteristics based on, for example, the relevancy of the user interface elements to a user or other users, the relevancy of data associated with the user interface elements to the user or other users, the relevancy of the user interface elements to activity being performed by the user or other users, etc. In this way, the presentation of the user interface elements may allow a user to quickly identify relevant information, actions that may be of interest to the user, recommendations related to the user's interests, etc.

Characteristics of the user interface elements may, for example, include one or more shapes, designs, sizes, colors, locations, animations, orientations, degrees of transparencies/opaqueness, degrees of sharpness or blurriness, labels (e.g., number, letter, etc.), or other characteristics. The characteristics of the user interface elements may change over time based on changes with respect to the number of user interface elements on display, data associated with each of the user interface elements, activities of a user or other users, etc.

In some implementations, the user interface elements may be static in their presentation or may move dynamically in response to changes in the X, Y, or Z plane of the user interface. For example, rather than simply moving user interface elements horizontally (e.g., X plane), vertically (e.g., Y plane), or some combination thereof in the user interface, user interface elements may move into or out of the background of a user interface in a dynamic 3-dimensional fashion (e.g., Z plane). In this way, user interface elements of the user interface may be presented in a manner that simplifies the user interface while also providing the user with simultaneous access to many different user interface elements.

In certain implementations, user interface elements may be associated with content items (e.g., movies, episodes, video clips, songs, audio books, e-books, or other content items). Content presentation subsystem 116 may be programmed to determine relevancy information indicating the relevancy of each of the content items to a user. Content presentation subsystem 116 may be programmed to modify and/or present the user interface elements based on the relevancy information.

Figure 10A:
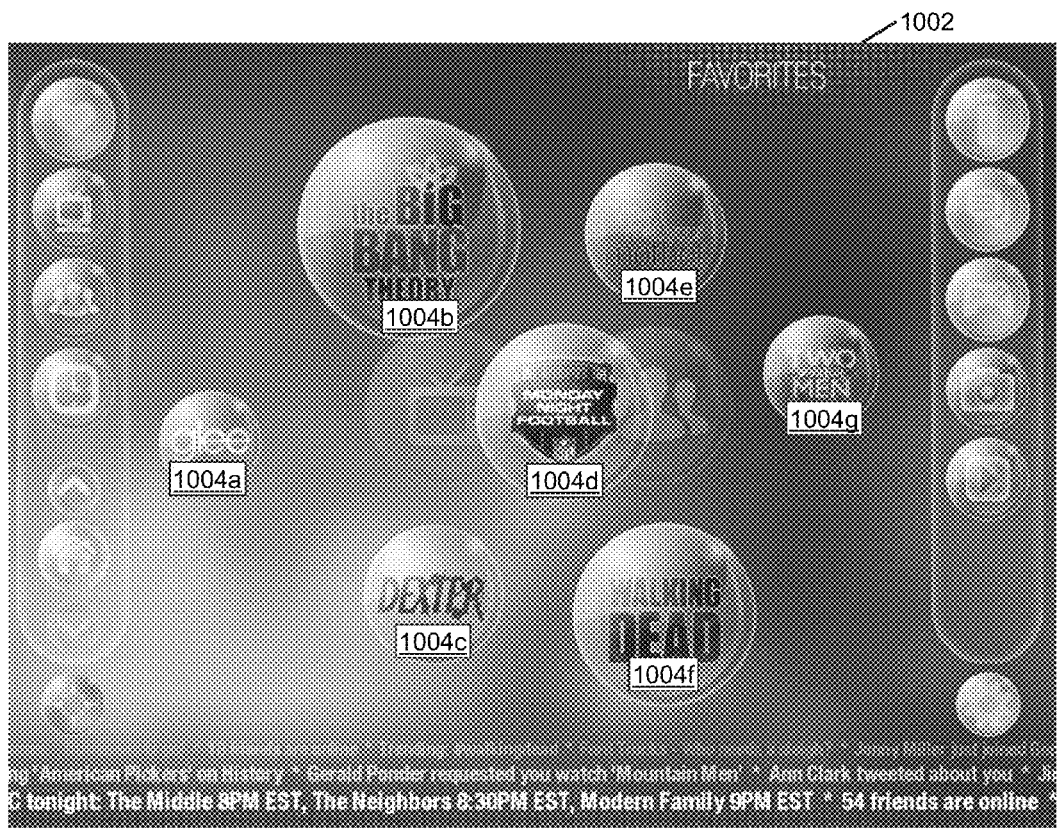
FIGS. 10A-10D are exemplary illustrations of a user interface depicting an intelligent presentation of user interface elements, according to aspects of the invention.

In one example, with respect to FIG. 10A, user interface 1002 may include a display of user interface elements 1004a-1004g that are associated with television shows. While FIG. 10A depicts user interface elements corresponding to television shows, it should be appreciated that a similar interface may be utilized for any other content item (e.g., movies, songs, etc.). The characteristics of user interface elements 1004 may, for example, be based on which shows are most frequently viewed by the user, which shows are most relevant to a specific genre specified by the user, which shows the user has viewed the most, etc.

Figure 10B:
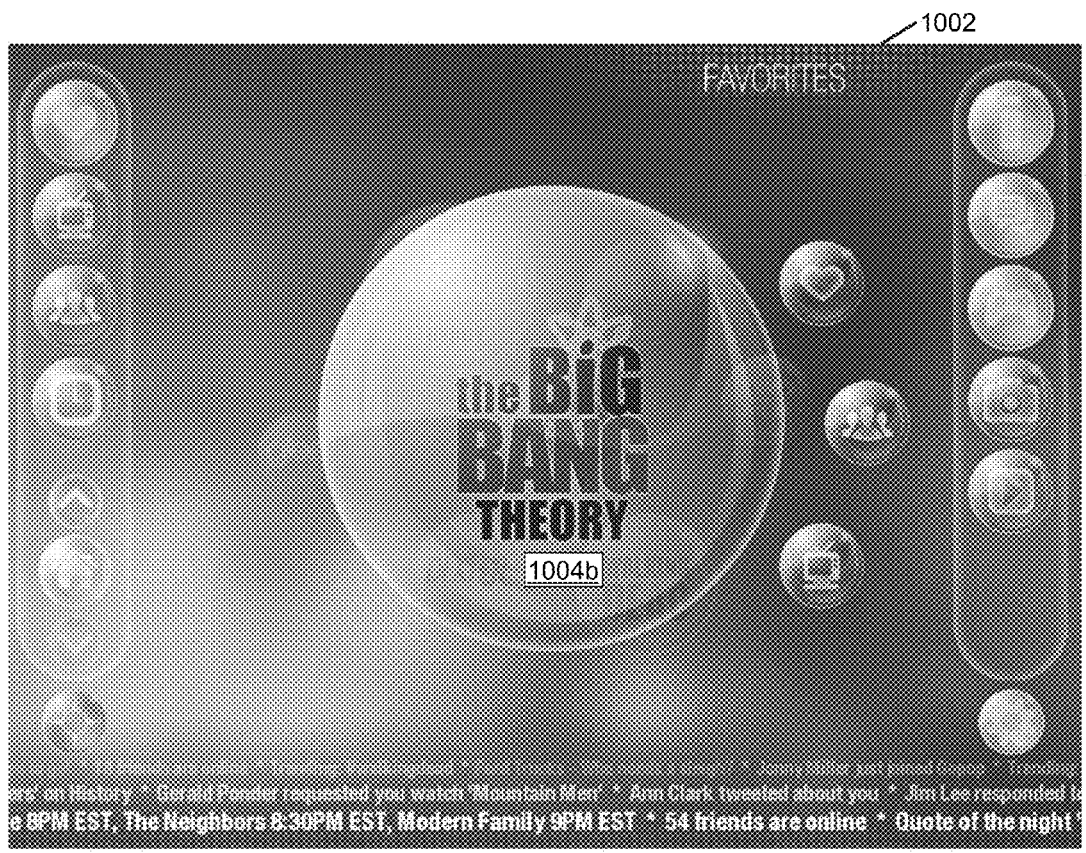

In another example, as shown in FIG. 10B, the size of user interface element 1004b (e.g., associated with the "Big Bang Theory" television show) may be increased, and the location of user interface element 1004b within the Z plane (e.g., depth) may be changed to feature user interface element 1004b more prominently in front of other user interface elements (e.g., from the perspective of the user). As an example, changes to the size and location of user interface element 1004b may be effectuated when a number of the user's friends begin to tune into one or more episodes of Big Band Theory. The change in the size and location of user interface element 1004b may, for example, alert the user that there may be information of potential interest to the user associated with user interface 1004b. In one use case, upon selection of user interface element 1004b, the user may be presented with an information page that indicates the episodes of the Big Bang Theory that the user's friends are currently watching or have recently watched. The user may, for example, be inclined to start watching the episodes indicated on the information page in order to see the comments or other annotations that the user's friends have submitted for portions of the episodes.

Figure 10C:
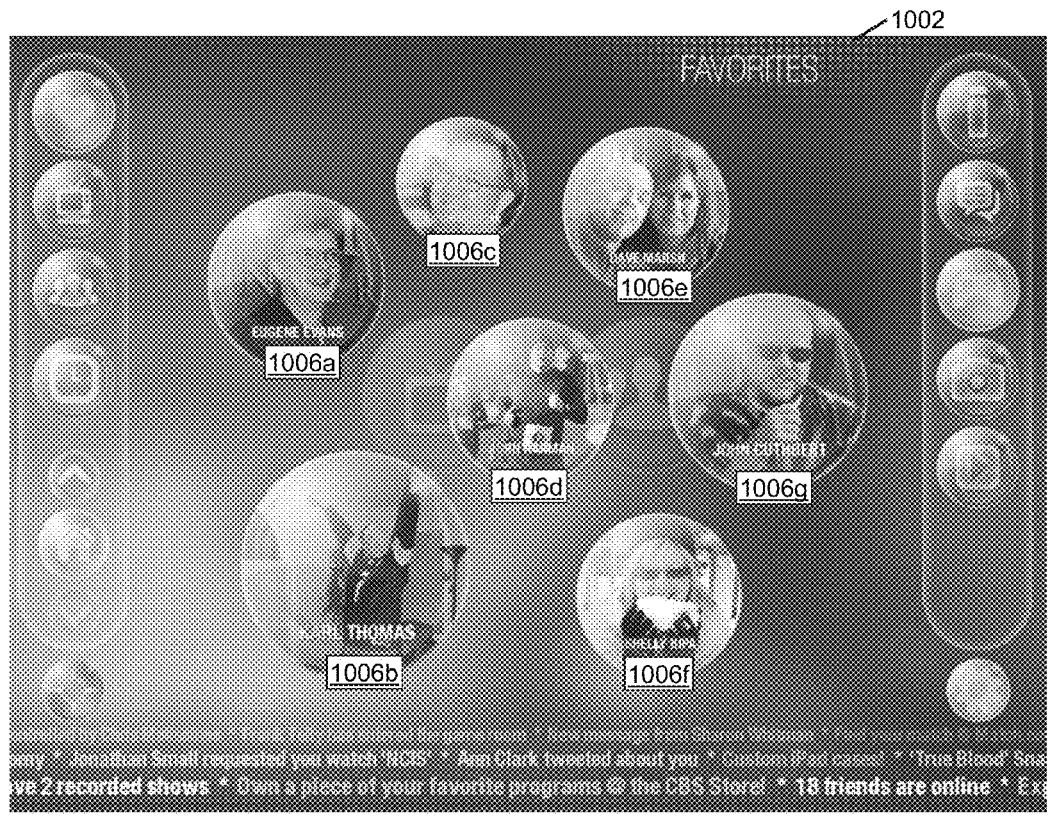

In various implementations, user interface elements may be associated with other users within a user's social group (e.g., the user's friends, the user's colleagues, the user's connections within a social network, or other group). Content presentation subsystem 116 may be programmed to determine relevancy information indicating the relevancy of each of the other users to the user. Content presentation subsystem 116 may be programmed to present user interface elements based on the relevancy information, for example, by modifying the characteristics of the user interface elements based on the relevancy of respective ones of the other users to the user. For example, as shown in FIG. 10C, the characteristics of user interface elements 1006a-1006g may, for example, be based on the frequency of the user's interactions with the other users (e.g., reactions to the other users' annotations, conversations with the other users, etc.), the frequency of the interactions with one another, similarity of the other users' activities with the user's activities, etc.

Figure 10D:
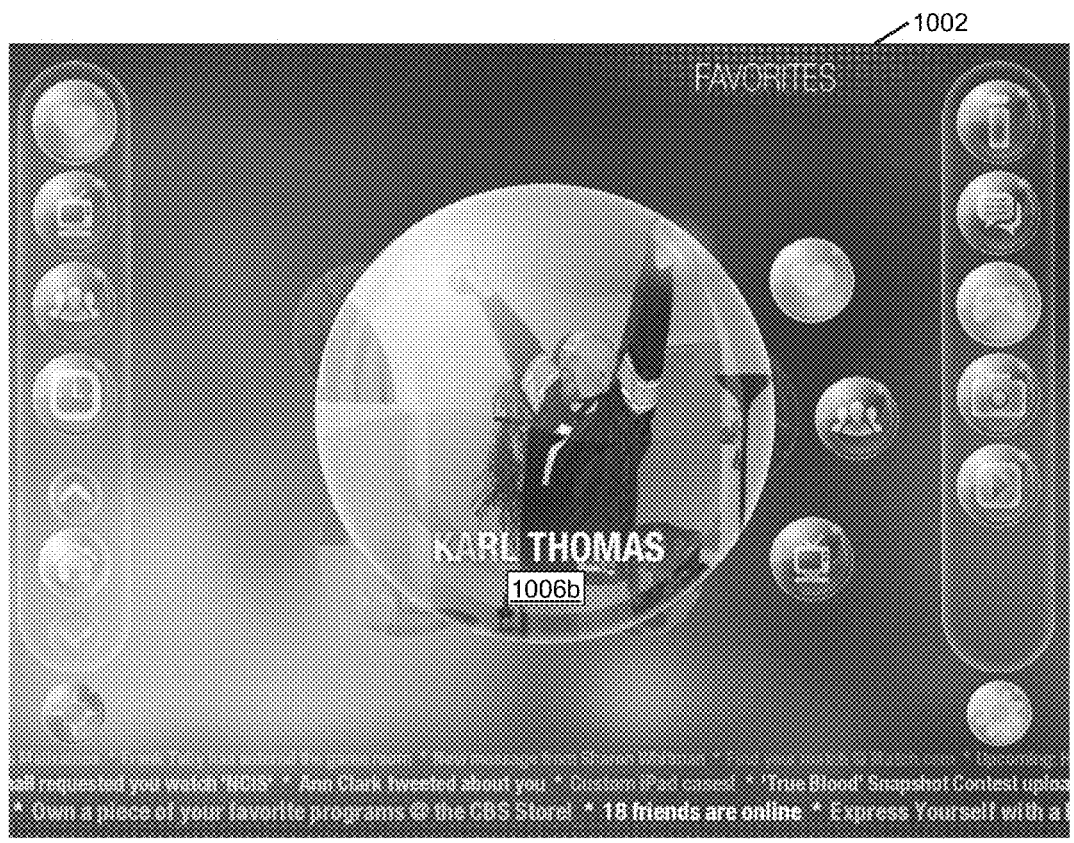

In another example, as shown in FIG. 10D, the size of user interface element 1006b (e.g., associated with Karl Thomas) may be increased, and the location of user interface element 1006b within the Z plane (e.g., depth) may be changed to feature user interface element 1006b more prominently in front of other user interface elements (e.g., from the perspective of the user). As an example, the change to the size and location of user interface element 1006b may be effectuated when an increase in interactions with items associated with Karl Thomas's account is detected. The change in the size and location of user interface element 1006b may, for example, alert the user that there may be information of potential interest to the user associated with user interface 1006b. In one use case, upon selection of user interface element 1006b, the user may be presented with an information page that indicates the annotations that Karl Thomas has recently submitted for content items, the reactions that users have recently submitted for Karl Thomas's annotations, users that have recently engaged in conversation with Karl Thomas, etc. As a result, for example, the user may be inclined to view Karl Thomas's annotations and the reactions associated with Karl Thomas's annotations, start submitting annotations for content items for which Karl Thomas has submitted annotations, initiate a conversation with Karl Thomas, or perform other activities.

Managing Control of Presentations of a Content Item to a Group of Users

According to an aspect of the invention, control of presentations of a content item to a group of users may be managed such that an application or a user may control playback or other features of the presentations of the content item to the group of users. For example, a group of users (e.g., friends) may wish to view a movie or television show together and play an accompanying game (e.g., a trivia game), engage in a related contest, etc. However, the users may not have access to the same content delivery service to watch a presentation of the movie or television show, or the users may be watching a presentation of the movie or television show on different applications or devices. As such, it may be difficult for the users to control multiple presentations of the movie or television show to play an accompanying game, engage in a related contest, etc. Accordingly, in some implementations, one or more users of a group may be enabled to simultaneously control multiple presentations of a content item to respective users of the group even when the presentations are provided to the users via different content delivery services, different user applications, or different user devices. In this way, among other benefits, the group interaction experience (e.g., group watching experience, group listening experience, group gaming experience, etc.) may be enhanced.

In some implementations, content presentation subsystem 116 may be programmed to manage presentations of a content item to at least two users. By way of example, content presentation subsystem 116 may synchronize the presentations of the content item (e.g., based on presentation reference times or other information) so that users may experience the same portion of the content item at a given time.

In some implementations, content reference subsystem 108 may be programmed to map portions of a first presentation of a content item to portions of a second presentation of the content item. The portions of the first and second presentations may, for example, be mapped to one another via a master set of reference times (as described in detail above with regard to FIG. 3).

Figure 11A:
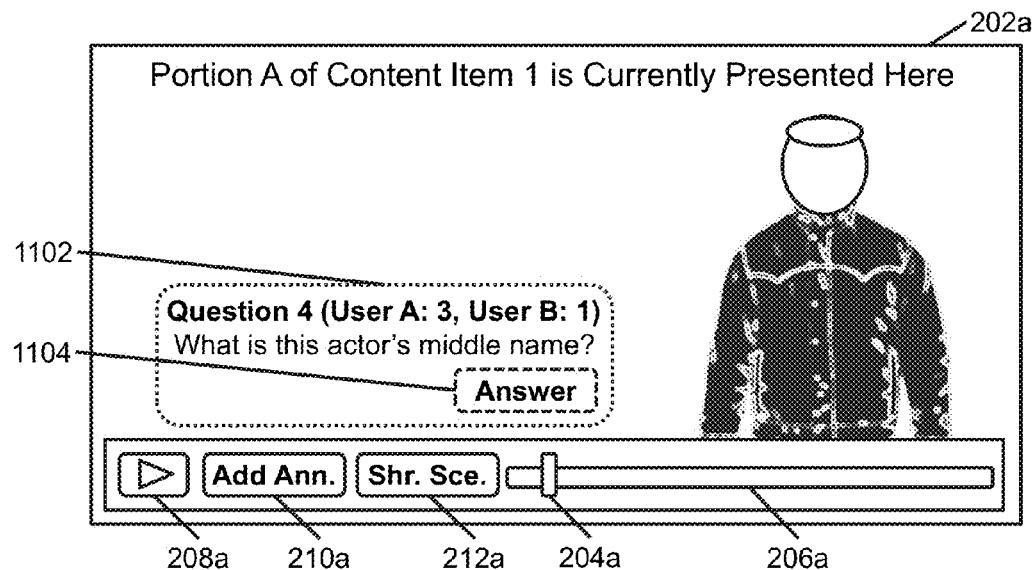
FIGS. 11A-11B are exemplary illustrations of user interfaces depicting presentations of a content item to a group of users, according to aspects of the invention.
Figure 11B:
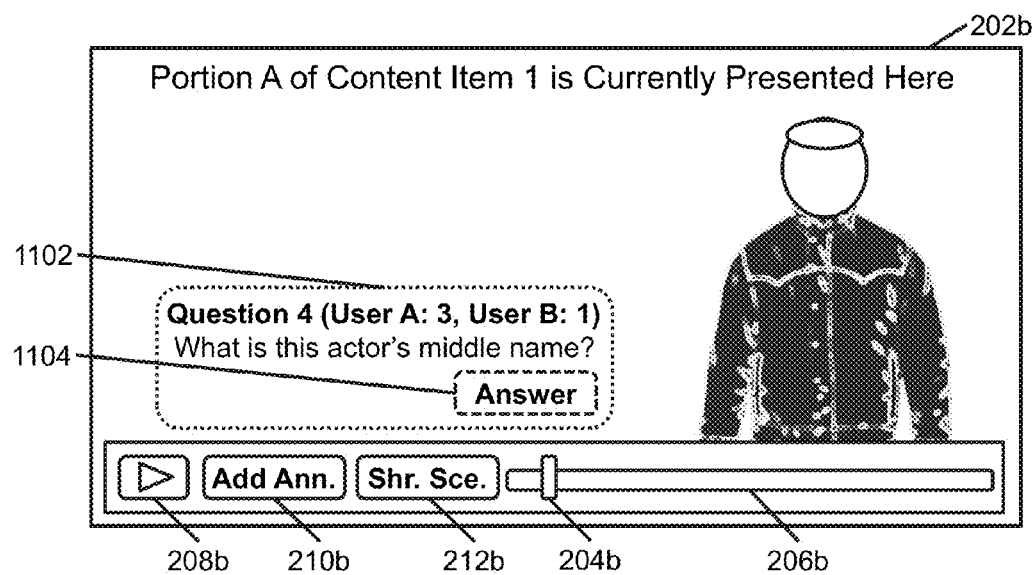

As shown in FIGS. 11A-11B, for example, User A may watch a first presentation of Content Item 1 on user interface 202a, and User B may watch a second presentation of Content Item 1 on user interface 202b. The first presentation may, for instance, be provided via a first content delivery service (e.g., NETFLIX), and the second presentation may be provided via a second content delivery service (e.g., HULU). Nevertheless, the two presentations may be synchronized so that User A and User B are watching the same portion of Content Item 1 at the same time.

In one scenario, with respect to FIGS. 11A-11B, User A and User B may be playing a trivia game related to Content Item 1 (e.g., a movie, an episode, etc.). A remote application may control the presentations of Content Item 1 to User A and User B, and pause the presentations at particular times to ask trivia questions related to a portion of Content Item 1. As depicted in FIGS. 11A-11B, User A and User B may be presented with a question (e.g., Question 4) on window 1102, and they may each answer Question 4 using "Answer" button 1104. Questions of the trivia game may, for example, be presented as comments on a track (e.g., a trivia game track or other track) created by administrators or other users, and answers to the trivia questions may be stored as reactions to the comments.

In another scenario, User A or User B may control the ability to pause the presentations of Content Item 1. For example, when User A activates the play/pause button 208a to pause the presentations of Content Item 1 at Portion A, both User A and User B may be presented with a question corresponding to Portion A. As illustrated in FIGS. 11A-11B, User A has 3 points for answering 3 previous questions correctly, and User B has 1 point for answering 1 previous question correctly.

In various implementations, a threshold number of users in a group of users may need to issue a command in order for the command to be implemented for presentations of a content item to the group of users. As an example, with respect to FIGS. 11A-11B, both User A and User B may need to activate their play/pause buttons 208 when Portion A is presented to pause the presentations of Content Item 1 at Portion A and trigger the presentation of Question 4. As such, both User A and User B may be allowed to gauge whether they are comfortable with questions regarding a certain portion of a content item before activating their play/pause button 208 to trigger a question.

In some implementations, the control of presentations of a content item (e.g., partial control, full control, etc.) may be passed among a group of users based on a schedule, pass intervals (e.g., time intervals, use intervals, etc.), token-based criteria, or other criteria. In one use case, a user may manually pass his/her control of the presentations to another user in the group. In another use case, a schedule may indicate when each one of the group of users should be given full or partial control. In another use case, passing of control may be performed after a user has had control for a particular time interval, or after a user has used all of his/her available number of commands to control presentations of the content item.

In yet another use case, a user may be given a certain number of tokens which may be exchanged for issuing commands to control the presentations of the content item to the group of users (e.g., 1 token to pause the presentations for 5 seconds, 3 tokens to rewind or fast-forward the presentations up to 5 minutes back or forward, 6 tokens to cause the presentations to jump to any portion of the content item, etc.). After the user has used all of his/her tokens, the control of the presentations may be passed to another user in the group that has available tokens. A user may, for example, be given an initial set of tokens for controlling the presentations of the content item for free, but may have the option to purchase additional tokens. The foregoing trivia game is but one example. It should be recognized that other examples may be implemented when a group of users wish to view a movie or television show together. In some implementations, third parties may generate and provide "group viewing tracks" to encourage social behavior.

Exemplary Flowcharts

FIGS. 12-27 comprise exemplary illustrations of flowcharts of processing operations of methods that enable the various features and functionality of the system as described in detail above (and illustrated in FIGS. 1-11). The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated and described below is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

Exemplary Flowchart for Creating and Maintaining a Database of Annotations

Figure 12:
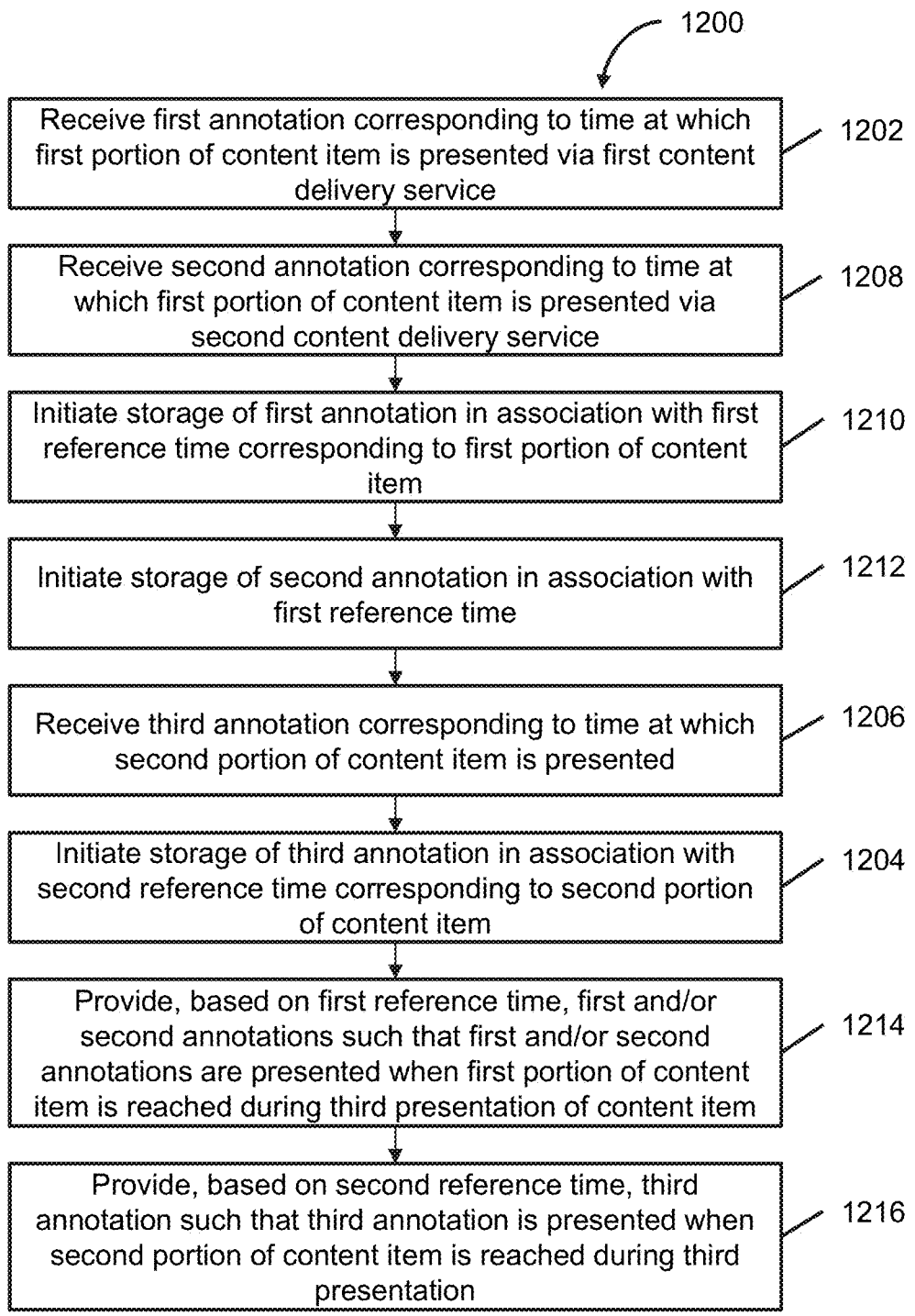
FIG. 12 is an exemplary illustration of a flowchart of a method of creating and maintaining a database of annotations corresponding to portions of a content item, according to an aspect of the invention.

FIG. 12 is an exemplary illustration of a flowchart of a method 1200 of creating and maintaining a database of annotations corresponding to portions of a content item, according to an aspect of the invention.

In an operation 1202, a first annotation corresponding to a time at which a first portion of a content item is presented via a first content delivery service may be received. Operation 1202 may be performed by an annotation subsystem that is the same as or similar to annotation subsystem 106, in accordance with one or more implementations.

In an operation 1204, a second annotation corresponding to a time at which the first portion of the content item is presented via a second content delivery service may be received. As an example, the presentation via the first content delivery service may correspond to a first presentation that includes the content item, and the presentation via the second content delivery service may correspond to a second presentation that includes the content item. As another example, the presentation via the first content delivery service may correspond to a first presentation that includes the first portion of the content item and does not include a second portion of the content item, and the presentation via the second content delivery service may include the first and second portions of the content item. Operation 1204 may be performed by an annotation subsystem that is the same as or similar to annotation subsystem 106, in accordance with one or more implementations.

In an operation 1206, storage of the first annotation in association with a first reference time corresponding to the first portion of the content item may be initiated. Operation 1206 may be performed by an annotation subsystem that is the same as or similar to annotation subsystem 106, in accordance with one or more implementations.

In an operation 1208, storage of the second annotation in association with the first reference time (corresponding to the first portion of the content item) may be initiated. Operation 1208 may be performed by an annotation subsystem that is the same as or similar to annotation subsystem 106, in accordance with one or more implementations.

In an operation 1210, a third annotation corresponding to a time at which a second portion of the content item is presented may be received. Operation 1210 may be performed by an annotation subsystem that is the same as or similar to annotation subsystem 106, in accordance with one or more implementations.

In an operation 1212, storage of the third annotation in association with a second reference time corresponding to the second portion of the content item may be initiated. Operation 1212 may be performed by an annotation subsystem that is the same as or similar to annotation subsystem 106, in accordance with one or more implementations.

In an operation 1214, the first and/or second annotations may be provided based on the first reference time. For example, the first and/or second annotations may be provided based on the first reference time such that the first and/or second annotations are presented when the first portion of the content item (to which the first reference time corresponds) is presented during a third presentation of the content item. The third presentation may, for example, be provided via the first content delivery service, the second content delivery service, or a third content delivery service. The third presentation may be the same as one of the first or second presentations of the content item, or different than both the first and second presentations of the content item. Operation 1214 may be performed by an annotation subsystem that is the same as or similar to annotation subsystem 106, in accordance with one or more implementations.

In an operation 1216, the third annotation may be provided based on the second reference time. For example, the third annotation may be provided based on the second reference time such that the third annotation is presented when the second portion of the content item (to which the second reference time corresponds) is presented during the third presentation of the content item. Operation 1216 may be performed by an annotation subsystem that is the same as or similar to annotation subsystem 106, in accordance with one or more implementations.

Exemplary Flowchart for Generating Annotations Based on User Interactions

Figure 13:
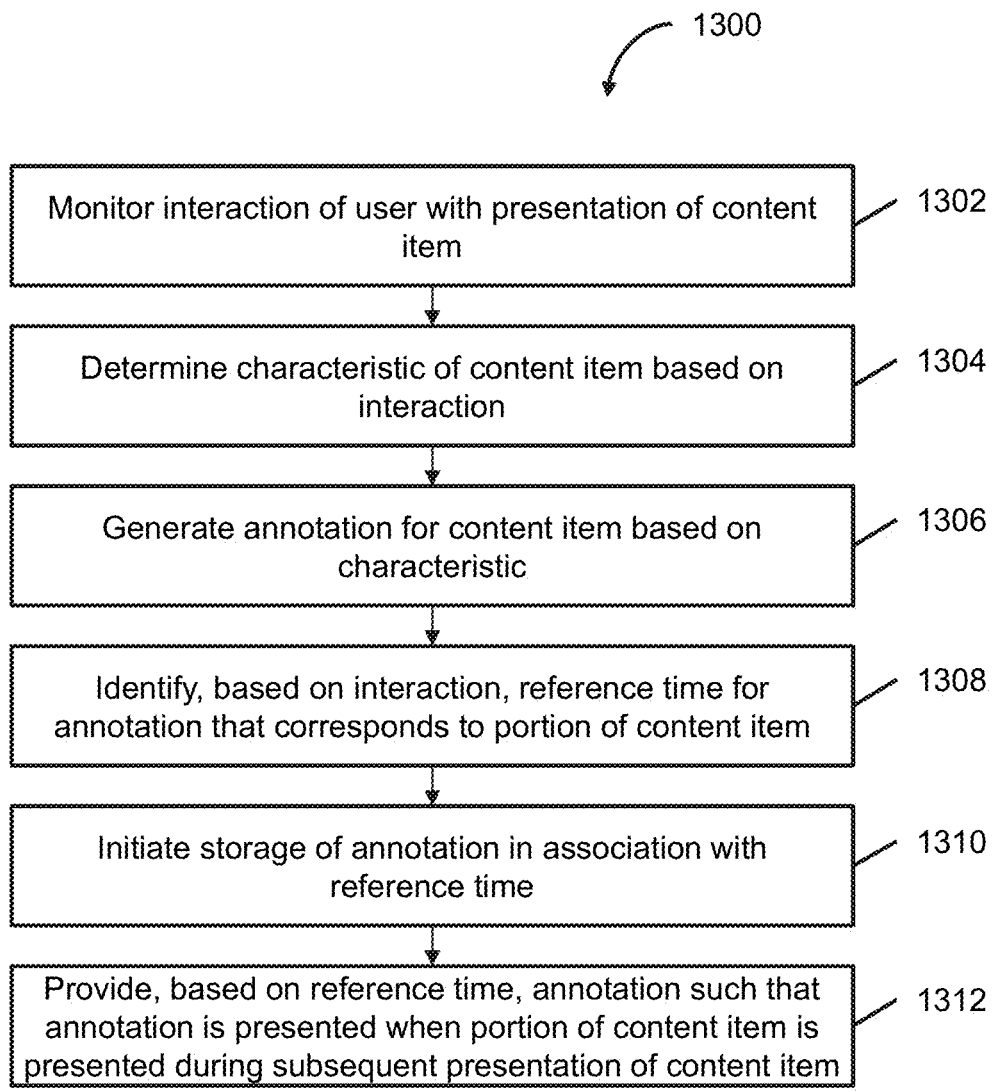
FIG. 13 is an exemplary illustration of a flowchart of a method of generating annotations for a content item based on interactions of users with presentations of the content item, according to an aspect of the invention.

FIG. 13 is an exemplary illustration of a flowchart of a method 1300 of generating annotations for a content item based on interactions of users with presentations of the content item, according to an aspect of the invention.

In an operation 1302, an interaction of a user with a presentation of a content item may be monitored. Operation 1302 may be performed by an interaction monitoring subsystem that is the same as or similar to interaction monitoring subsystem 112, in accordance with one or more implementations.

In an operation 1304, a characteristic of the content item may be determined based on the interaction. Operation 1304 may be performed by an annotation subsystem that is the same as or similar to annotation subsystem 106, in accordance with one or more implementations.

In an operation 1306, an annotation may be generated for the content item based on the characteristic. Operation 1306 may be performed by an annotation subsystem that is the same as or similar to annotation subsystem 106, in accordance with one or more implementations.

In an operation 1308, a reference time that corresponds to a portion of the content item may be identified for the annotation based on the interaction. Operation 1308 may be performed by a content reference subsystem that is the same as or similar to content reference subsystem 108, in accordance with one or more implementations.

In an operation 1310, storage of the annotation in association with the reference time may be initiated. Operation 1310 may be performed by an annotation subsystem that is the same as or similar to annotation subsystem 106, in accordance with one or more implementations.

In an operation 1312, the annotation may be provided based on the reference time such that the annotation is presented when the portion of the content item (to which the reference time corresponds) is presented during a subsequent presentation of the content item. Operation 1312 may be performed by an annotation subsystem that is the same as or similar to annotation subsystem 106, in accordance with one or more implementations.

Exemplary Flowchart for Providing Annotations to Social Networking Services

Figure 14:
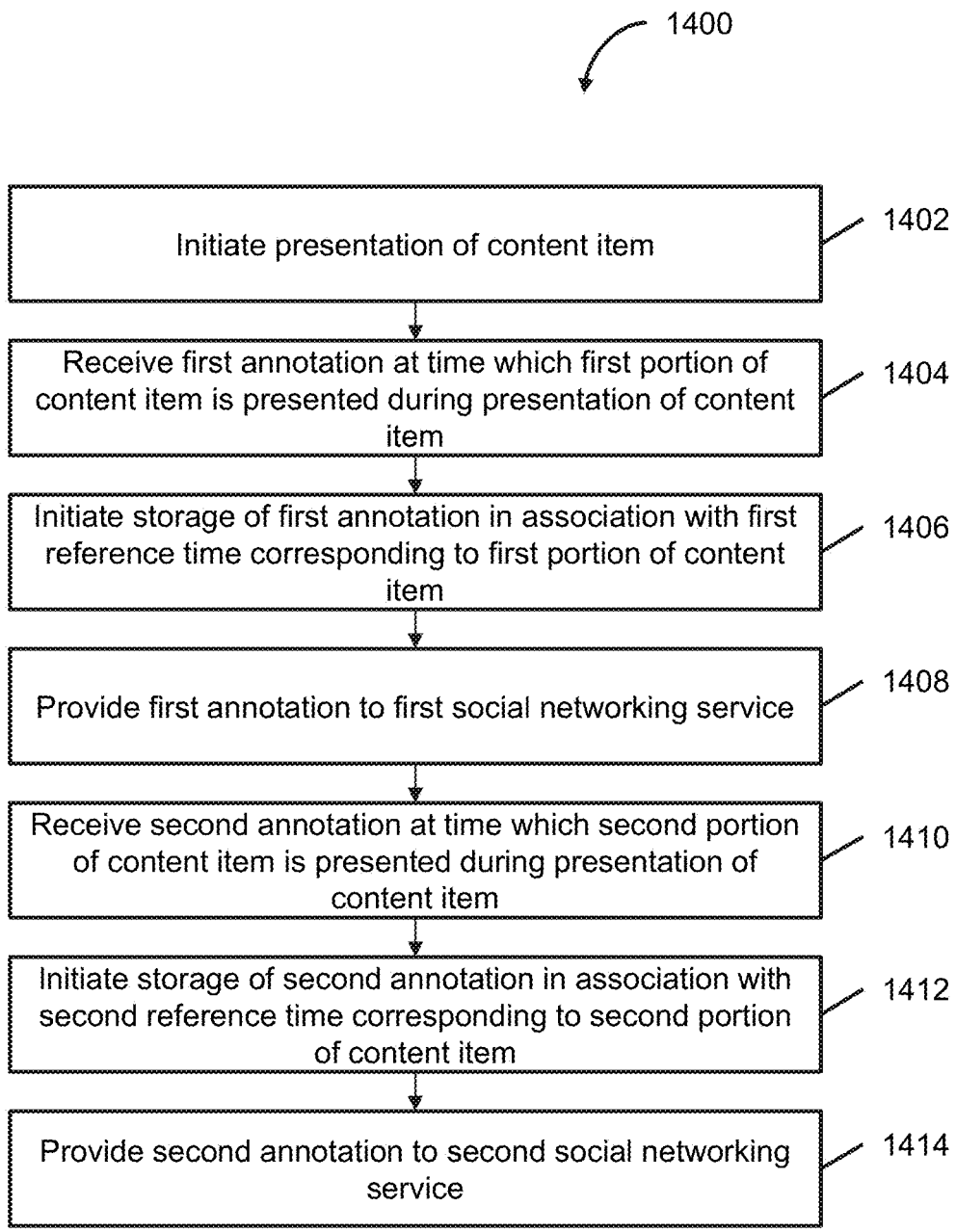
FIG. 14 is an exemplary illustration of a flowchart of a method of providing annotations corresponding to portions of a content item to social networking services, according to an aspect of the invention.

FIG. 14 is an exemplary illustration of a flowchart of a method 1400 of providing annotations (corresponding to portions of a content item) to social networking services, according to an aspect of the invention.

In an operation 1402, a presentation of a content item may be initiated. Operation 1402 may be performed by a user content presentation subsystem that is the same as or similar to user content presentation subsystem 120, in accordance with one or more implementations.

In an operation 1404, a first annotation may be received at a time at which a first portion of the content item is presented. Operation 1404 may be performed by a user annotation subsystem that is the same as or similar to user annotation subsystem 118, in accordance with one or more implementations.

In an operation 1406, storage of the first annotation in association with a first reference time (corresponding to the first portion of the content item) may be initiated. Operation 1406 may be performed by a user annotation subsystem that is the same as or similar to user annotation subsystem 118, in accordance with one or more implementations.

In an operation 1408, the first annotation may be provided to a first social networking service. Operation 1408 may be performed by a user annotation subsystem that is the same as or similar to user annotation subsystem 118, in accordance with one or more implementations.

In an operation 1410, a second annotation may be received at a time at which a second portion of the content item is presented. Operation 1410 may be performed by a user annotation subsystem that is the same as or similar to user annotation subsystem 118, in accordance with one or more implementations.

In an operation 1412, storage of the second annotation in association with a second reference time (corresponding to the second portion of the content item) may be initiated. Operation 1412 may be performed by a user annotation subsystem that is the same as or similar to user annotation subsystem 118, in accordance with one or more implementations.

In an operation 1414, the second annotation may be provided to a second social networking service. Operation 1414 may be performed by a user annotation subsystem that is the same as or similar to user annotation subsystem 118, in accordance with one or more implementations.

Exemplary Flowchart for Presenting Annotations

Figure 15:
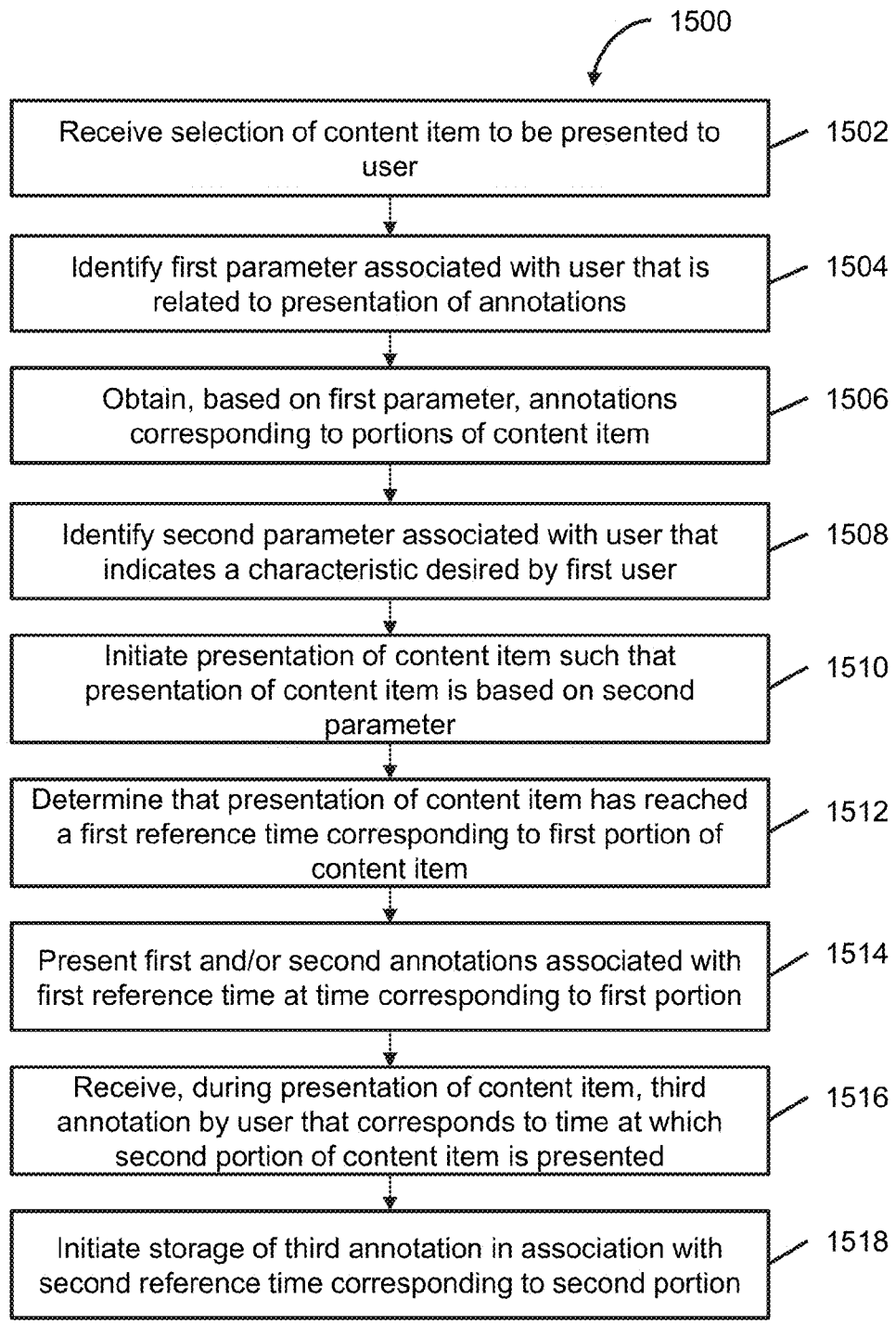
FIG. 15 is an exemplary illustration of a flowchart of a method of presenting annotations corresponding to portions of a content item during a presentation of the content item, according to an aspect of the invention.

FIG. 15 is an exemplary illustration of a flowchart of a method 1500 of presenting annotations corresponding to portions of a content item during a presentation of the content item, according to an aspect of the invention.

In an operation 1502, a selection of a content item to be presented to a user may be received. Operation 1502 may be performed by a user content presentation subsystem that is the same as or similar to user content presentation subsystem 120, in accordance with one or more implementations.

In an operation 1504, a first parameter associated with the user that is related to presentation of annotations may be received. Operation 1504 may be performed by a user annotation subsystem that is the same as or similar to user annotation subsystem 118, in accordance with one or more implementations.

In an operation 1506, annotations corresponding to portions of the content item may be obtained based on the first parameter. Operation 1506 may be performed by a user annotation subsystem that is the same as or similar to user annotation subsystem 118, in accordance with one or more implementations.

In an operation 1508, a second parameter associated with the user that indicates a characteristic desired by the first user may be received. Operation 1508 may be performed by a user content presentation subsystem that is the same as or similar to user content presentation subsystem 120, in accordance with one or more implementations.

In an operation 1510, a presentation of the selected content item may be initiated such that the presentation of the selected content item is based on the second parameter. Operation 1510 may be performed by a user content presentation subsystem that is the same as or similar to user content presentation subsystem 120, in accordance with one or more implementations.

In an operation 1512, a determination that the presentation of the selected content item has reached a first reference time corresponding to a first portion of the content item may be effectuated. Operation 1512 may be performed by a user annotation subsystem that is the same as or similar to user annotation subsystem 118, in accordance with one or more implementations.

In an operation 1514, first and/or second annotations associated with the first reference time may be presented at a time corresponding to the first portion of the content item. Operation 1514 may be performed by a user annotation subsystem that is the same as or similar to user annotation subsystem 118, in accordance with one or more implementations.

In an operation 1516, a third annotation by the user that corresponds to a time at which a second portion of the content item is presented may be received during the presentation of the content item. Operation 1516 may be performed by a user annotation subsystem that is the same as or similar to user annotation subsystem 118, in accordance with one or more implementations.

In an operation 1518, storage of the third annotation in association with a second reference time corresponding to the second portion of the content item may be initiated. Operation 1518 may be performed by a user annotation subsystem that is the same as or similar to user annotation subsystem 118, in accordance with one or more implementations.

Exemplary Flowchart for Rewarding the Creation of Annotations

Figure 16:
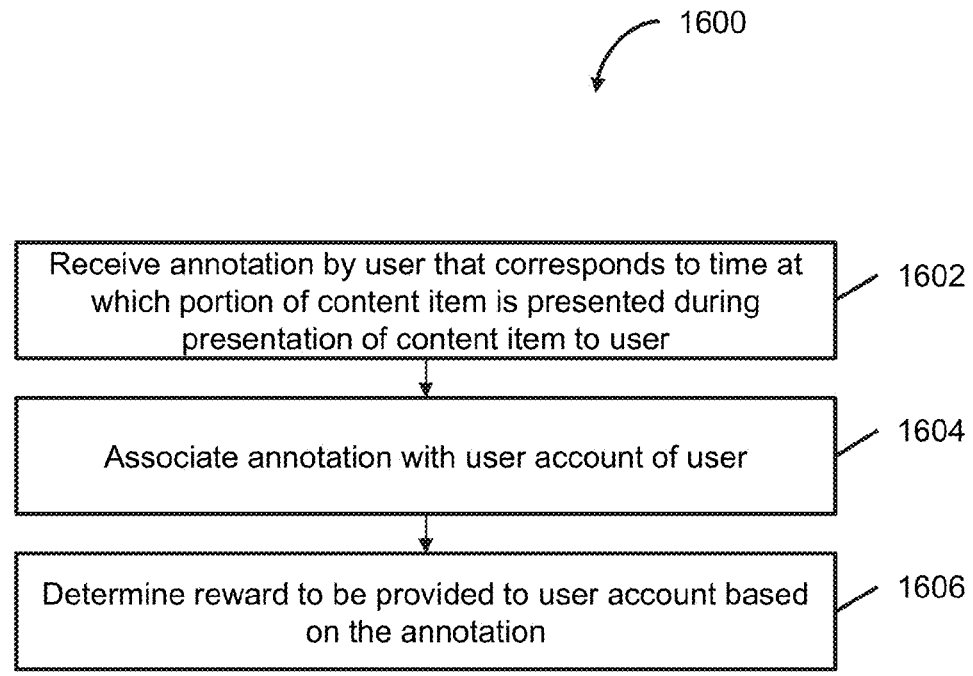
FIG. 16 is an exemplary illustration of a flowchart of a method of facilitating rewards for the creation of annotations, according to an aspect of the invention.

FIG. 16 is an exemplary illustration of a flowchart of a method 1600 of facilitating rewards for the creation of annotations, according to an aspect of the invention.

In an operation 1602, an annotation corresponding to a time at which a portion of a content item is presented may be received from a user. Operation 1602 may be performed by an annotation subsystem that is the same as or similar to annotation subsystem 106, in accordance with one or more implementations.

In an operation 1604, the annotation may be associated with a user account of the user. Operation 1604 may be performed by an account subsystem that is the same as or similar to account subsystem 110, in accordance with one or more implementations.

In an operation 1606, a reward to be provided (or credited) to the user account may be determined based on the annotation. For example, a reward may be provided (or credited) to the user account based on a receipt of annotation from a user, interactions of other users with the annotation, or other criteria. Operation 1606 may be performed by a reward subsystem that is the same as or similar to reward subsystem 114, in accordance with one or more implementations.

Exemplary Flowchart for Rewarding Based on Interactions with Annotations

Figure 17:
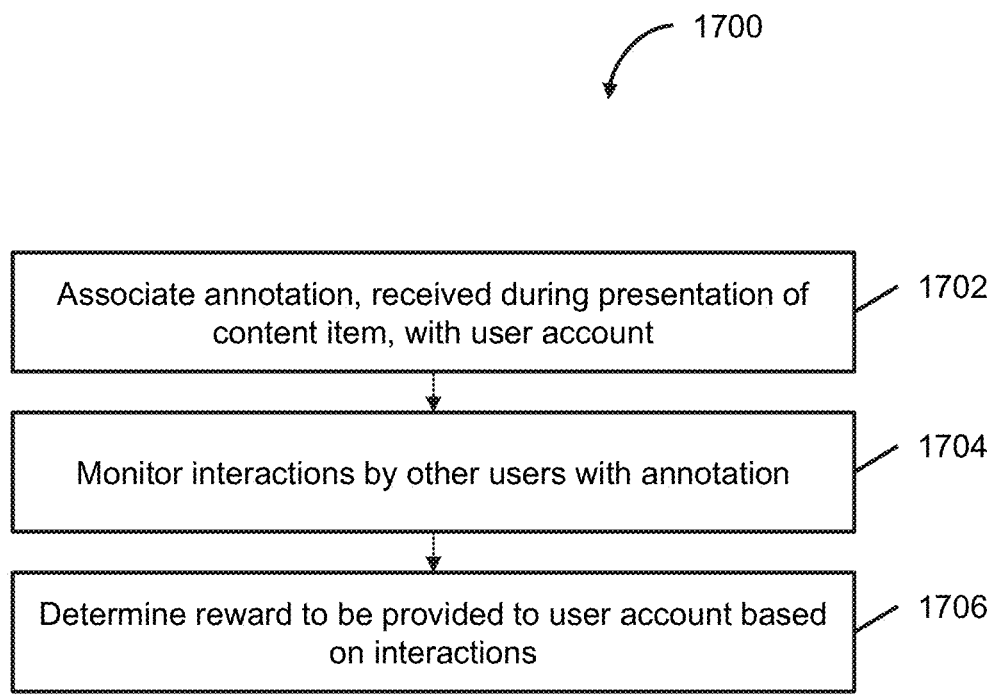
FIG. 17 is an exemplary illustration of a flowchart of a method of facilitating rewards based on interactions with annotations, according to an aspect of the invention.

FIG. 17 is an exemplary illustration of a flowchart of a method 1700 of facilitating rewards based on interactions with annotations, according to an aspect of the invention.

In an operation 1702, an annotation received during a presentation of a content item may be associated with a user account. Operation 1702 may be performed by an account subsystem that is the same as or similar to account subsystem 110, in accordance with one or more implementations.

In an operation 1704, interactions with the annotation may be monitored. Monitored interactions may, for instance, include access of the annotation (e.g., viewing the annotation, listening the annotation, etc.) by other users during presentation of the content item, reactions by users to the annotation (e.g., rating the annotation, replying to the annotation, etc.), execution of transactions enabled via the annotation, or other interactions. Operation 1704 may be performed by an interaction monitoring subsystem that is the same as or similar to interaction monitoring subsystem 112, in accordance with one or more implementations.

In an operation 1706, a reward to be provided (or credited) to the user account may be determined based on the interactions. For example, a determination of whether the interactions satisfy one or more criteria for compensating a user associated with the user account may be effectuated. The reward to be provided to the user account may be determined based on whether the interactions satisfy the compensation criteria. Operation 1706 may be performed by a reward subsystem that is the same as or similar to reward subsystem 114, in accordance with one or more implementations.

Exemplary Flowchart for Rewarding Based on Annotation-Enabled Transactions

Figure 18:
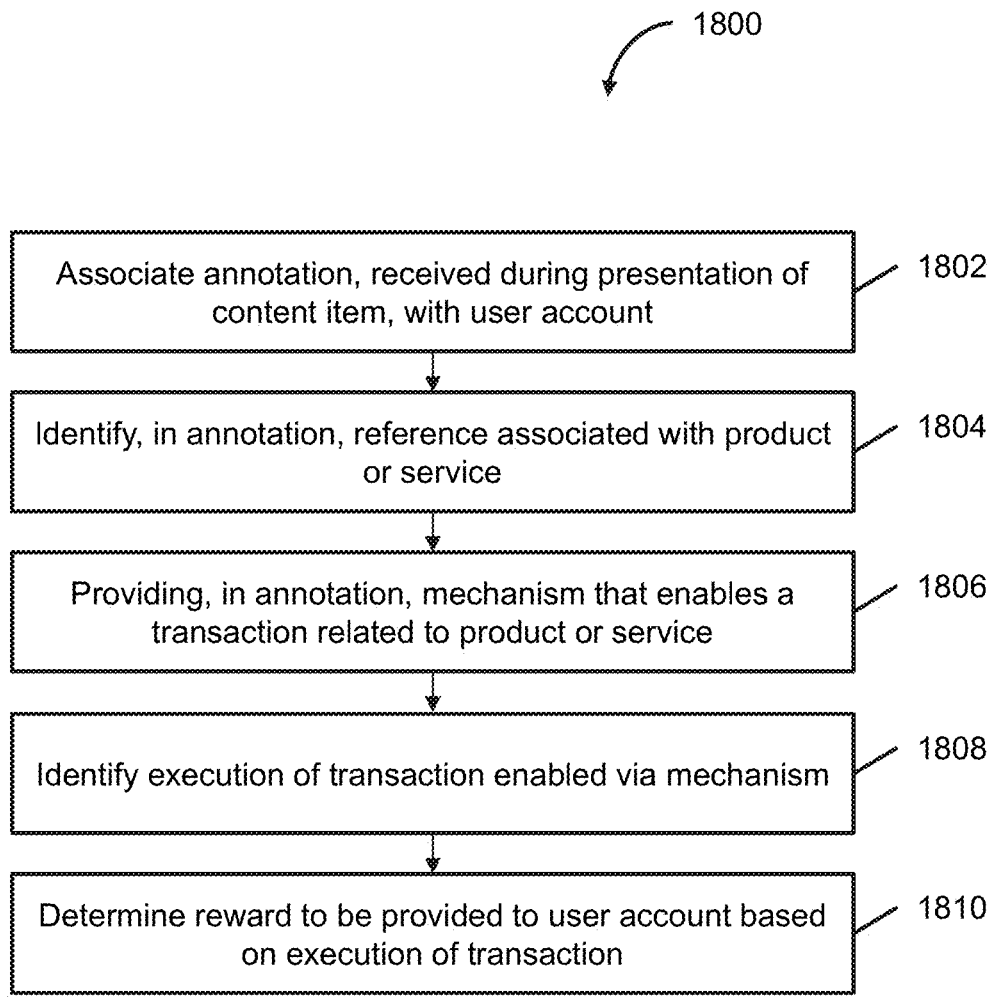
FIG. 18 is an exemplary illustration of a flowchart of a method of facilitating rewards based on execution of transactions enabled via annotations, according to an aspect of the invention.

FIG. 18 is an exemplary illustration of a flowchart of a method 1800 of facilitating rewards based on execution of transactions enabled via annotations, according to an aspect of the invention.

In an operation 1802, an annotation received during a presentation of a content item may be associated with a user account. Operation 1802 may be performed by an account subsystem that is the same as or similar to account subsystem 110, in accordance with one or more implementations.

In an operation 1804, a reference associated with a product or service may be identified in the annotation. Operation 1804 may be performed by an annotation subsystem that is the same as or similar to annotation subsystem 106, in accordance with one or more implementations.

In an operation 1806, a mechanism that enables a transaction related to the product or service may be provided in the annotation. For example, the mechanism may be provided in the annotation based on the identification of the reference associated with the product or service in the annotation. Operation 1806 may be performed by an annotation subsystem that is the same as or similar to annotation subsystem 106, in accordance with one or more implementations.

In an operation 1808, an execution of the transaction enabled via the mechanism may be identified. For example, the execution of the transaction may be identified based on use of the mechanism by a user to facilitate the execution of the transaction. Operation 1808 may be performed by an interaction monitoring subsystem that is the same as or similar to interaction monitoring subsystem 112, in accordance with one or more implementations.

In an operation 1810, a reward to be provided (or credited) to the user account may be determined based on the execution of the transaction. Operation 1810 may be performed by a reward subsystem that is the same as or similar to reward subsystem 114, in accordance with one or more implementations.

Exemplary Flowchart for Providing Annotation Tracks or Other Datasets

Figure 19:
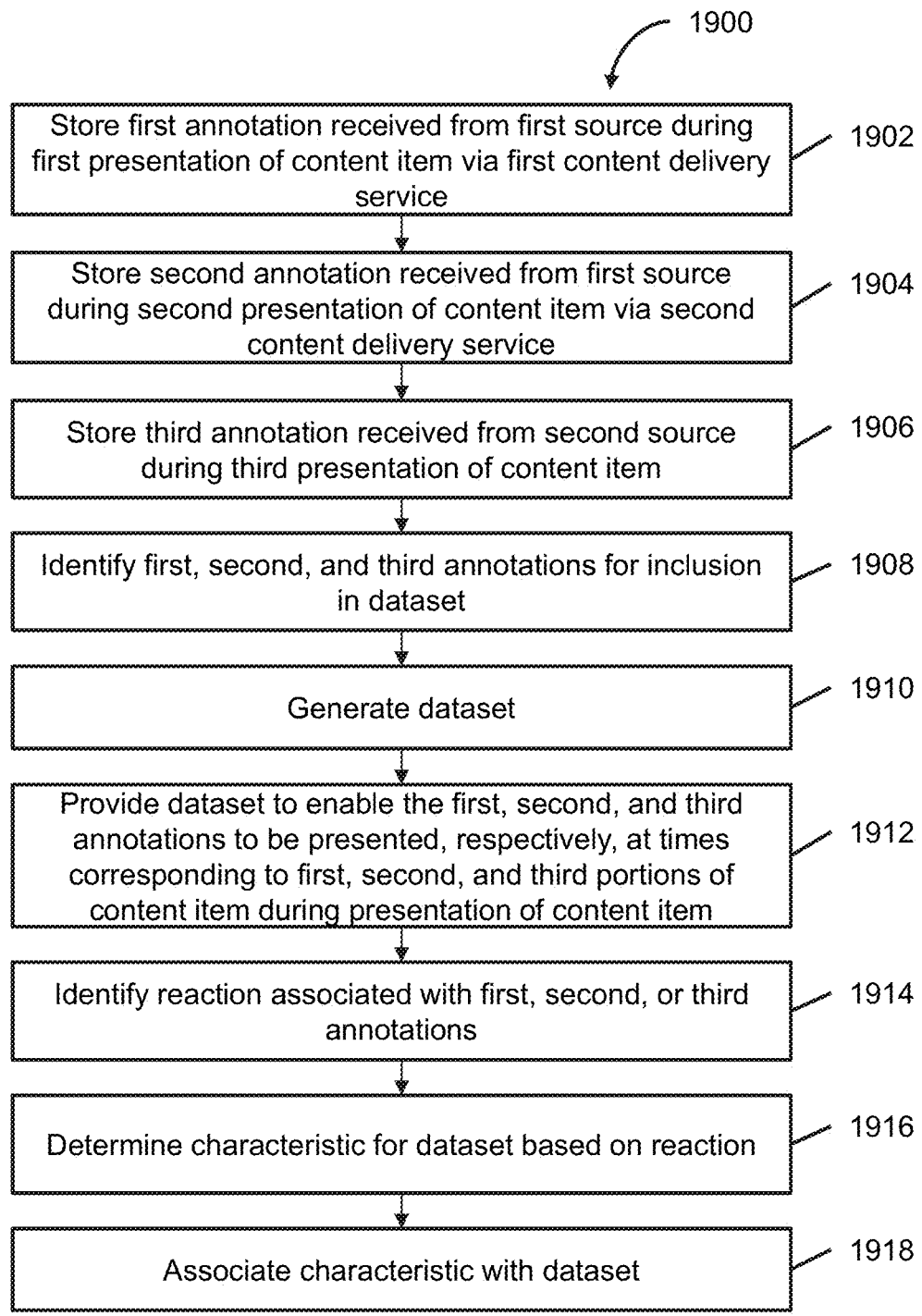
FIG. 19 is an exemplary illustration of a flowchart of a method of providing a dataset of annotations corresponding to portions of a content item, according to an aspect of the invention.

FIG. 19 is an exemplary illustration of a flowchart of a method 1900 of providing a dataset (or track) of annotations corresponding to portions of a content item, according to an aspect of the invention.

In an operation 1902, a first annotation received from a first source during a first presentation of a content item (via a first content delivery service) may be stored. The first source may, for example, include an authoring user of the first annotation, an entity associated with the authoring user, or other entity. Operation 1902 may be performed by an annotation subsystem that is the same as or similar to annotation subsystem 106, in accordance with one or more implementations.

In an operation 1904, a second annotation received from the first source during a second presentation of the content item (via a second content delivery service) may be stored. Operation 1904 may be performed by an annotation subsystem that is the same as or similar to annotation subsystem 106, in accordance with one or more implementations.

In an operation 1906, a third annotation received from a second source during a third presentation of the content item may be stored. The second source may, for example, include an authoring user of the second annotation, an entity associated with the authoring user, or other entity. Operation 1906 may be performed by an annotation subsystem that is the same as or similar to annotation subsystem 106, in accordance with one or more implementations.

In an operation 1908, the first, second, or third annotations may be identified for inclusion in a dataset (or track). For example, the annotations may be identified for inclusion in the dataset based on a selection of the annotations by a user for inclusion in the dataset, one or more parameters selected by a user for creating the dataset, automatic creation of the dataset by a service without explicit user input to create the dataset, etc. Operation 1908 may be performed by an annotation subsystem that is the same as or similar to annotation subsystem 106, in accordance with one or more implementations.

In an operation 1910, the dataset may be generated. For example, the dataset may be generated such that the dataset enables access to the first, second, or third annotations. Operation 1910 may be performed by an annotation subsystem that is the same as or similar to annotation subsystem 106, in accordance with one or more implementations.

In an operation 1912, the dataset may be provided to enable the first, second, or third annotations to be presented, respectively, at times corresponding to first, second, or portions of the content items. Operation 1912 may be performed by an annotation subsystem that is the same as or similar to annotation subsystem 106, in accordance with one or more implementations.

In an operation 1914, a reaction associated with the first, second, or third annotations may be identified. Operation 1914 may be performed by an interaction monitoring subsystem that is the same as or similar to interaction monitoring subsystem 112, in accordance with one or more implementations.

In an operation 1916, a characteristic may be determined for the dataset based on the reaction. Operation 1916 may be performed by an annotation subsystem that is the same as or similar to annotation subsystem 106, in accordance with one or more implementations.

In an operation 1918, the characteristic may be associated with the dataset. Operation 1918 may be performed by an annotation subsystem that is the same as or similar to annotation subsystem 106, in accordance with one or more implementations.

Exemplary Flowchart for Rewarding Based on Interactions with Datasets

Figure 20:
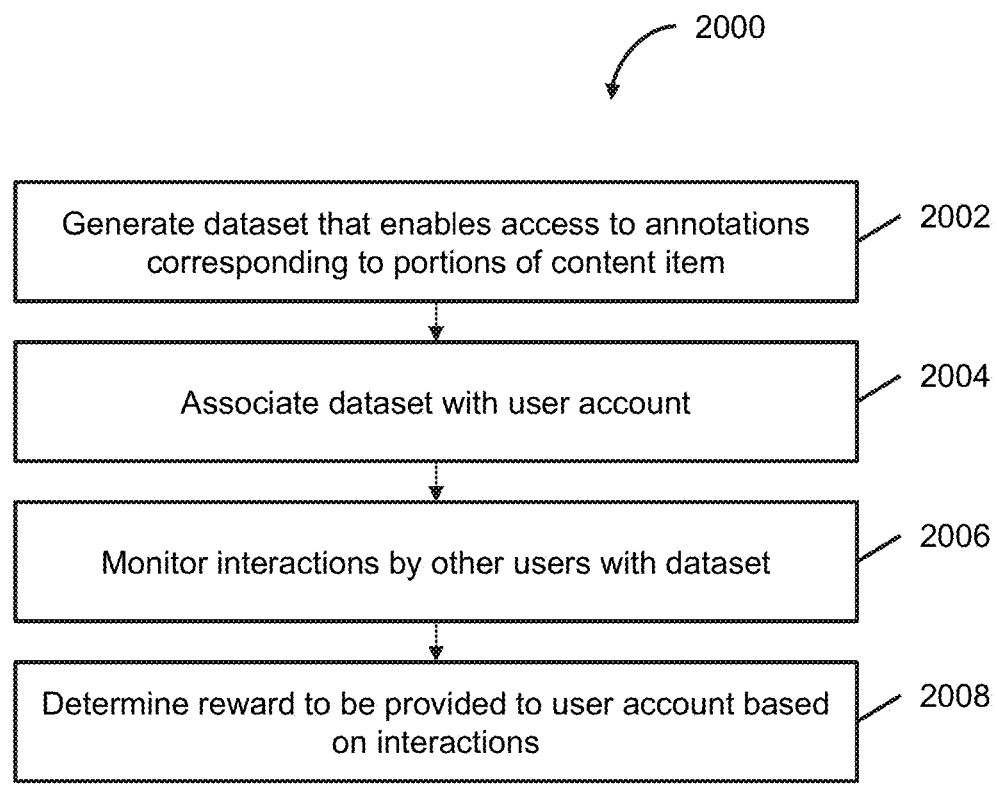
FIG. 20 is an exemplary illustration of a flowchart of a method of facilitating rewards based on interactions with datasets, according to an aspect of the invention.

FIG. 20 is an exemplary illustration of a flowchart of a method 2000 of facilitating rewards based on interactions with datasets (e.g., tracks), according to an aspect of the invention.

In an operation 2002, a dataset (or track) that enables access to annotations corresponding to portions of a content item may be generated. Operation 2002 may be performed by an annotation subsystem that is the same as or similar to annotation subsystem 106, in accordance with one or more implementations.

In an operation 2004, the dataset may be associated with a user account. For example, the dataset may be received from a first source, and the dataset may be associated with a user account of the first source. The first source may include a creating user of the dataset, an entity associated with the creating user, or other entity. Operation 2004 may be performed by an annotation subsystem that is the same as or similar to annotation subsystem 106, in accordance with one or more implementations.

In an operation 2006, interactions with the dataset may be monitored. Monitored interactions may, for example, include access of the dataset (e.g., viewing annotations of the dataset, listening annotations of the dataset, etc.) by users during a presentation of the content item, reactions by users to the dataset (e.g., rating the dataset, rating annotations of the dataset, replying to annotation of the dataset, etc.), execution of transactions enabled via the dataset, or other interactions. Operation 2006 may be performed by an interaction monitoring subsystem that is the same as or similar to interaction monitoring subsystem 112, in accordance with one or more implementations.

In an operation 2008, a reward to be provided (or credited) to the user account may be determined based on the interactions. Operation 2008 may be performed by a reward subsystem that is the same as or similar to reward subsystem 114, in accordance with one or more implementations.

Exemplary Flowchart for Rewarding Based on Dataset-Enabled Transactions

Figure 21:
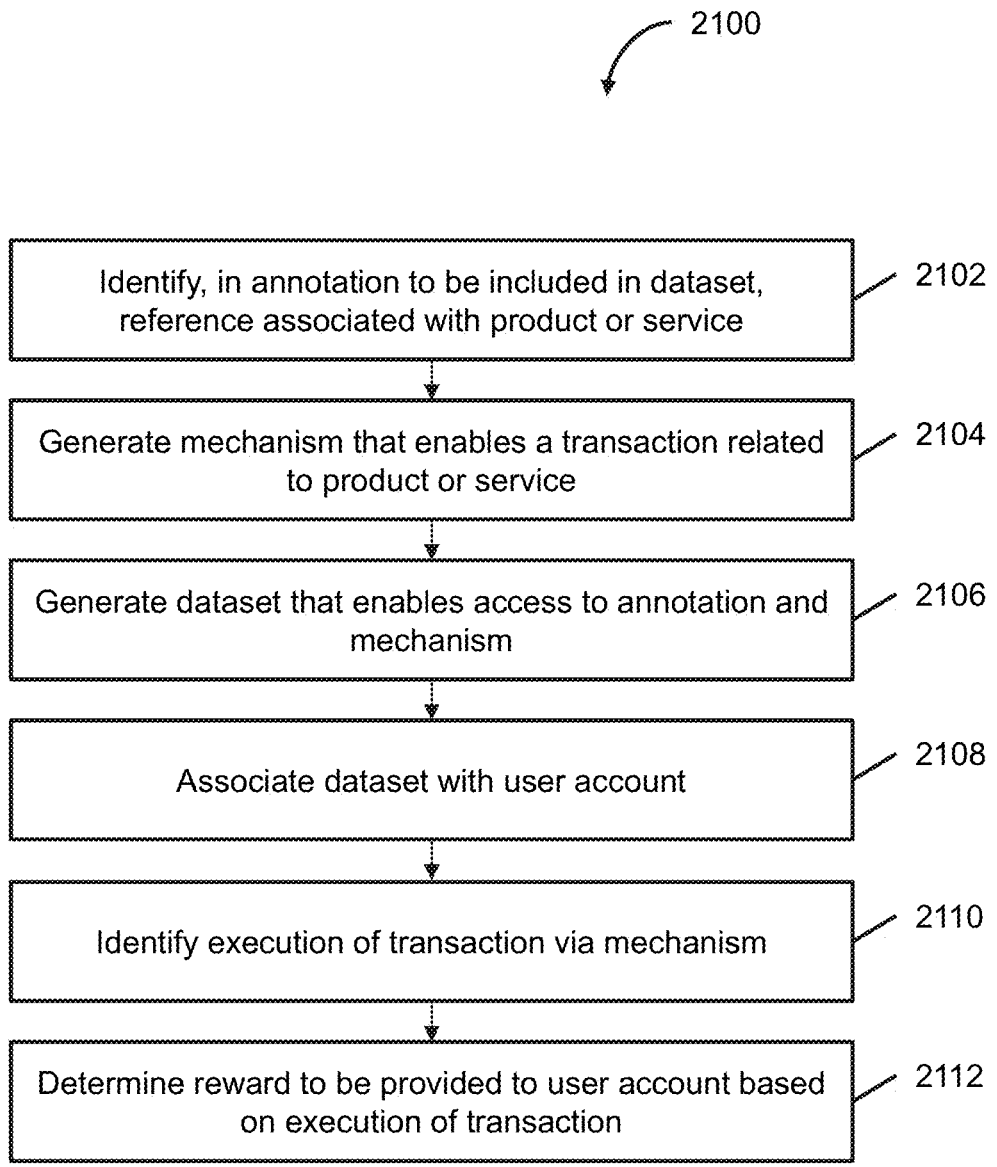
FIG. 21 is an exemplary illustration of a flowchart of a method of facilitating rewards based on execution of transactions enabled via datasets, according to an aspect of the invention.

FIG. 21 is an exemplary illustration of a flowchart of a method 2100 of facilitating rewards based on execution of transactions enabled via datasets (e.g., tracks), according to an aspect of the invention.

In an operation 2102, a reference associated with a product or service may be identified in an annotation that is to be included in a dataset (or track). Operation 2102 may be performed by an annotation subsystem that is the same as or similar to annotation subsystem 106, in accordance with one or more implementations.

In an operation 2104, a mechanism that enables a transaction related to the product or service may be generated. Operation 2104 may be performed by an annotation subsystem that is the same as or similar to annotation subsystem 106, in accordance with one or more implementations.

In an operation 2106, the dataset may be generated such that the dataset enables access to the annotation and the mechanism. Operation 2106 may be performed by an annotation subsystem that is the same as or similar to annotation subsystem 106, in accordance with one or more implementations.

In an operation 2108, the dataset may be associated with a user account. Operation 2108 may be performed by an account subsystem that is the same as or similar to account subsystem 110, in accordance with one or more implementations.

In an operation 2110, an execution of the transaction via the mechanism may be identified. For example, the execution of the transaction may be identified based on use of the mechanism by a user to facilitate the execution of the transaction. Operation 2110 may be performed by an interaction monitoring subsystem that is the same as or similar to interaction monitoring subsystem 112, in accordance with one or more implementations.

In an operation 2112, a reward to be provided to the user account may be determined based on the execution of the transaction. Operation 2112 may be performed by a reward subsystem that is the same as or similar to reward subsystem 114, in accordance with one or more implementations.

Exemplary Flowchart for Facilitating the Sharing of Portions of a Content Item

Figure 22:
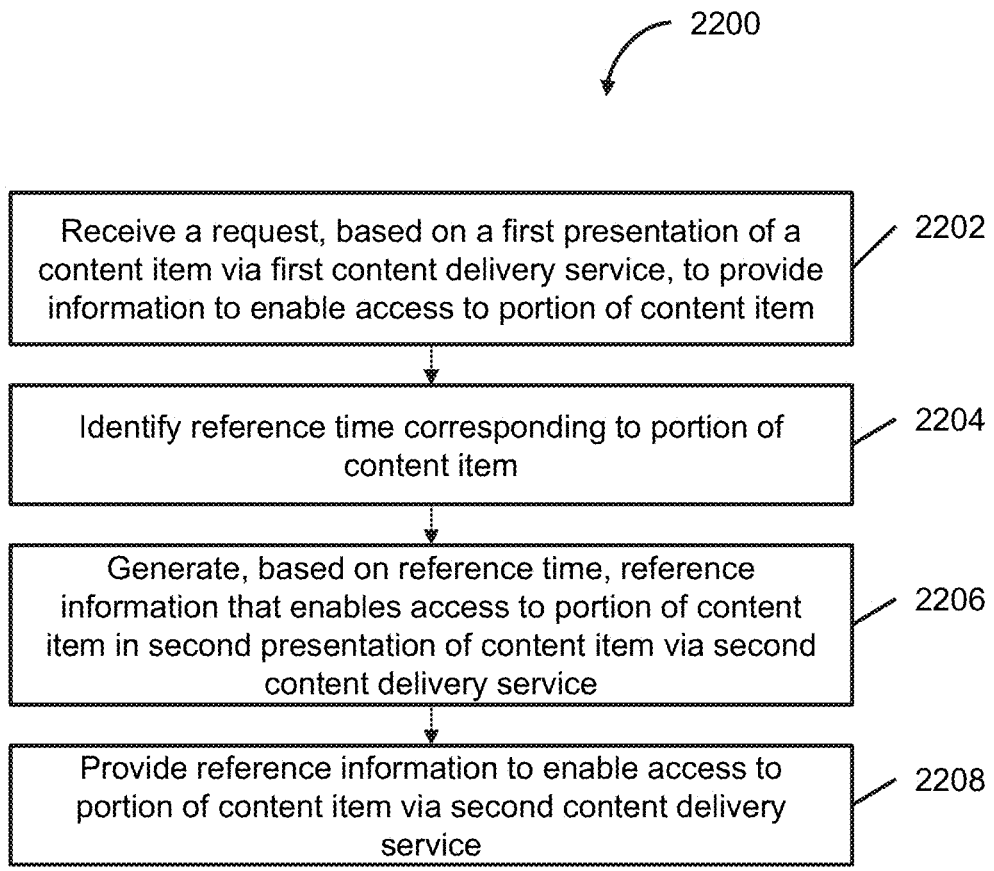
FIG. 22 is an exemplary illustration of a flowchart of a method of facilitating the sharing of portions of a content item across different content delivery services, according to an aspect of the invention.

FIG. 22 is an exemplary illustration of a flowchart of a method 2200 of facilitating the sharing of portions of a content item across different content delivery services, according to an aspect of the invention.

In an operation 2202, a request to provide information to enable access to a portion of a content item may be received. The request may, for example, be based on a first presentation of the content item via a first content delivery service. Operation 2202 may be performed by a content presentation subsystem that is the same as or similar to content presentation subsystem 116, in accordance with one or more implementations.

In an operation 2204, a reference time corresponding to the portion of the content item may be identified. Operation 2204 may be performed by a content reference subsystem that is the same as or similar to content reference subsystem 108, in accordance with one or more implementations.

In an operation 2206, reference information that enables access to the portion of the content item in a second presentation of the content item (via a second content delivery service) may be generated based on the reference time. Operation 2206 may be performed by a content presentation subsystem that is the same as or similar to content presentation subsystem 116, in accordance with one or more implementations.

In an operation 2208, the reference information may be provided to enable access to the portion of the content item via the second content delivery service. Operation 2208 may be performed by a content presentation subsystem that is the same as or similar to content presentation subsystem 116, in accordance with one or more implementations.

Exemplary Flowchart for Facilitating the Access of a Portion of a Content Item

Figure 23:
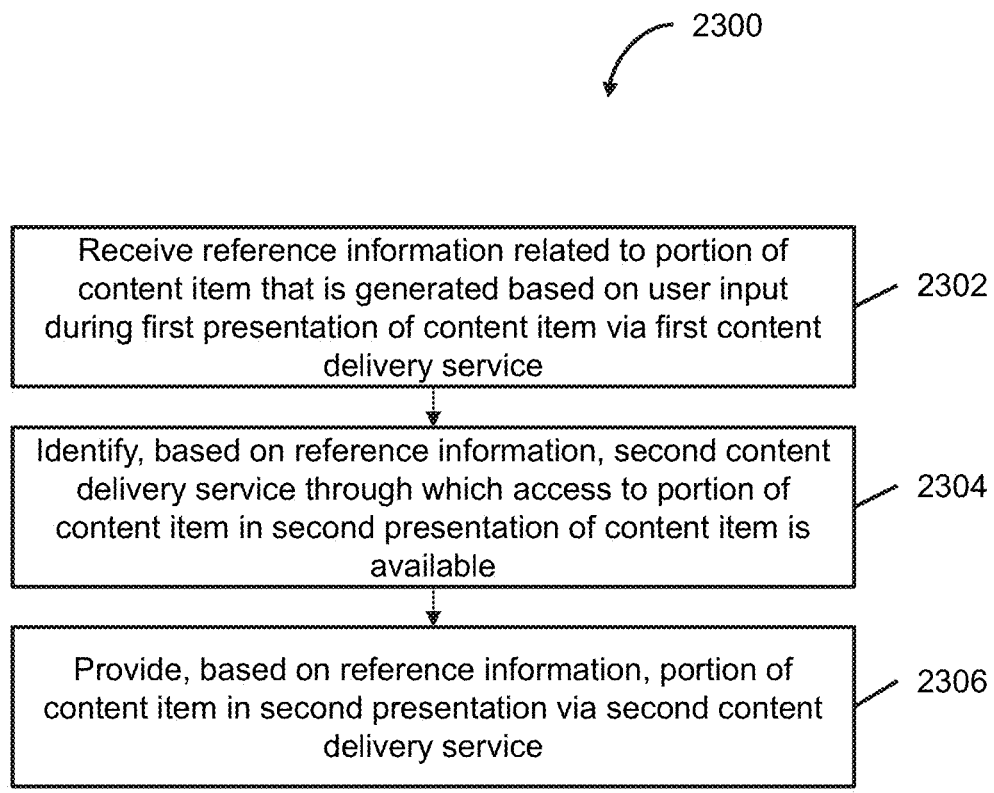
FIG. 23 is an exemplary illustration of a flowchart of a method of facilitating the access of a portion of a content item, according to an aspect of the invention.

FIG. 23 is an exemplary illustration of a flowchart of a method 2300 of facilitating the access of a portion of a content item, according to an aspect of the invention.

In an operation 2302, reference information related to a portion of a content item may be received. For example, the reference information may be generated based on user input during a first presentation of the content item (via a first content delivery service). Operation 2302 may be performed by a content presentation subsystem that is the same as or similar to content presentation subsystem 116, in accordance with one or more implementations.

In an operation 2304, a second content delivery service (through which access to the portion of the content item is available) may be identified based on the reference information. For example, the reference information may include information indicating the content item (e.g., content item identifier), the portion of the content item (e.g., portion identifier), a reference time corresponding to the portion of the content item, or other information. The second content delivery service may be identified based on a determination that the second content delivery service offers access to the content item or the portion of the content item. Operation 2304 may be performed by a content presentation subsystem that is the same as or similar to content presentation subsystem 116, in accordance with one or more implementations.

In an operation 2306, the portion of the content item may be provided in the second presentation (via the second content delivery service) based on the reference information. For example, the reference information may enable a user to jump to the portion of the content item in the second presentation (e.g., using a content item identifier associated with the content item and a reference time corresponding to the portion of the content item). Operation 2306 may be performed by a content presentation subsystem that is the same as or similar to content presentation subsystem 116, in accordance with one or more implementations.

Exemplary Flowchart for Enabling Storage of Reactions to Annotations

Figure 24:
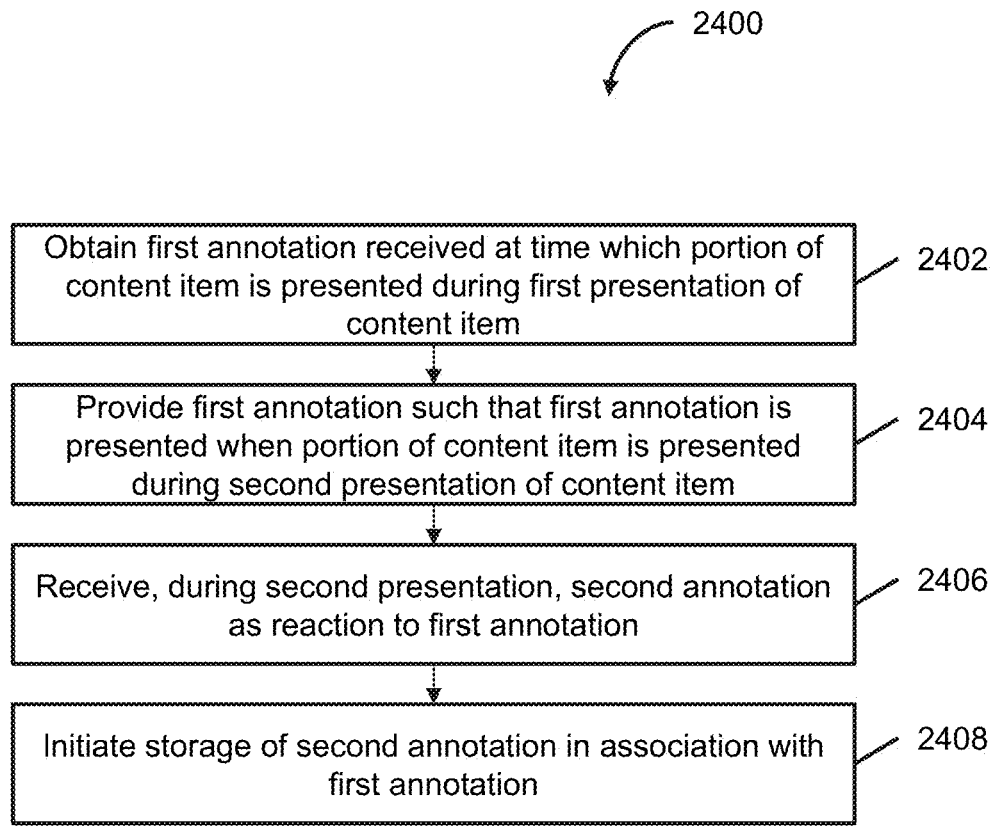
FIG. 24 is an exemplary illustration of a flowchart of a method of enabling storage of reactions to annotations, according to an aspect of the invention.

FIG. 24 is an exemplary illustration of a flowchart of a method 2400 of enabling storage of reactions to annotations, according to an aspect of the invention.

In an operation 2402, a first annotation (initially received at a time which a portion of a content item is presented during a first presentation of the content item) may be obtained. Operation 2402 may be performed by an annotation subsystem that is the same as or similar to annotation subsystem 106, in accordance with one or more implementations.

In an operation 2404, the first annotation may be provided when the corresponding portion of the content item is presented during a second presentation of the content item. Operation 2404 may be performed by an annotation subsystem that is the same as or similar to annotation subsystem 106, in accordance with one or more implementations.

In an operation 2406, a second annotation may be received during the second presentation as a reaction to the first annotation. Operation 2406 may be performed by an annotation subsystem that is the same as or similar to annotation subsystem 106, in accordance with one or more implementations.

In an operation 2408, storage of the second annotation in association with the first annotation may be initiated. By way of example, the second annotation may be stored in association with the first annotation based on a determination that the second annotation is a reaction to the first annotation. Operation 2408 may be performed by an annotation subsystem that is the same as or similar to annotation subsystem 106, in accordance with one or more implementations.

Exemplary Flowchart for Initiating Conversations Based on Annotation Reactions

Figure 25:
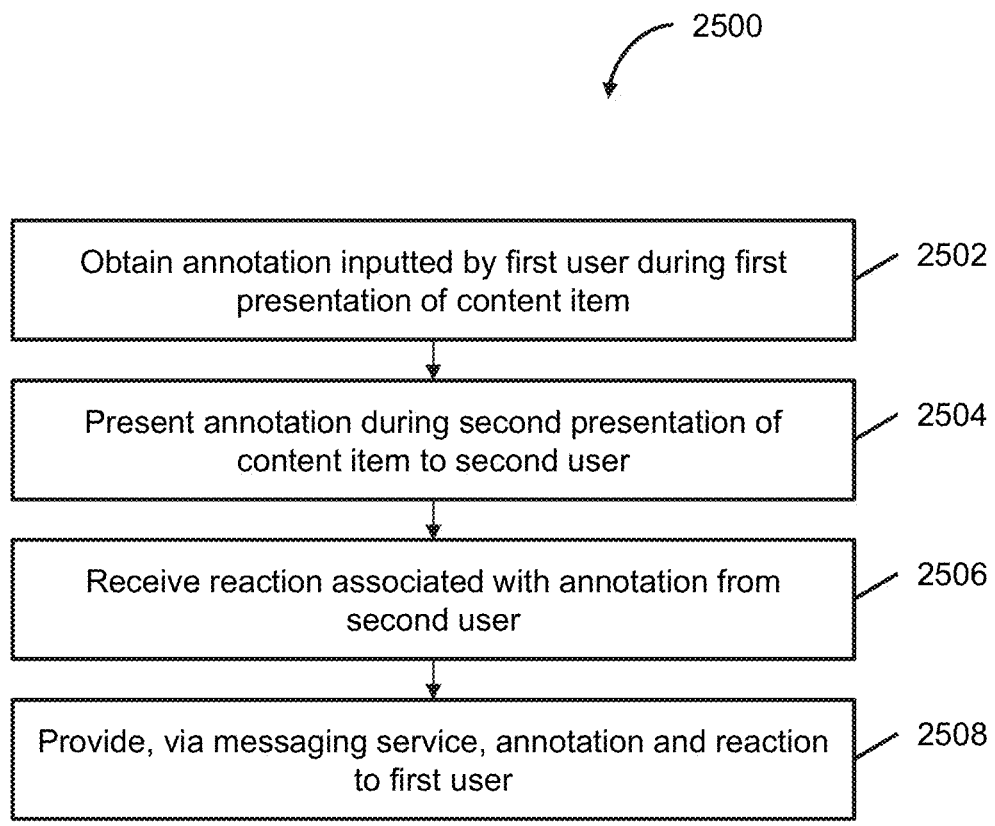
FIG. 25 is an exemplary illustration of a flowchart of a method of initiating conversations between users based on reactions to annotations, according to an aspect of the invention.

FIG. 25 is an exemplary illustration of a flowchart of a method 2500 of initiating conversations between users based on reactions to annotations, according to an aspect of the invention.

In an operation 2502, an annotation entered by a first user during a first presentation of a content item may be obtained. Operation 2502 may be performed by an annotation subsystem that is the same as or similar to annotation subsystem 106, in accordance with one or more implementations.

In an operation 2504, the annotation may be presented during a second presentation of the content item (to a second user). Operation 2504 may be performed by an annotation subsystem that is the same as or similar to annotation subsystem 106, in accordance with one or more implementations.

In an operation 2506, a reaction associated with the annotation may be received from the second user. Operation 2506 may be performed by an annotation subsystem that is the same as or similar to annotation subsystem 106, in accordance with one or more implementations.

In an operation 2508, the annotation and the reaction may be provided via a messaging service to the first user. As an example, the annotation and/or the reaction may be provided to the first user based on a determination that the first and second users are associated with the same social network, a determination that the first and second users are within a social distance threshold from one another, or other criteria. Operation 2508 may be performed by an annotation subsystem that is the same as or similar to annotation subsystem 106, in accordance with one or more implementations.

Exemplary Flowchart for Presenting User Interface Elements Based on Relevancy

Figure 26:
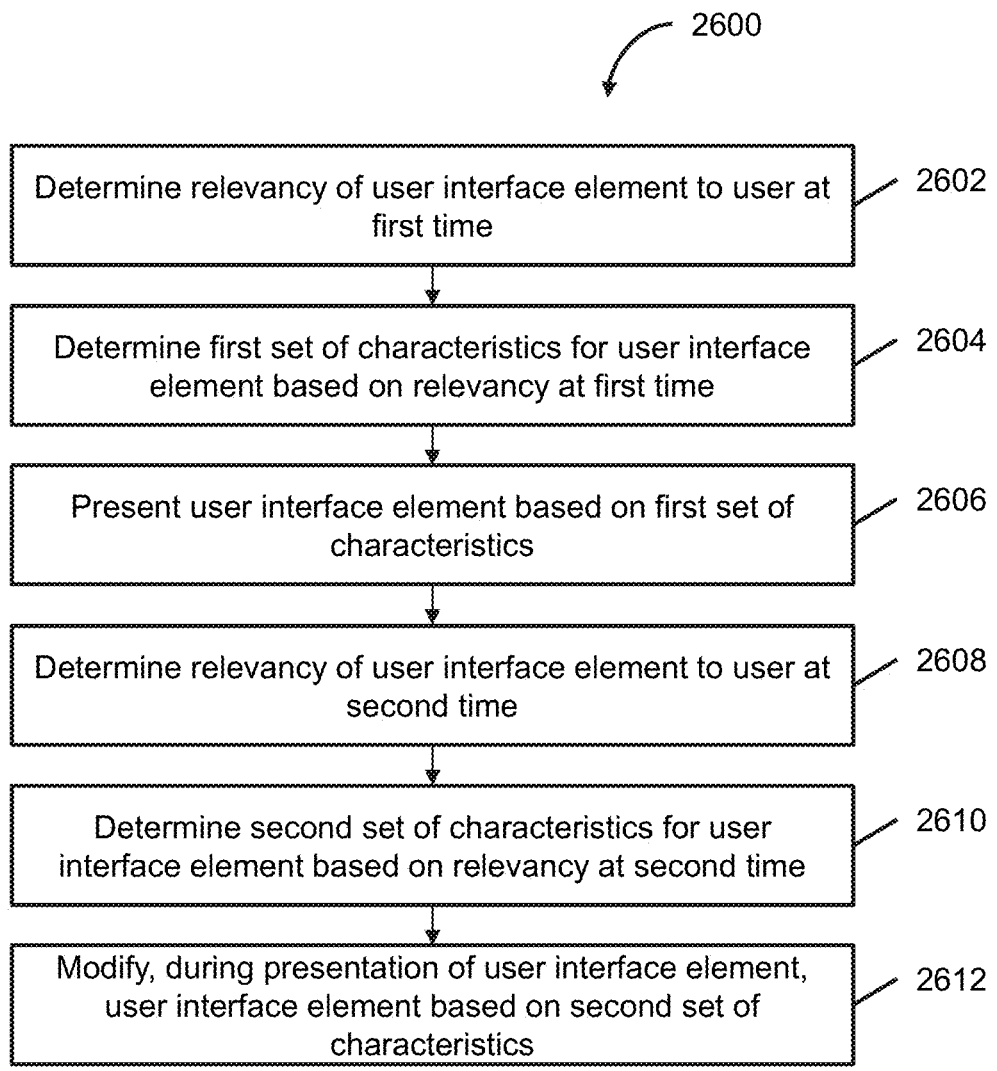
FIG. 26 is an exemplary illustration of a flowchart of a method of presenting user interface elements based on relevancy, according to an aspect of the invention.

FIG. 26 is an exemplary illustration of a flowchart of a method 2600 of presenting user interface elements based on relevancy, according to an aspect of the invention.

In an operation 2602, relevancy of a user interface element to a user may be determined with respect to a first time. Operation 2602 may be performed by a content presentation subsystem that is the same as or similar to content presentation subsystem 116, in accordance with one or more implementations.

In an operation 2604, a first set of characteristics may be determined for the user interface element based on the determined relevancy with respect to the first time. Operation 2604 may be performed by a content presentation subsystem that is the same as or similar to content presentation subsystem 116, in accordance with one or more implementations.

In an operation 2606, the user interface element may be presented based on the first set of characteristics. Operation 2606 may be performed by a content presentation subsystem that is the same as or similar to content presentation subsystem 116, in accordance with one or more implementations.

In an operation 2608, relevancy of a user interface element to the user may be determined with respect to a second time (e.g., relevancy of the user interface element at the second time). Operation 2608 may be performed by a content presentation subsystem that is the same as or similar to content presentation subsystem 116, in accordance with one or more implementations.

In an operation 2610, a second set of characteristics may be determined for the user interface element based on the determined relevancy with respect to the second time. Operation 2610 may be performed by a content presentation subsystem that is the same as or similar to content presentation subsystem 116, in accordance with one or more implementations.

In an operation 2612, the user interface element may be modified during the presentation of the user interface element based on the second set of characteristics. Operation 2612 may be performed by a content presentation subsystem that is the same as or similar to content presentation subsystem 116, in accordance with one or more implementations.

Exemplary Flowchart for Controlling Multiple Presentations of a Content Item

Figure 27:
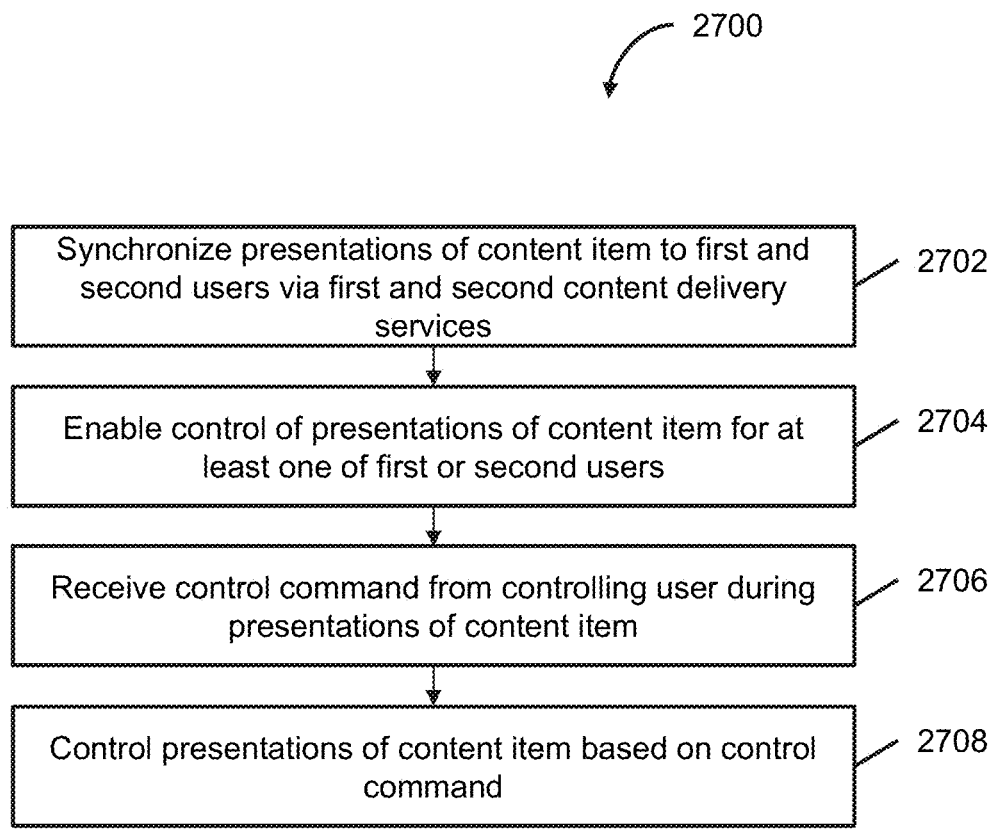
FIG. 27 is an exemplary illustration of a flowchart of a method of facilitating control of presentations of a content item to a group of users, according to an aspect of the invention.

FIG. 27 is an exemplary illustration of a flowchart of a method 2700 of facilitating control of presentations of a content item to a group of users, according to an aspect of the invention.

In an operation 2702, presentations of a content item to first and second users via first and second content delivery services, respectively, may be synchronized. Operation 2702 may be performed by a content presentation subsystem that is the same as or similar to content presentation subsystem 116, in accordance with one or more implementations.

In an operation 2704, control of the presentations of the content item may be enabled for the first or second users. For example, user control of the presentations of the content item may be enabled for the first user, while user control of the presentations of the content item may be disabled for the second user (or vice versa). Operation 2704 may be performed by a content presentation subsystem that is the same as or similar to content presentation subsystem 116, in accordance with one or more implementations.

In an operation 2706, a control command may be received from a controlling user (e.g., first user, second user, etc.) during the presentations of the content item. Operation 2706 may be performed by a content presentation subsystem that is the same as or similar to content presentation subsystem 116, in accordance with one or more implementations.

In an operation 2708, the presentations of the content item may be controlled based on the control command. Operation 2708 may be performed by a content presentation subsystem that is the same as or similar to content presentation subsystem 116, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method of providing rewards based on interactions with annotations, the method being implemented by a computer system that includes one or more physical processors executing one or more computer program instructions which, when executed, perform the method, the method comprising:
   receiving, at the computer system, a first annotation provided by a first user during a presentation of a first content item, wherein the first annotation corresponds to a reference time at which a product or service appears in the first content item, and wherein the first annotation is provided by the first user via a user device different from the computer system;
   identifying, by the computer system, in the first annotation, a reference referring to the product or service;
   modifying, by the computer system, the first annotation to include a mechanism that enables a transaction related to the product or service, wherein the first annotation is modified to include the mechanism based on the identification of the reference;
   associating, by the computer system, the modified first annotation with a first user account of the first user;
   providing, by the computer system, based on the corresponding reference time, a presentation of the modified first annotation during one or more presentations of the first content item to other users such that the mechanism is available for use by the other users via the modified first annotation during the one or more presentations of the first content item;
   monitoring, by the computer system, during the one or more presentations of the first content item, use of the mechanism by the other users via the modified first annotation; and
   determining, by the computer system, a reward to be provided to the first user account based on the monitored use of the mechanism by the other users via the modified first annotation.

2. The method of claim 1, wherein the reference referring to the product or service comprises a first hyperlink to a website offering the product or service for sale, and the mechanism comprises a second hyperlink that enables the transaction related to the product or service,
   wherein modifying the first annotation comprises modifying, based on identification of the first hyperlink, the first annotation to include the second hyperlink that enables the transaction related to the product or service, and
   wherein monitoring the use of the mechanism comprises monitoring use of the second hyperlink by the other users via the modified first annotation.

3. The method of claim 2, wherein modifying the first annotation comprises modifying, based on identification of the first hyperlink, the first annotation to include the second hyperlink in place of the first hyperlink.

4. The method of claim 1, wherein the reference referring to the product or service comprises a product or service identifier associated with the product or service, and wherein modifying the first annotation comprises supplementing, based on identification of the product or service identifier, the product or service identifier with the mechanism in the first annotation.

5. The method of claim 1, wherein the reference referring to the product or service comprises a product or service type identifier associated with the product or service, and
wherein modifying the first annotation comprises supplementing, based on identification of the product or service type identifier, the product or service type identifier with the mechanism in the first annotation.

6. The method of claim 1, wherein monitoring the use of the mechanism comprises identifying an execution of the transaction enabled via the mechanism in the modified first annotation, and
wherein the reward is determined based on the execution of the transaction.

7. The method of claim 1, wherein providing the presentation of the modified first annotation comprises providing, based on the corresponding reference time, the presentation of the modified first annotation at a time at which the corresponding reference time is reached during the one or more presentations of the first content item.

8. The method of claim 1, further comprising:
monitoring, by the computer system, an amount of user requests for the first annotation,
wherein the reward is determined further based on the amount of user requests.

9. The method of claim 1, further comprising:
monitoring, by the computer system, user reactions to the first annotation,
wherein the reward is determined further based on the user reactions to the first annotation.

10. The method of claim 9, wherein monitoring the user reactions to the first annotation comprises identifying a rating provided for the first annotation by at least one of the other users, and
wherein the reward is determined based on the rating.

11. The method of claim 1, further comprising:
identifying, by the computer system, ratings provided for the first user by the other users,
wherein the reward is determined further based on the ratings provided for the first user.

12. A system for providing rewards based on interactions with annotations, the system comprising:
a computer system comprising one or more physical processors programmed to execute one or more computer program instructions which, when executed, cause the one or more physical processors to:
receive a first annotation provided by a first user during a presentation of a first content item, wherein the first annotation corresponds to a reference time at which a product or service appears in the first content item, and wherein the first annotation is provided by the first user via a user device different from the computer system;
identify, in the first annotation, a reference referring to the product or service;
modify the first annotation to include a mechanism that enables a transaction related to the product or service, wherein the first annotation is modified to include the mechanism based on the identification of the reference;
associate the modified first annotation with a first user account of the first user;
provide, based on the corresponding reference time, a presentation of the modified first annotation during one or more presentations of the first content item to other users such that the mechanism is available for use by the other users via the modified first annotation during the one or more presentations of the first content item;
monitor, during the one or more presentations of the first content item, use of the mechanism by the other users via the modified first annotation; and
determine a reward to be provided to the first user account based on the monitored use of the mechanism by the other users via the modified first annotation.

13. The system of claim 12, wherein the reference referring to the product or service comprises a first hyperlink to a website offering the product or service for sale, and the mechanism comprises a second hyperlink that enables the transaction related to the product or service,
wherein modifying the first annotation comprises modifying, based on identification of the first hyperlink, the first annotation to include the second hyperlink that enables the transaction related to the product or service, and
wherein monitoring the use of the mechanism comprises monitoring use of the second hyperlink by the other users via the modified first annotation.

14. The system of claim 12, wherein modifying the first annotation comprises modifying, based on identification of the first hyperlink, the first annotation to include the second hyperlink in place of the first hyperlink.

15. The system of claim 12, wherein monitoring the use of the mechanism comprises identifying an execution of the transaction enabled via the mechanism in the modified first annotation, and
wherein the reward is determined based on the execution of the transaction.

16. The system of claim 12, wherein providing the presentation of the modified first annotation comprises providing, based on the corresponding reference time, the presentation of the modified first annotation at a time at which the corresponding reference time is reached during the one or more presentations of the first content item.

17. The system of claim 12, wherein the one or more physical processors are further caused to:
receive ratings provided for the first user by the other users, wherein the reward is determined further based on the ratings provided for the first user.

18. A method of providing a hybrid system-modified user annotation during a presentation of a content item where the hybrid system-modified user annotation is based on (i) a user annotation that comprises a reference associated with a corresponding products or service appearing in the content item and (ii) system identification of the product-or-service reference in the user annotation, the method being implemented by a computer system that includes one or more physical processors executing one or more computer program instructions which, when executed, perform the method, the method comprising:
receiving, by the computer system, a first annotation provided by a first user during a presentation of a first content item, wherein the first annotation corresponds to a reference time at which a product or service appears in the first content item, and wherein the first annotation is provided by the first user via a user device different from the computer system;
identifying, by the computer system, in the first annotation, a reference referring to the product or service;
modifying, by the computer system, the first annotation to include a mechanism that enables a transaction related to the product or service, wherein the first annotation is modified to include the mechanism based on the identification of the reference; and providing, by the computer system, a presentation of the modified first annotation during one or more presentations of the first content item to other users such that the mechanism is available for use by the other users via the modified first annotation during the one or more presentations of the first content item.

19. The method of claim 18, wherein providing the presentation of the modified first annotation comprises providing, based on the corresponding reference time, the presentation of the modified first annotation at a time at which the corresponding reference time is reached during the one or more presentations of the first content item.

20. A system for providing a hybrid system-modified user annotation during a presentation of a content item where the hybrid system-modified user annotation is based on (i) a user annotation that comprises a reference associated with a corresponding products or service appearing in the content item and (ii) system identification of the product-or-service reference in the user annotation, the system comprising:

a computer system comprising one or more physical processors programmed to execute one or more computer program instructions which, when executed, cause the one or more physical processors to:

receive a first annotation provided by a first user during a presentation of a first content item, wherein the first annotation corresponds to a reference time at which a product or service appears in the first content item, and wherein the first annotation is provided by the first user via a user device different from the computer system;

identify, in the first annotation, a reference referring to the product or service;

modify, the first annotation to include a mechanism that enables a transaction related to the product or service, wherein the first annotation is modified to include the mechanism based on the identification of the reference; and provide a presentation of the modified first annotation during one or more presentations of the first content item to other users such that the mechanism is available for use by the other users via the modified first annotation during the one or more presentations of the first content item.

* * * * *